United States Patent
Kabe et al.

(10) Patent No.: US 10,301,540 B2
(45) Date of Patent: May 28, 2019

(54) LONG PERSISTENT LUMINESCENCE EMITTER AND LONG PERSISTENT LUMINESCENT ELEMENT

(71) Applicant: KYUSHU UNIVERSITY, NATIIONAL UNIVERSITY CORPORATION, Fukuoka (JP)

(72) Inventors: Ryota Kabe, Fukuoka (JP); Chihaya Adachi, Fukuoka (JP)

(73) Assignee: KYUSHU UNIVERSITY, NATIONAL UNIVERSITY CORPORATION, Fukuoka-Shi, Fukuoka (JP)

(*) Notice: Subject to any disclaimer, the term of this patent is extended or adjusted under 35 U.S.C. 154(b) by 0 days.

(21) Appl. No.: 16/057,478

(22) Filed: Aug. 7, 2018

(65) Prior Publication Data

US 2018/0346807 A1    Dec. 6, 2018

Related U.S. Application Data

(63) Continuation-in-part of application No. PCT/JP2017/043741, filed on Dec. 6, 2017.

(30) Foreign Application Priority Data

Dec. 6, 2016 (JP) ................. 2016-236432
Apr. 27, 2017 (JP) ................. 2017-087831

(Continued)

(51) Int. Cl.
C09K 11/06    (2006.01)

(52) U.S. Cl.
CPC ...... *C09K 11/06* (2013.01); *C09K 2211/1007* (2013.01); *C09K 2211/1014* (2013.01); *C09K 2211/1018* (2013.01)

(58) Field of Classification Search
CPC ............ C09K 11/06; C09K 2211/1014; C09K 2211/1018; C09K 2211/1007;
(Continued)

(56) References Cited

U.S. PATENT DOCUMENTS

| | | | |
|---|---|---|---|
| 2012/0217869 A1 | 8/2012 | Adachi et al. | |
| 2015/0069352 A1 | 3/2015 | Kim et al. | |
| 2016/0248036 A1* | 8/2016 | Goushi | ............... H01L 51/0071 |

FOREIGN PATENT DOCUMENTS

| | | | |
|---|---|---|---|
| JP | 2006-206618 A | 8/2006 | |
| JP | 2012-193352 A | 10/2012 | |

(Continued)

OTHER PUBLICATIONS

Totani, K., Hirata, S., Watanabe, T., and Adachi, C. Highly Efficient Long Lived Room Temperature Phosphorescence (LL-RTP). Presented at: 57th Spring Meeting of the Japan Society of Applied Physics and Related Societies, Mar. 17, 2010, Tokyo, Japan, Category 12-203, Paper No. 17a-ZL-5, Extended Abstract.*

(Continued)

*Primary Examiner* — C Melissa Koslow
(74) *Attorney, Agent, or Firm* — Browdy and Neimark, PLLC

(57) ABSTRACT

The invention discloses a long persistent luminescence emitter which has an electron-donating molecule that is stable in the radical cation state and an electron-accepting molecule that is stable in the radical anion state and from which luminescence is observed at 10 K after photo-irradiation of the long persistent luminescence emitter stops. According to the disclosed invention, persistent luminescence can be exhibited for a long time with only organic compounds without the use of any rare-earth elements.

9 Claims, 19 Drawing Sheets
(17 of 19 Drawing Sheet(s) Filed in Color)

(30) Foreign Application Priority Data

Aug. 4, 2017 (JP) .................................. 2017-151837
Oct. 13, 2017 (JP) .................................. 2017-199285

(58) Field of Classification Search
CPC .... C09K 2211/1059; C09K 2211/1029; C09K 2211/1044; C09K 2211/14; C09K 2211/1048; C09D 5/22
See application file for complete search history.

(56) References Cited

FOREIGN PATENT DOCUMENTS

| KR | 10-2013-0115027 | A2 | | 10/2013 |
|---|---|---|---|---|
| KR | 10-2016-0055822 | A | | 5/2016 |
| TW | 201515297 | A | | 4/2015 |
| WO | 2009-069790 | A1 | | 6/2009 |
| WO | 2015-041157 | A1 | | 3/2015 |
| WO | WO 2015/041157 | | * | 3/2015 |

OTHER PUBLICATIONS

Hirata, S., Totani, K., and Adachi, C. Mechanism of Highly Efficient Intersystem Crossing in Donor Substituted Aromatic Carbons Showing Long Lived Triplet Excited State. Presented at: 57th Spring Meeting of the Japan Society of Applied Physics and Related Societies, Mar. 17, 2010, Tokyo, Japan, Category 12-204, Pap.*

Goushi, K., Nomura, H., and Adachi, C. Delayed fluorescence organic light-emitting diodes based on exciplex. Presented at: 59th Spring Meeting of the Japan Society of Applied Physics and Related Societies, Mar. 17, 2012, Tokyo, Japan, Category 12-251, Paper No. 17p-F7-6, Extended Abstract.*

Hirata, S. et al. Mechanism of Highly Efficient Intersystem Crossing in Donor Substituted Aromatic Carbons Showing Long Lived Triplet Excited State. Presented at: 57th Spring Meeting of the Japan Society of Applied Physics and Related Societies, Mar. 17, 2010, Tokyo, Japan, Category 12-204, Paper No. 17a-ZL-6, Extended Abs.*

Office Action dated Dec. 19, 2017 issued in the corresponding Japanese Patent Application No. 2017-199587 with English Machine Translation.

Office Action dated Feb. 20, 2018 issued in the corresponding Japanese Patent Application No. 2017-199587 with English Machine Translation.

Gao et al., Layered host-guest long-afterglow ultrathin nanosheets: high-efficiency phosphorescence energy transfer at 2D confined interface, Chemical Science, 8:590-599 (2017).

Yang et al., Intermolecular electronic coupling of organic units for efficent persistent room-temperature phosphorescence, Angewandte Chemie International Edition, 55:2181-2185 (2016).

Li et al., Reversible luminescence switching of an organic solid: controllable on-off persistent room temperature phosphorescence and stimulated multiple fluorescence conversion, Advanced Optical Materials, 3:1184-1190 (2015).

Office Action dated Aug. 17, 2018 issued in the corresponding Taiwanese Patent Application No. 106142692 with English Translation.

Hansch et al., A survey of hammell substiuent constants and resonance and field parameters, Chem Rev., 91:165-195 (1991).

Office Action dated Nov. 15, 2018, issued in the corresponding Korean Patent Application No. 10-2018-7022445 with English Machine Translation.

* cited by examiner

LONG PERSISTENT LUMINESCENCE EMITTER AND LONG PERSISTENT LUMINESCENT ELEMENT

TECHNICAL FIELD

The present invention relates to a long persistent luminescence emitter which exhibits long-lived luminescence and to a long persistent luminescent element.

BACKGROUND ART

Long persistent luminescent materials are luminescent materials which store energy during the application of excitation light and emit light using the stored energy even after the application of the excitation light stops. Long persistent luminescent materials are used as luminescent paints for watch and clock dials which glow in the dark or at night, letters and diagrams of signs and guideboards and the like, and these materials have been recently applied to lights which can produce light with stored light energy without electricity supply.

Of these long persistent luminescent materials, inorganic salts containing rare-earth elements such as Eu, Ce and Tb are especially known as long persistent luminescent materials which exhibit long-lived luminescence (for example, see PTL 1).

CITATION LIST

Patent Literature

PTL 1: JP-A-2006-206618

SUMMARY OF INVENTION

Technical Problem

The long persistent luminescent materials composed of inorganic salts, however, have the following problems: the production steps are complicated because formation of high-quality crystals and regulation of the particle diameter are required; the production costs are high because the materials are produced by complicated production steps using expensive rare-earth elements; and it is difficult to obtain a uniform long persistent luminescent film because the long persistent luminescent film is formed using a solution of dispersed fine inorganic particles (a heterogeneous system) as a paint. Moreover, transparency is difficult to realize. Many long persistent luminescent materials composed of inorganic salts have drawbacks because their excitation wavelengths are in the ultraviolet region, which limits the application of an excitation source with little ultraviolet light.

On the other hand, long persistent luminescent materials composed of organic compounds can be produced without the complicated steps such as regulation of the particle diameter, and their production costs can be kept low since carbon, which is inexhaustible, is the major constituent element. Furthermore, the properties of organic compounds can be modified in various ways by molecular design, and thus the excitation wavelengths, the emission wavelengths and the emission duration times can be regulated easily. Organic compounds also have the advantages that transparency is easily realized in general and that a uniform film is easily formed because the organic compounds can be dissolved in many organic solvents.

Organic long persistent luminescent materials which have been used, however, simply utilize the photoluminescence of a phosphorescent organic material, and the emission duration time depends primarily on the lifetime of the excited triplet state of the organic compound itself (phosphorescence lifetime). Accordingly, there is a limit on the extension of the emission duration time with the conventional organic long persistent luminescent materials, and the fact is that sufficient emission duration time cannot be obtained.

Thus, the present inventors have conducted extensive investigation with the purpose of providing a long persistent luminescence emitter which can exhibit luminescence for a sufficient time using only organic compounds without the use of any rare-earth elements and providing a long persistent luminescent element.

Solution to Problem

As a result of the extensive investigation, the inventors have found that luminescence is exhibited for a sufficient time even after the end of photo-irradiation when specific electron-donating molecules and specific electron-accepting molecules are used. The emission duration time observed here exceeds the emission lifetime of the corresponding electron-donating molecules or the corresponding electron-accepting molecules, and these findings are unexpected. The invention is proposed based on the findings and has the following structures.

(1) A long persistent luminescence emitter having an electron-donating molecule that is stable in the radical cation state and an electron-accepting molecule that is stable in the radical anion state, wherein luminescence is observed at 10 K after photo-irradiation of the long persistent luminescence emitter stops.

(2) The long persistent luminescence emitter according to (1), wherein the luminescence is observed at 20° C. after the photo-irradiation of the long persistent luminescence emitter stops.

(3) The long persistent luminescence emitter according to (1) or (2), wherein an electron moves from the electron-donating molecule to the electron-accepting molecule upon the photo-irradiation of the long persistent luminescence emitter, and an electron-donating molecule in the radical cation state and an electron-accepting molecule in the radical anion state are generated.

(4) The long persistent luminescence emitter according to any one of (1) to (3), wherein an electron is transferred from the HOMO of the electron-accepting molecule to the LUMO upon the photo-irradiation of the long persistent luminescence emitter.

(5) The long persistent luminescence emitter according to (4), wherein an electron moves from the HOMO of the electron-donating molecule to the HOMO of the electron-accepting molecule, and an electron-donating molecule in the radical cation state and an electron-accepting molecule in the radical anion state are generated.

(6) The long persistent luminescence emitter according to any one of (1) to (3), wherein an electron is transferred from the HOMO of the electron-donating molecule to the LUMO upon the photo-irradiation of the long persistent luminescence emitter.

(7) The long persistent luminescence emitter according to (6), wherein an electron moves from the LUMO of the electron-donating molecule to the LUMO of the electron-accepting molecule, and an electron-donating molecule in the radical cation state and an electron-accepting molecule in the radical anion state are generated.

(8) The long persistent luminescence emitter according to any one of (1) to (7), wherein an electron moves from the LUMO of an electron-accepting molecule in the radical anion state to the LUMO of another electron-accepting molecule.

(9) The long persistent luminescence emitter according to any one of (1) to (8), wherein an electron from the LUMO of an electron-accepting molecule in the radical anion state recombines with a hole of an electron-donating molecule in the radical cation state, and energy is generated.

(10) The long persistent luminescence emitter according to any one of (1) to (9), wherein the electron-donating molecule and the electron-accepting molecule form an exciplex upon the photo-irradiation of the long persistent luminescence emitter.

(11) The long persistent luminescence emitter according to (10), wherein the electron-donating molecule and the electron-accepting molecule form the exciplex with the energy generated by the recombination of the electron and the hole.

(12) The long persistent luminescence emitter according to (10) or (11), wherein the exciplex exhibits luminescence.

(13) The long persistent luminescence emitter according to any one of (1) to (12) which further has a luminescent material in addition to the electron-donating molecule and the electron-accepting molecule.

(14) The long persistent luminescence emitter according to (13), wherein the luminescent material exhibits luminescence.

(15) The long persistent luminescence emitter according to any one of (1) to (14), wherein the luminescence includes fluorescence.

(16) The long persistent luminescence emitter according to any one of (1) to (14), wherein the luminescence includes fluorescence and phosphorescence.

(17) The long persistent luminescence emitter according to (15) or (16), wherein the luminescence further includes delayed fluorescence.

(18) The long persistent luminescence emitter according to any one of (1) to (17), wherein the electron-accepting molecule content is more than 50 mol % based on the total amount by mole of electron-accepting molecules and electron-donating molecules.

(19) The long persistent luminescence emitter according to any one of (1) to (18), wherein the electron-accepting molecule has any of the following partial structures:

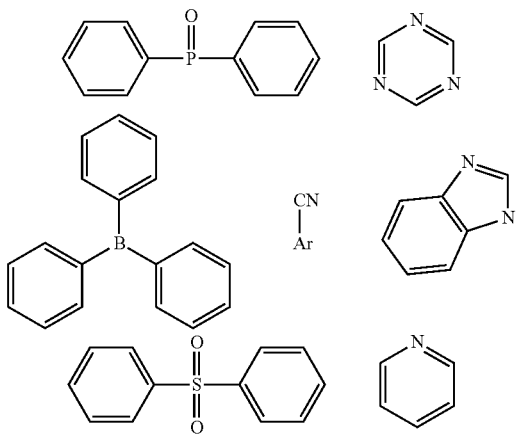

-continued

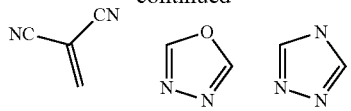

wherein Ar represents an aromatic ring or a heteroaromatic ring.

(20) The long persistent luminescence emitter according to any one of (1) to (19), wherein the electron-accepting molecule contains: two or more phosphine oxide structures $R_3P(=O)$ wherein each R represents a substituent, and the three R's may be the same or different from each other; and one hetero atom or more.

(21) The long persistent luminescence emitter according to (20), wherein the hetero atom is at least one selected from N, O, S and P.

(22) The long persistent luminescence emitter according to any one of (1) to (21), wherein the electron-donating molecule has a dialkylamino group and an aromatic ring.

(23) The long persistent luminescence emitter according to any one of (1) to (22), wherein electron-donating molecules and electron-accepting molecules are blended.

(24) The long persistent luminescence emitter according to any one of (1) to (23) which has an area where the amount by mass of electron-donating molecules is 100 times or more higher than that of electron-accepting molecules and an area where the amount by mass of electron-accepting molecules is 100 times or more higher than that of electron-donating molecules.

(25) The long persistent luminescence emitter according to (24), wherein the area where the amount by mass of electron-donating molecules is 100 times or more higher than that of electron-accepting molecules borders on the area where the amount by mass of electron-accepting molecules is 100 times or more higher than that of electron-donating molecules.

(26) The long persistent luminescence emitter according to any one of (1) to (25), wherein at least one of the electron-accepting molecule and the electron-donating molecule is a polymer having a repeating unit.

(27) A long persistent luminescent element having a long persistent luminescent film containing the long persistent luminescence emitter according to any one of (1) to (26) on a support.

Advantageous Effects of Invention

The long persistent luminescence emitter of the invention can exhibit persistent luminescence for a long time due to the functions of specific electron-accepting and electron-donating molecules without the use of any inorganic materials containing rare-earth elements. Thus, according to the long persistent luminescence emitter, a long persistent luminescent element which exhibits excellent long persistent luminescence properties can be provided at a low cost.

BRIEF DESCRIPTION OF DRAWINGS

The patent or application file contains at least one drawing executed in color. Copies of this patent or patent application publication with color drawings will be provided by the Office upon request and payment of the necessary fee

DESCRIPTION OF EMBODIMENTS

Figure 1:
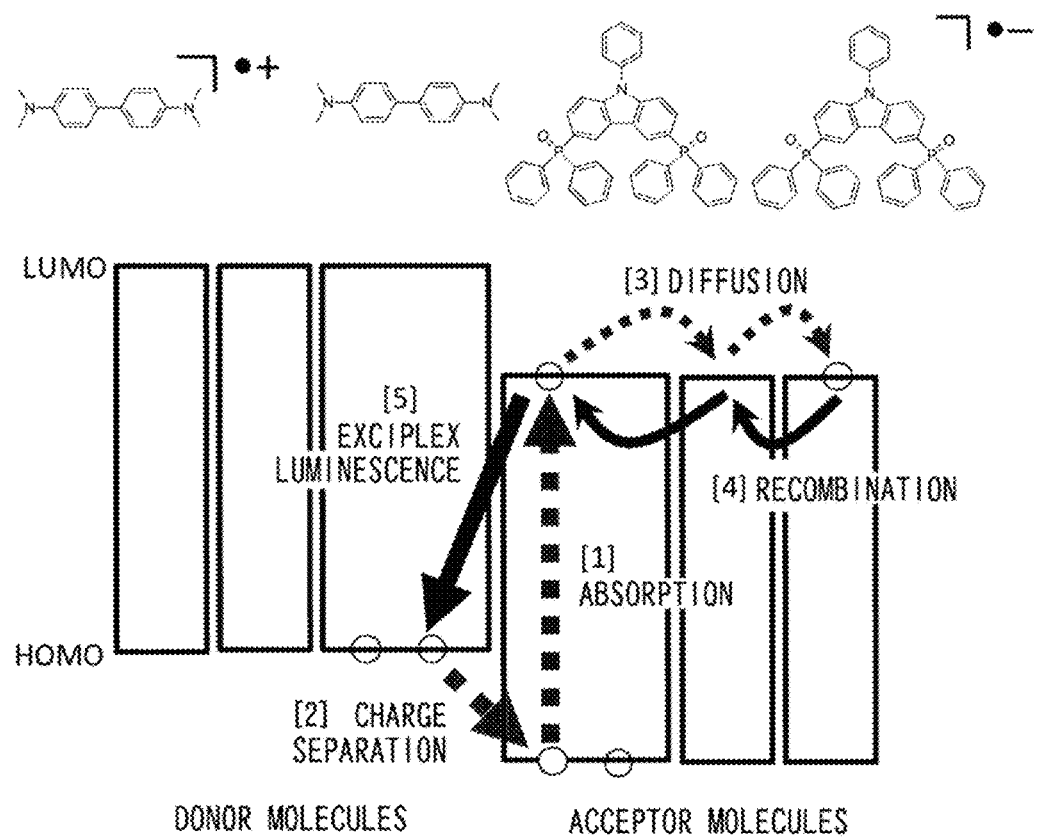
FIG. 1 is a schematic figure illustrating the luminescence mechanism of the long persistent luminescence emitter of the invention
Figure 1:
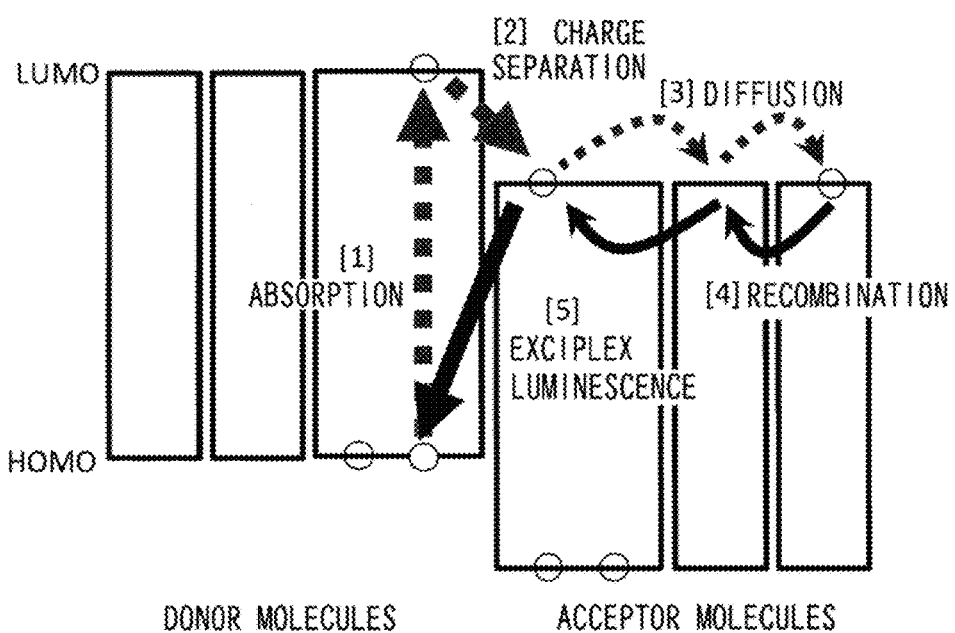

The contents of the invention are explained in detail below. Although the explanations of the constituent features described below are sometimes given based on typical embodiments or specific examples of the invention, the invention is not limited to the embodiments or the specific examples. A range indicated using "to" in this description means a range which includes the values before and after "to" as the lower limit and the upper limit, respectively. The kind of isotope of a hydrogen atom present in the molecule of a compound used in the invention is not particularly limited. For example, all the hydrogen atoms in a molecule may be $^1H$, or a part or all of the hydrogen atoms may be $^2H$ (deuterium D).

The "room temperature" in this description means 20° C.

An "electron-withdrawing group" in this description means a substituent with a positive Hammett $\sigma_p$ value, and an "electron-donating group" means a substituent with a negative Hammett $\sigma_p$ value. For the explanations of Hammett $\sigma_p$ values and the values of specific substituents, the descriptions of $\sigma_p$ values in Hansch, C. et. al., Chem. Rev., 91, 165-195 (1991) can be referred to.

Long Persistent Luminescence Emitter

The long persistent luminescence emitter of the invention has an electron-donating molecule that is stable in the radical cation state and an electron-accepting molecule that is stable in the radical anion state, and luminescence is observed at 10 K after photo-irradiation of the long persistent luminescence emitter stops.

The "electron-donating molecule" in the invention means a molecule which releases an electron upon photo-irradiation of the long persistent luminescence emitter and is converted to the radical cation state. The "electron-accepting molecule" in the invention means a molecule which receives the electron released from the electron-donating molecule and is converted to the radical anion state. The presence of a radical such as a "radical cation" and a "radical anion" can be confirmed by ESR (Electron Spin Resonance) measurement or the like.

The "exciplex luminescence" in the invention means luminescence from an excited state (exciplex) which is generated when an electron-donating molecule associates with an electron-accepting molecule. The luminescence spectrum pattern of the exciplex luminescence is different from those of the luminescence observed from the electron-donating molecules alone and of the luminescence observed from the electron-accepting molecules alone. That "luminescence is observed at 10 K" in the invention means that luminescence with a different luminescence spectrum pattern from those of the luminescence observed from the electron-donating molecules alone and of the luminescence observed from the electron-accepting molecules alone is observed at 10 K upon photo-irradiation of the long persistent luminescence emitter. Here, the luminescence spectrum pattern of the long persistent luminescence emitter of the invention has a different luminescence spectrum shape from those of the luminescence spectrum observed from the electron-donating molecules alone and of the luminescence spectrum observed from the electron-accepting molecules alone. This means: the wavelength of the maximum luminescence may be different; the half width or the rising slope of a luminescence peak may be different; or the number of luminescence peaks may be different.

Such luminescence is observed from the long persistent luminescence emitter of the invention at 10 K (preferably also at 20° C.). The radical cation state of the electron-donating molecules is stable, and the radical anion state of the electron-accepting molecules is stable. It is presumed that, due to these features, electron-donating molecules in the radical cation state and electron-accepting molecules in the radical anion state accumulate in the long persistent luminescence emitter during photo-irradiation and that the luminescence continues by the recombination of the molecules even after the photo-irradiation stops. Accordingly, the long persistent luminescence emitter can continue to exhibit luminescence for a long time.

Here, in this description, the luminescence after photo-irradiation stops is sometimes called "persistent luminescence", and the length of time from the point at which the photo-irradiation stops to the point at which the emission intensity can no longer be detected is sometimes called "persistent luminescence duration time". The long persistent luminescence emitter in the present application means a long persistent luminescence emitter having persistent luminescence duration time of 0.1 seconds or longer. The persistent luminescence duration time of the long persistent luminescence emitter of the invention is preferably one second or longer, more preferably five seconds or longer, further preferably five minutes or longer, still further preferably 20 minutes or longer. The long persistent luminescence emitter of the invention preferably achieves not only such long persistent luminescence duration time at 10 K but also such long persistent luminescence duration time at 20° C.

The emission intensity can be measured using, for example, a spectrometer (manufactured by Hamamatsu Photonics K.K., PMA-50). The emission intensity of luminescence of less than 0.01 cd/m$^2$ can be considered as undetectable.

A presumed luminescence mechanism of the long persistent luminescence emitter is explained below referring to FIG. 1. A number in square brackets in the following explanations corresponds to the same number in square brackets in FIG. 1 and indicates the place of each luminescence process. Although specific structural formulae of the electron-donating and electron-accepting molecules are shown in FIG. 1, the electron-donating and electron-accepting molecules represented by these structural formulae are examples, and the electron-donating molecules and the electron-accepting molecules which can be used in the invention should not be construed as being limited by these specific examples.

As shown in the figure at the top of FIG. 1, when light is applied to the long persistent luminescence emitter, an electron-accepting molecule absorbs the light, and an electron is transferred from the HOMO (Highest Occupied Molecular Orbital) to the LUMO (Lowest Unoccupied Molecular Orbital) (1). An electron moves from the HOMO of an electron-donating molecule to the HOMO of the electron-accepting molecule (2). In this manner, a charge-separated state is generated by an electron-donating molecule in the radical cation state and an electron-accepting molecule in the radical anion state. The electron that has been transferred to the LUMO of the electron-accepting molecule moves to the LUMO of adjacent electron-accepting molecules, from one to another, and is diffused (3). When the diffused electron reaches the interface between the electron-donating molecule area and the electron-accepting molecule area, the electron recombines with a hole of an electron-donating molecule at the interface (4), and energy is generated by the recombination. Using the recombination energy, for example, the electron-donating molecule associates with the electron-accepting molecule to form an exciplex (excited state) (5). The probabilities of the excited singlet state $S_1$ and the excited triplet state $T_1$ here are 25% and 75%, respectively. Fluorescence is emitted when the excited singlet state $S_1$ returns to the ground state, while phosphorescence is emitted when the excited triplet state $T_1$ returns to the ground state. Alternatively, reverse intersystem crossing occurs from the excited triplet state $T_1$ to the excited singlet state $S_1$, and fluorescence is emitted when the excited singlet state $S_1$ returns to the ground state. The fluorescence emitted through reverse intersystem crossing is fluorescence observed later than the fluorescence from an excited singlet state $S_1$ which has been directly transferred from the ground state and is called "delayed fluorescence" in this description.

Here, because the electron-donating molecule and the electron-accepting molecule are spatially apart in the exciplex formed by the electron-donating molecule and the electron-accepting molecule, the difference $\Delta E_{ST}$ between the lowest excited singlet energy level and the lowest excited triplet energy level can be made very small compared to the case where an electron donor and an electron acceptor are present in one molecule. As a result, the reverse intersystem crossing occurs with a high probability, and the energy of the excited triplet state $T_1$ can also be used effectively for fluorescence emission. Thus, high luminescence efficiency can be obtained. Moreover, in the invention, it is presumed that electron-donating molecules in the radical cation state and electron-accepting molecules in the radical anion state accumulate efficiently during photo-irradiation because the radical cation state of the electron-donating molecule and the radical anion state of the electron-accepting molecule generated in the process (2) are stable. Therefore, even after the photo-irradiation stops, the luminescence mechanism of (4) and the following processes works, and the long persistent luminescence emitter can continue to exhibit luminescence for a long time.

That the long persistent luminescence emitter exhibits luminescence by the above luminescence mechanism can be confirmed when a log-log graph showing the change in the emission intensity with time after applying light to the long persistent luminescence emitter for three minutes and stopping the photo-irradiation (the emission intensity on a logarithmic scale of the y-axis and the time on a logarithmic scale of the x-axis) is a linear graph. Here, light having the same wavelength as the absorption wavelength of the electron-accepting molecule or as the absorption wavelength of the electron-donating molecule can be used as the excitation light applied to the long persistent luminescence emitter.

It has been confirmed that, in the case of general phosphorescence due to photoluminescence of an organic compound, a semi-log graph of the emission intensity on a logarithmic scale of the y-axis and the time of the x-axis (time on a linear scale, but not on a logarithmic scale) is linear (first-order decay). On the other hand, the semi-log graph of the luminescence from the long persistent luminescence emitter of the invention is not linear, and the luminescence mechanism is clearly different from that of general phosphorescence.

Although the luminescence mechanism of the long persistent luminescence emitter of the invention has been explained above, the long persistent luminescence emitter of the invention may exhibit luminescence by processes other than the above processes. An example is as follows. When light is applied to the long persistent luminescence emitter, as shown in the figure at the bottom of FIG. 1, an electron-donating molecule absorbs light, and an electron is transferred from the HOMO to the LUMO (1) and then moves to the LUMO of an electron-accepting molecule (2). A charge-separated state may be generated in this manner. Whether the electron transition from the HOMO to the LUMO due to light absorption occurs in the electron-accepting molecules or in the electron-donating molecules depends on the ratio of the electron-donating molecules to the electron-accepting molecules and on the absorption wavelengths of the molecules. That is, when the proportion of the electron-donating molecules is relatively high or when the absorption wavelength of the electron-donating molecules is closer to the wavelength of the applied light than the absorption wavelength of the electron-accepting molecules, charge-separated states are more likely to be generated through the electron movement from the LUMO of the electron-donating molecules to the LUMO of the electron-accepting molecules.

Moreover, after a charge-separated state is generated, a hole generated in an electron-donating molecule may move to the HOMO of adjacent electron-donating molecules, from one to another, and diffuse. In this case, the diffused hole recombines with an electron of an electron-accepting molecule at the interface between the electron-donating molecule area and the electron-accepting molecule area, and energy is generated. Due to the recombination energy, light is emitted by the luminescence mechanism of (4) and the following processes. In the embodiment in which holes are diffused, only the holes may be diffused without the diffusion of electrons, but both electrons and holes may be diffused. In the long persistent luminescence emitter of the invention, however, the case in which only electrons are diffused and the case in which both electrons and holes are diffused are preferable to the case in which only holes are diffused.

The ratio of the electron-donating molecules to the electron-accepting molecules (molar ratio) is not particularly limited, but the proportion of the electron-accepting molecules is preferably higher than the proportion of the electron-donating molecules. Due to this, electrons move easily from the LUMO to the LUMO of the electron-accepting molecules, and the recombination of electrons and holes can be caused with a high probability. The electron-donating molecule content of the long persistent luminescence emitter will be explained specifically in the section of the electron-donating molecule content.

As described above, the long persistent luminescence emitter of the invention exhibits persistent luminescence using electron-donating molecules that are stable in the radical cation state and electron-accepting molecules that are stable in the radical anion state and can be achieved using organic compounds as the electron-donating and electron-accepting molecules without the use of any inorganic salts containing rare-earth elements. Therefore, the long persistent luminescence emitter can be produced using inexpensive organic compounds as raw materials by simple steps, and the excitation wavelength, the emission wavelength and the emission duration time can be regulated easily by molecular design of the electron-accepting molecules and the electron-donating molecules. Moreover, the transparency of organic compounds is easily realized. Organic compounds dissolve in many organic solvents, and a homogeneous paint containing organic compounds can be obtained. Thus, a uniform long persistent luminescent film composed of the long persistent luminescence emitter with an excellent pattern can be formed.

The electron-accepting and electron-donating molecules contained in the long persistent luminescence emitter and other components which are added according to the need are explained below.

Electron-Accepting Molecule

The electron-accepting molecule constituting the long persistent luminescence emitter of the invention is stable in the radical anion state and can exhibit persistent luminescence at 10 K when it is combined with an electron-donating molecule. For example, a molecule which forms an exciplex with an electron-donating molecule at 10 K (and preferably also at 20° C.) and emits light can be selected. The gap between the HOMO and the LUMO of the electron-accepting molecule is preferably 1.0 to 3.5 eV, more preferably 1.5 to 3.4 eV, further preferably 2.0 to 3.3 eV. With the gap, an electron can be transferred from the HOMO to the LUMO efficiently upon photo-irradiation of the long persistent luminescence emitter. The LUMO of the electron-accepting molecule is preferably 6.0 eV or less, more preferably 5.5 eV or less, further preferably 5.0 eV or less. With the LUMO, an electron moves easily from the LUMO to the LUMO of the electron-accepting molecules after a charge-separated state is generated, and the recombination with a hole can be caused with a high probability.

The HOMO of the electron-accepting molecule can be measured by photoelectron spectroscopy or cyclic voltammetry, and the LUMO can be determined by cyclic voltammetry or from the absorption spectrum.

The electron-accepting molecule preferably has a high glass transition temperature Tg so that the molecules can exist in the glass state at room temperature, and the electron-accepting molecule is preferably a molecule from which a high film density can be obtained when a film is formed. When the density of the electron acceptors in a film is high, an electron is easily diffused from the LUMO to the LUMO of the electron-accepting molecules after a charge-separated state is generated, and the recombination of an electron and a hole can be caused with a high probability.

In view of the stability of the radical anion, a compound having an atom with a high electronegativity and an electron-withdrawing group is preferably used as the electron-accepting molecule, and a compound having an atom with a high electronegativity and a conjugated system with an electron-withdrawing group is more preferably used.

A preferable example of the electron-accepting molecule is a compound containing one phosphine oxide structure $R_3P(=O)$ (wherein each R represents a substituent, and the three R's may be the same or different from each other) or more, and a further preferable example is a compound containing one phosphine oxide structure $R_3P(=O)$ or more and one hetero atom or more. The hetero atom may be N, O, S, P and the like. Only one kind thereof may be contained, or two or more kinds thereof may be contained. The number of the phosphine oxide structures contained in the electron-accepting molecule is preferably two or more, and in this case, the phosphine oxide structures may be the same or different from each other. At least one of the substituents R's of one of the phosphine oxide structures is preferably linked to a substituent R of another phosphine oxide structure through a hetero atom, and it is more preferable that at least one of the substituents R's is linked to a substituent R of another phosphine oxide structure through a hetero atom and that atoms which are not the atoms of the linked substituents R's bound to the hetero atom are linked to each other through a single bond.

The substituents R's of the phosphine oxide structures are each preferably a substituted or unsubstituted aryl group or a substituted or unsubstituted heteroaryl group. The explanation and the preferable scope of the aromatic ring constituting the aryl group and the specific examples of the aryl group in the case where $Ar^{11}$ and the like are each a substituted or unsubstituted aryl group below can be referred to for the explanation and a preferable scope of the aromatic ring constituting the aryl group here and for specific examples of the aryl group. The explanation and the preferable scope of the heterocycle constituting the heteroaryl group and the specific examples of the heteroaryl group in the case where $Ar^{11}$ and the like are each a substituted or unsubstituted heteroaryl group below can be referred to for the explanation and a preferable scope of the heterocycle constituting the heteroaryl group here and for specific examples of the heteroaryl group. The specific examples and the preferable scope of the substituents which the aryl group and the heteroaryl group of $Ar^{11}$ and the like may have can be referred to for specific examples and a preferable scope of the substituents which the aryl group and the heteroaryl group here may have.

The electron-accepting molecule is preferably a compound represented by the following general formula (1).

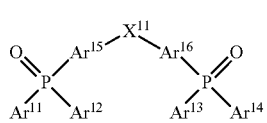

General Formula (1)

In the general formula (1), $Ar^{11}$ to $Ar^{14}$ each independently represent a substituted or unsubstituted aryl group or a substituted or unsubstituted heteroaryl group and are preferably a substituted or unsubstituted aryl group. $Ar^{11}$ to $Ar^{14}$ may be the same or different from each other. $Ar^{15}$ and Ar[16] each independently represent a substituted or unsubstituted arylene group or a substituted or unsubstituted heteroarylene group, and Ar[15] and Ar[16] may be linked to each other through a single bond and form a condensed ring structure. Ar[15] and Ar[16] may be the same or different from each other. Ar[15] and Ar[16] are preferably substituted or unsubstituted arylene groups, and it is more preferable that the arylene groups are linked to each other through a single bond and form a condensed ring structure.

The aromatic ring constituting the aryl group in the case where Ar[11] to Ar[14] are each a substituted or unsubstituted aryl group and the aromatic ring constituting the arylene group in the case where Ar[15] and Ar[16] are each a substituted or unsubstituted arylene group may be each a monocyclic ring, a condensed ring formed by condensation of two or more aromatic rings or linked rings formed by two or more linked aromatic rings. When two or more aromatic rings are linked, the rings may be linked linearly or linked in a branch structure. The number of the carbon atoms of the aromatic ring constituting the aryl group or the arylene group is preferably 6 to 40, more preferably 6 to 22, further preferably 6 to 18, still further preferably 6 to 14, particularly preferably 6 to 10. Specific examples of the aryl group include phenyl group, naphthalenyl group and biphenyl group. Specific examples of the arylene group include phenylene group, naphthalenediyl group and biphenyldiyl group. Of these examples, a substituted or unsubstituted phenyl group is particularly preferable as Ar[11] to Ar[14]. A substituted or unsubstituted phenylene group is particularly preferable as Ar[15] and Ar[16], and it is particularly preferable that the phenylene groups are linked to each other through a single bond and form a tricyclic structure (a tricyclic structure of a benzene ring, a five-membered ring including $X^{11}$ and a benzene ring).

The heterocycle constituting the heteroaryl group in the case where Ar[11] to Ar[14] are each a substituted or unsubstituted heteroaryl group and the heterocycle constituting the heteroarylene group in the case where Ar[15] and Ar[16] are each a substituted or unsubstituted heteroarylene group may be each a monocyclic ring, a condensed ring formed by one heterocycle or more condensed with an aromatic ring or with a heterocycle or linked rings formed by one heterocycle or more linked to an aromatic ring or to a heterocycle. The number of the carbon atoms of the heterocycle constituting the heteroaryl group is preferably 3 to 40, more preferably 5 to 22, further preferably 5 to 18, still further preferably 5 to 14, particularly preferably 5 to 10. The hetero atom constituting the heterocycle is preferably nitrogen atom. Specific examples of the heterocycle include pyridine ring, pyridazine ring, pyrimidine ring, triazole ring and benzotriazole ring.

Examples of the substituents which the aryl group and the heteroaryl group of Ar[11] to Ar[14] may have and the substituents which the arylene group and the heteroarylene group of Ar[15] and Ar[16] may have include hydroxy group, a halogen atom, an alkyl group having 1 to 20 carbon atoms, an alkoxy group having 1 to 20 carbon atoms, an alkylthio group having 1 to 20 carbon atoms, an alkyl-substituted amino group having 1 to 20 carbon atoms, an aryl-substituted amino group having 1 to 20 carbon atoms, an aryl group having 6 to 40 carbon atoms, a heteroaryl group having 3 to 40 carbon atoms, an alkenyl group having 2 to 10 carbon atoms, an alkynyl group having 2 to 10 carbon atoms, an alkylamide group having 2 to 20 carbon atoms, an arylamide group having 7 to 21 carbon atoms, a trialkylsilyl group having 3 to 20 carbon atoms and the like. Of these specific examples, those which can further have a substituent may be substituted. More preferable substituents are an alkyl group having 1 to 20 carbon atoms, an alkoxy group having 1 to 20 carbon atoms, an alkylthio group having 1 to 20 carbon atoms, an alkyl-substituted amino group having 1 to 20 carbon atoms, an aryl-substituted amino group having 1 to 20 carbon atoms, an aryl group having 6 to 40 carbon atoms and a heteroaryl group having 3 to 40 carbon atoms.

$X^{11}$ represents $NR^{11}$, O or S, and $R^{11}$ represents a hydrogen atom or a substituent. Examples of the substituent which $R^{11}$ may represent include an alkyl group having 1 to 20 carbon atoms, an aryl group having 6 to 40 carbon atoms, a heteroaryl group having 3 to 40 carbon atoms, an alkenyl group having 2 to 10 carbon atoms, an alkynyl group having 2 to 10 carbon atoms and the like. These substituents may further have a substituent. $R^{11}$ is preferably a hydrogen atom or a substituted or unsubstituted aryl group, more preferably a substituted or unsubstituted aryl group, further preferably a substituted or unsubstituted phenyl group.

The electron-accepting molecule used in the invention is also preferably a compound having any of the following partial structures. Ar in the following partial structure represents an aromatic ring or a heteroaromatic ring and may be a fused ring. Hydrogen atoms of the following partial structures which can be substituted may be substituted. Also, the electron-accepting molecule may be a polymer obtained by introducing a polymerizable group to any of these partial structures or to the electron-accepting molecule and polymerizing it as a monomer, or the electron-accepting molecule may be a non-polymer molecule. In the case of a polymer, the number of repeating units n may be two or more and can be, for example, four or more, six or more, eight or more or 10 or more. In the case of a polymer, the molecular weight can be, for example, 1000 or more, 2000 or more, 5000 or more or 10000 or more. When a polymer is used, the lifetime of long persistent luminescence can be prolonged more.

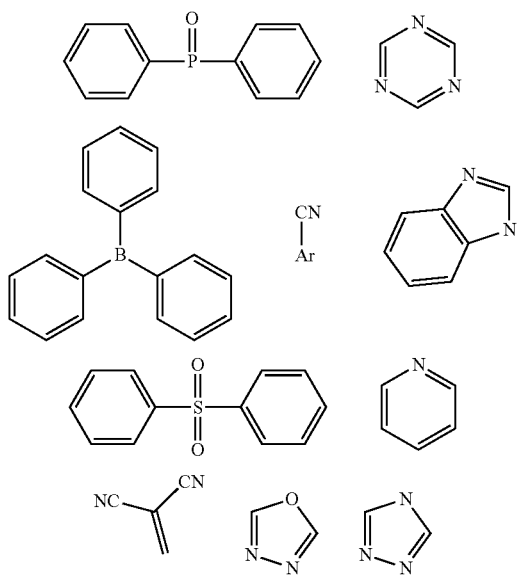

Examples of the general formula of an electron-accepting molecule containing a diphenylphosphine partial structure include the general formula (2) and the general formula (3) below.

General Formula (2)

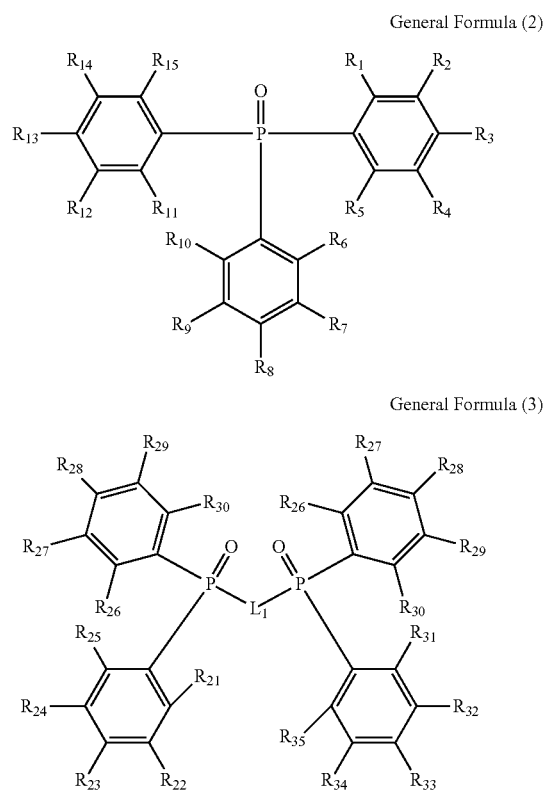

General Formula (3)

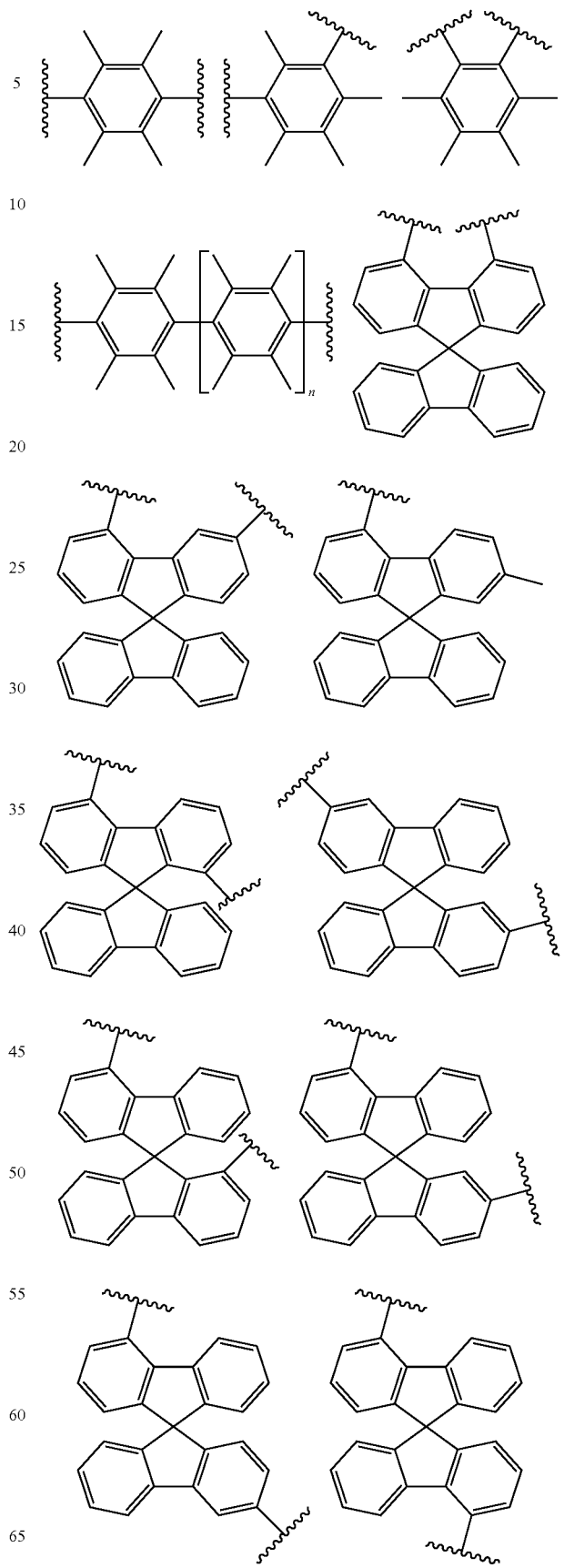

In the general formula (2) and the general formula (3), $L_1$ represents a divalent linking group and is preferably a substituted or unsubstituted alkylene group, a substituted or unsubstituted arylene group, a substituted or unsubstituted heteroarylene group, a group which may have substituents linked through a hetero atom or a group formed by two or more kinds of these linking groups linked to each other. $R_1$ to $R_{34}$ each independently represent a hydrogen atom or a substituent and are preferably a hydrogen atom, a substituted or unsubstituted alkyl group, a substituted or unsubstituted alkoxy group, a substituted or unsubstituted aryl group or a substituted or unsubstituted heteroaryl group. The substituted alkyl group and the substituted alkoxy group here include those having a polyalkyleneoxy structure.

Although preferable specific examples of $L_1$ in the general formula (2) and the general formula (3) are shown below, the groups which can be used in the invention are not limited to the following specific examples. In this regard, each n represents an integer of one or larger.

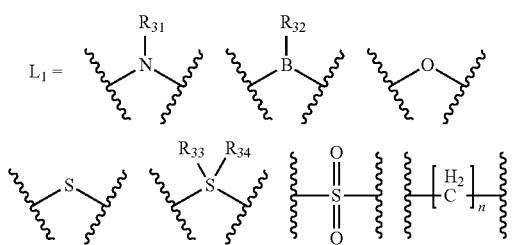

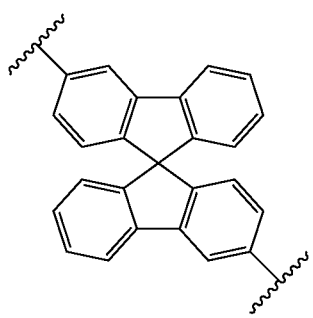
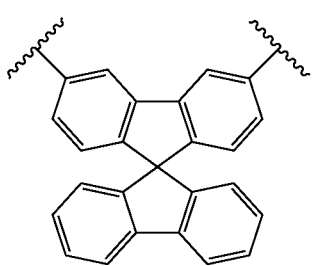
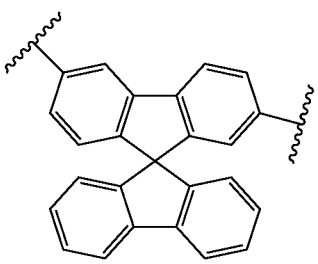
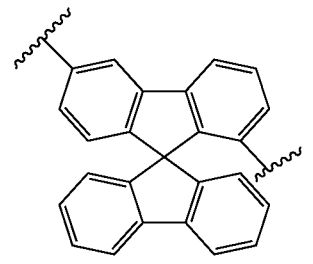
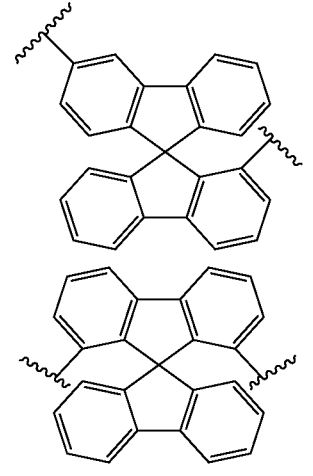
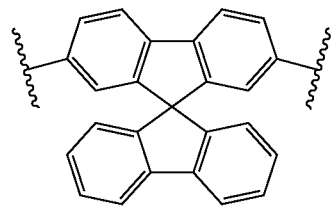
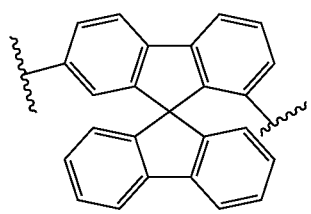
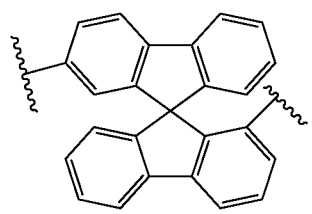
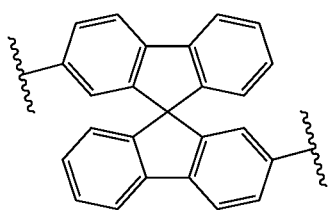
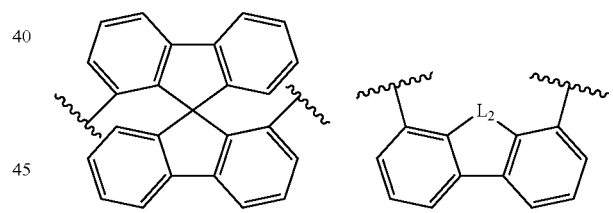
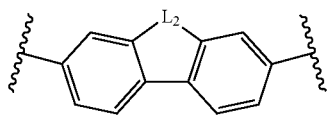
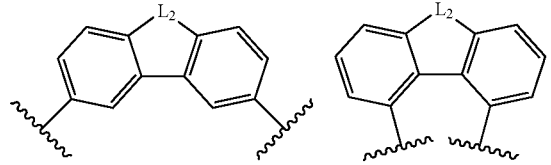
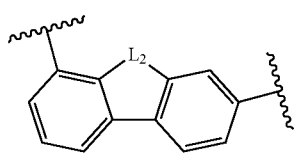

-continued

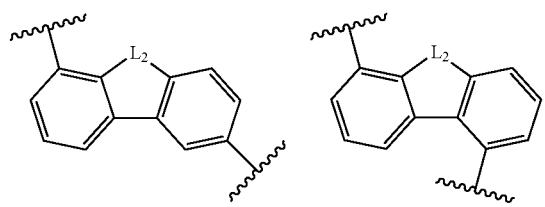

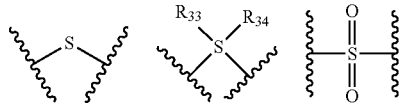

Although preferable specific examples of $R_1$ to $R_{34}$ in the general formula (2) and the general formula (3) are shown below, the groups which can be used in the invention are not limited to the following specific examples.

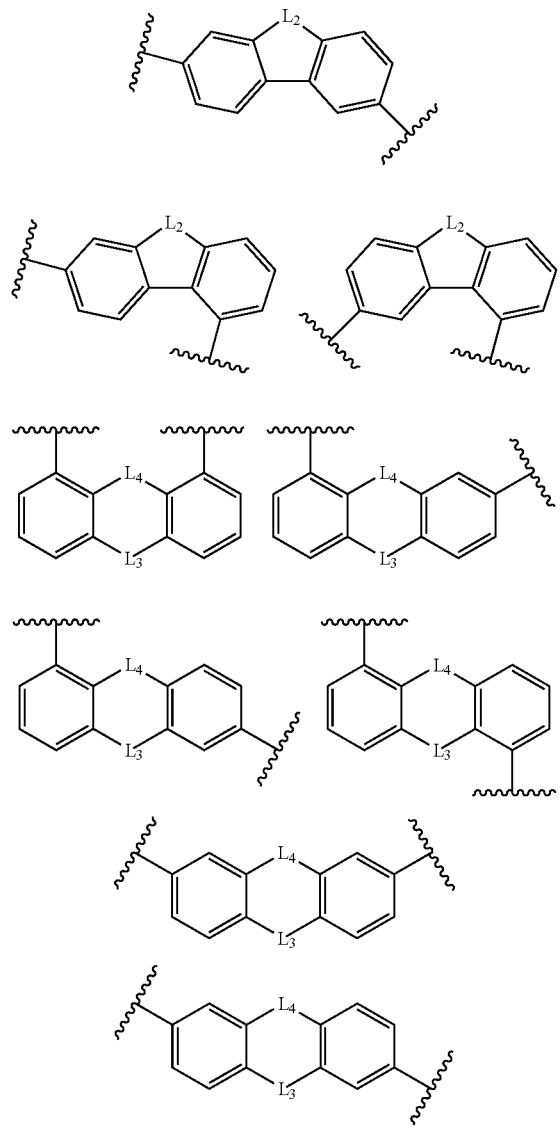

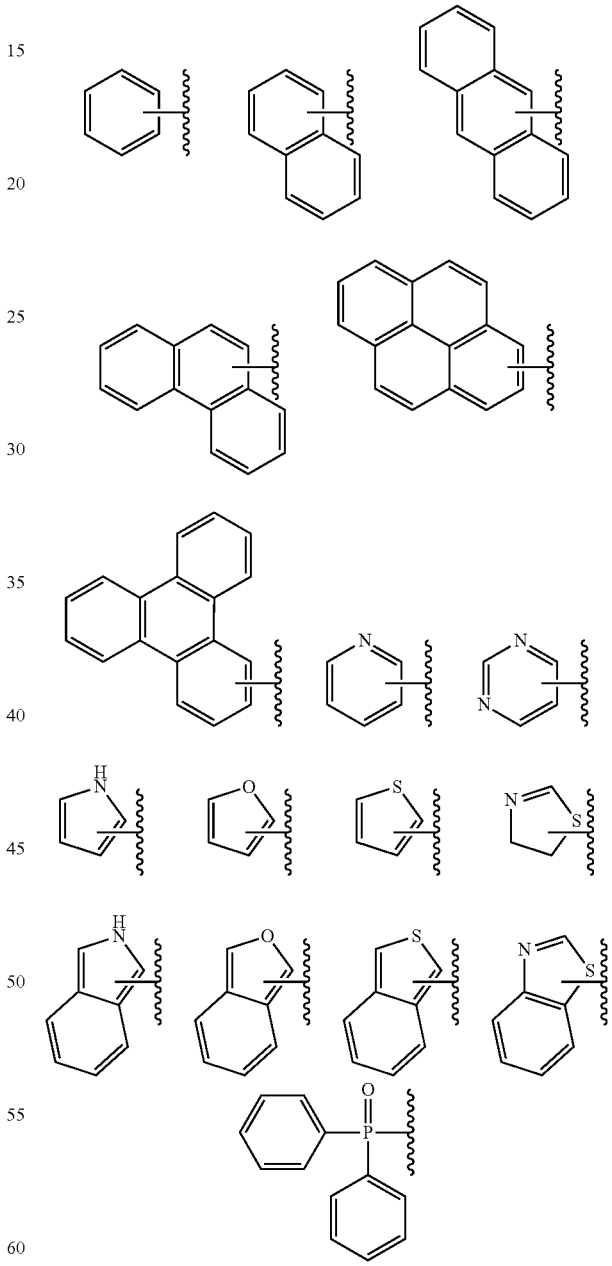

$L_2$ to $L_4$ in each formula are linking groups which link through one or two atoms and are preferably linking groups which link through an atom. Examples of preferable linking groups are the following linking groups.

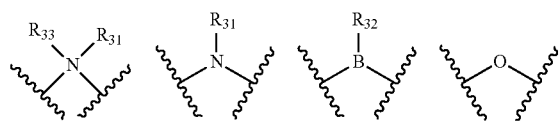

Specific examples of the electron-accepting molecule having a diphenylphosphine partial structure are shown below. In the following specific examples, R represents an alkyl group or a phenyl group, and m and n's each independently represent an integer of two or larger.

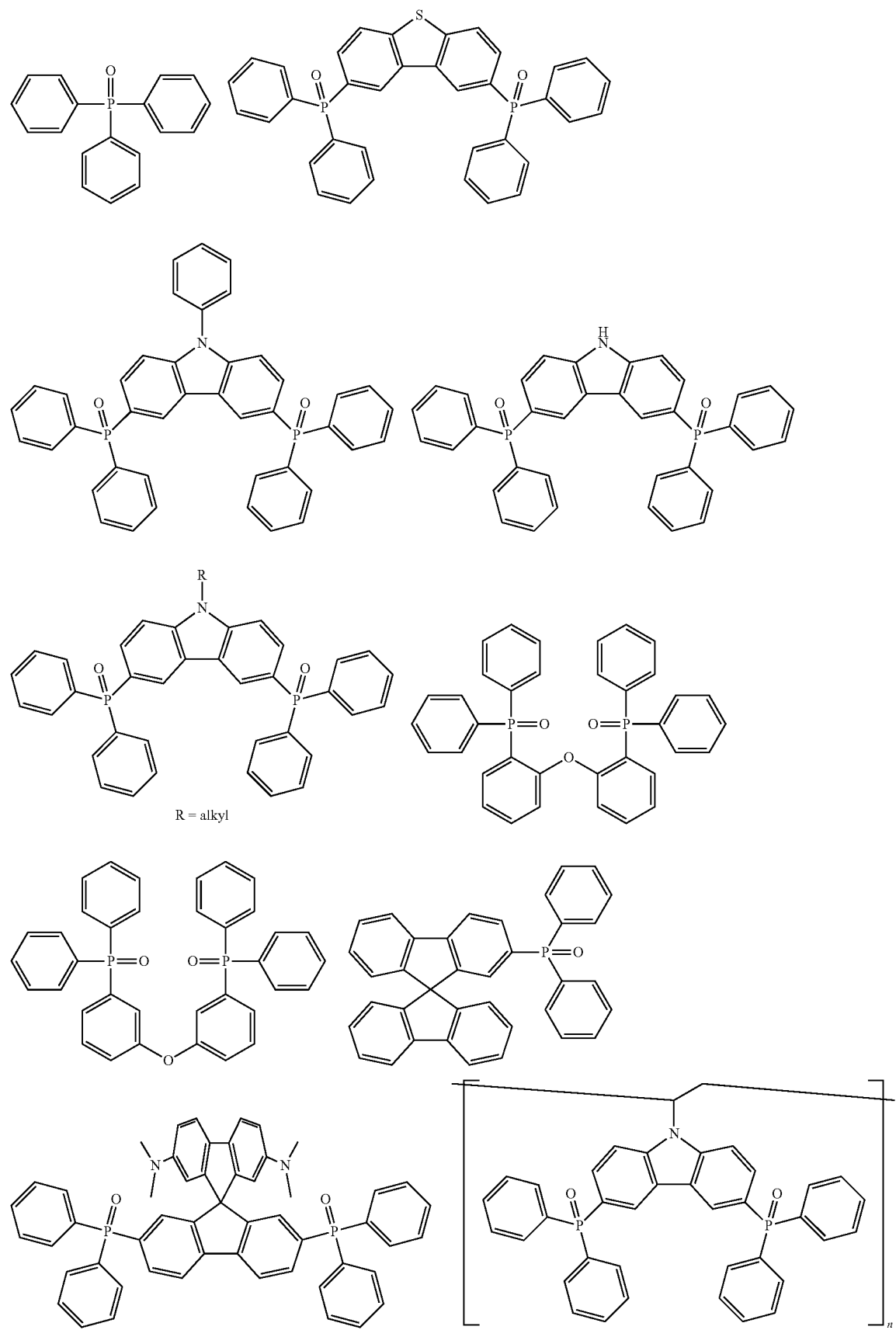

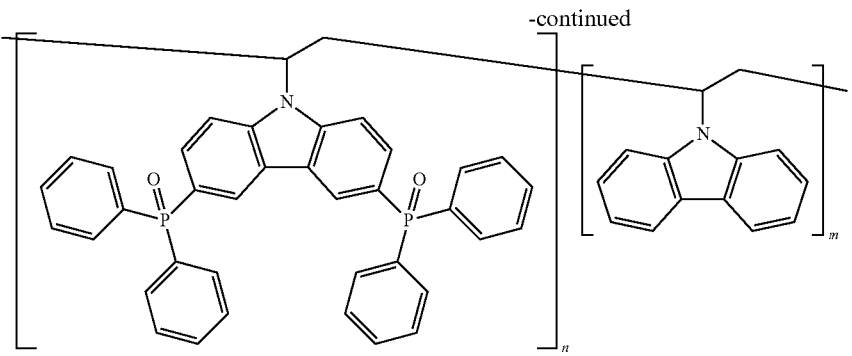
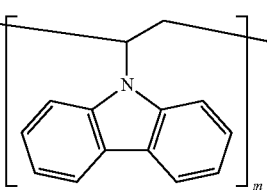

Other preferable compounds which can be used as the electron-accepting molecule are shown below. Preferable compounds include the specific electron-accepting molecules used in the Examples described below. In this regard, however, the electron-accepting molecules which can be used in the invention should not be construed as being limited by these specific examples.

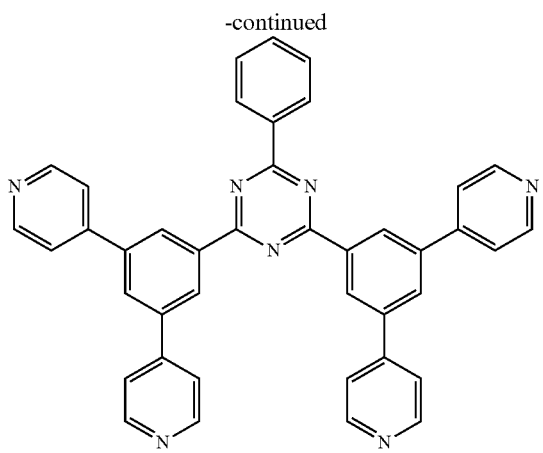
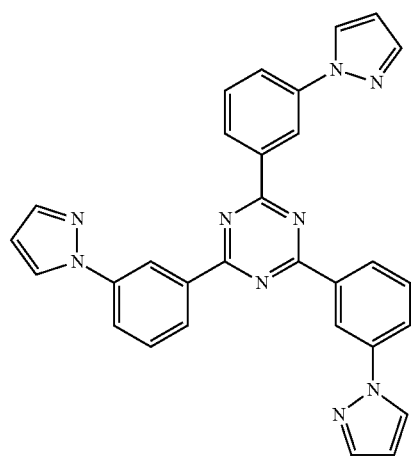
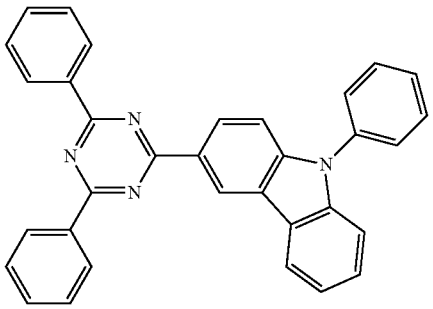
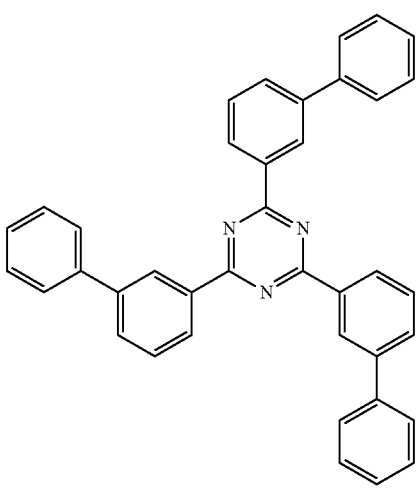
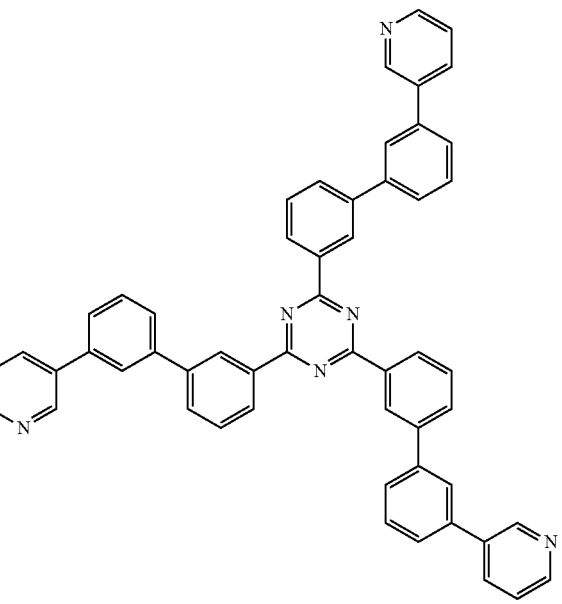

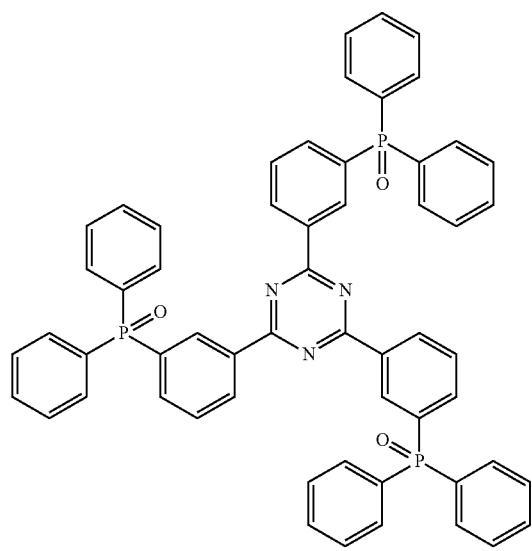
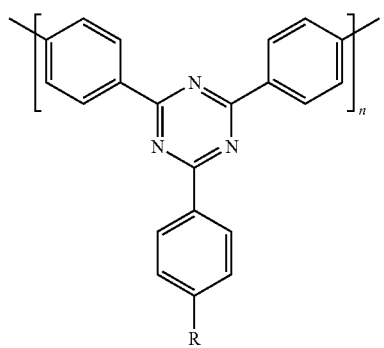
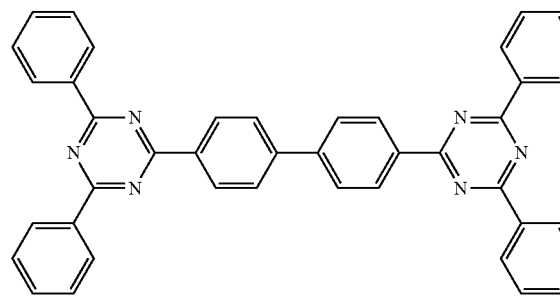
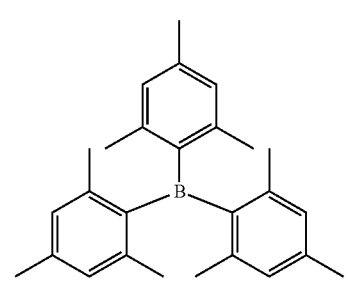
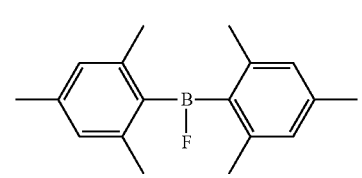
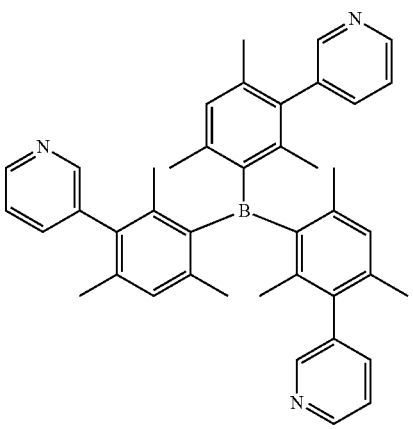
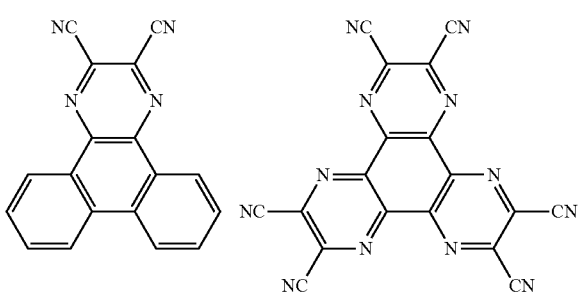
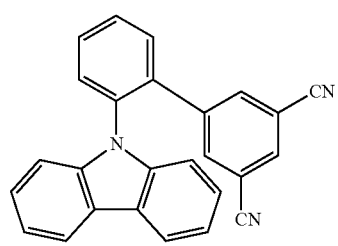
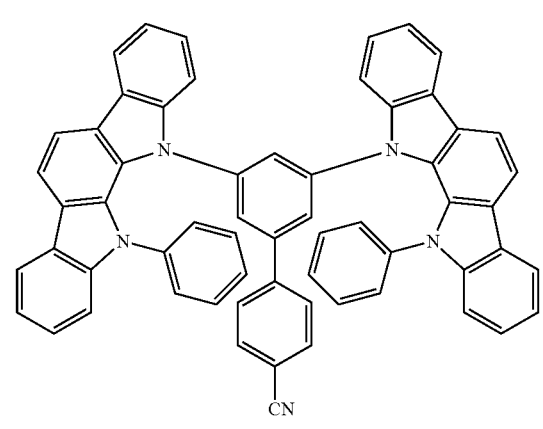

27
-continued
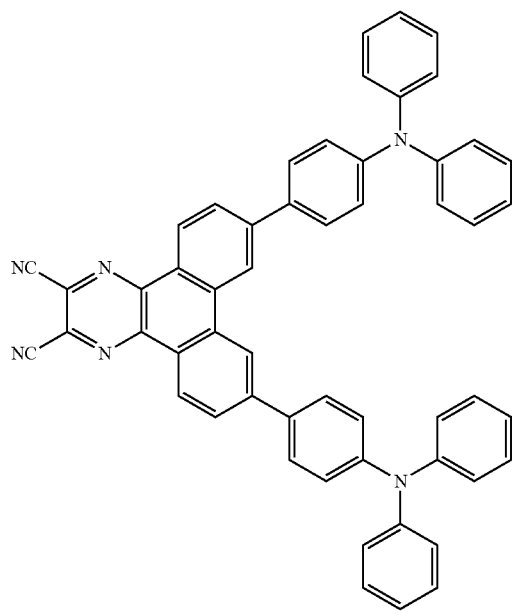
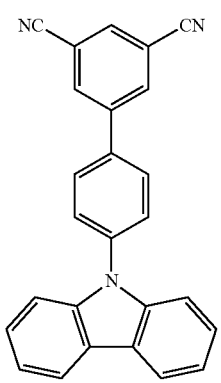
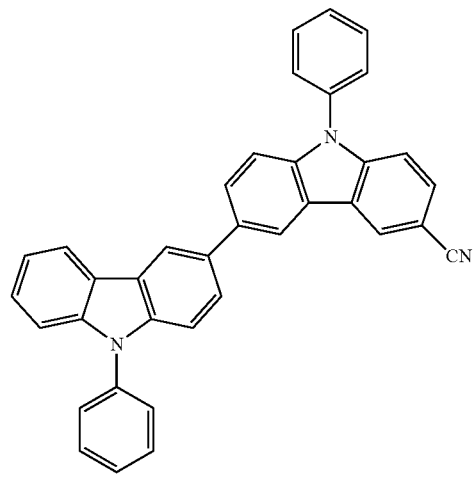
28
-continued
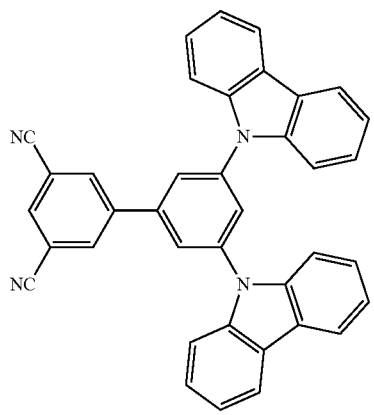
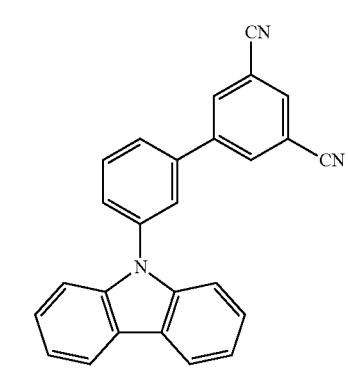
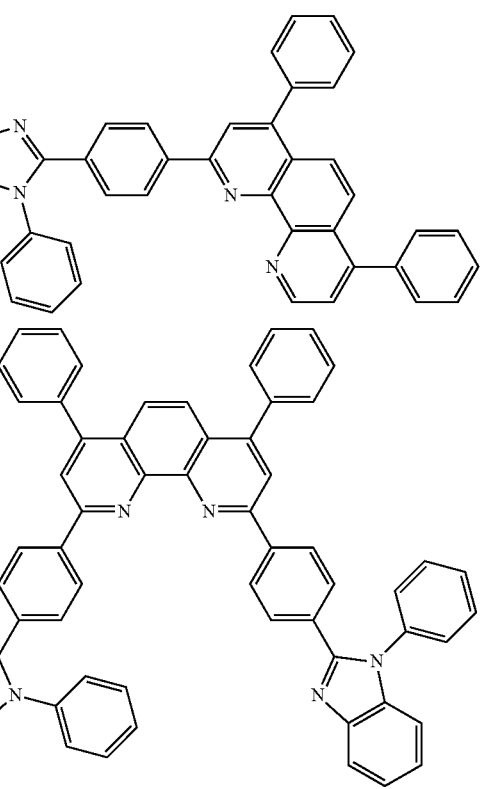

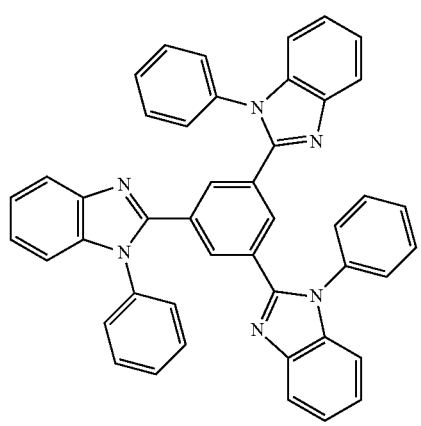
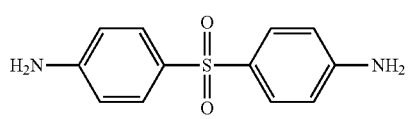
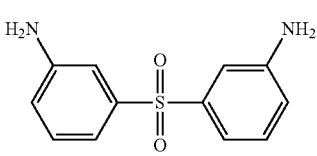
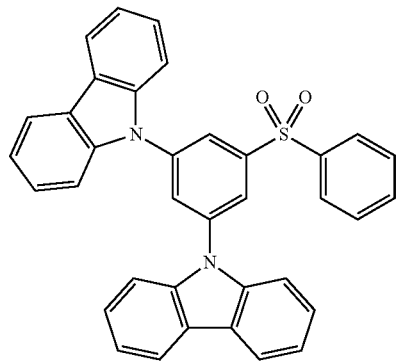
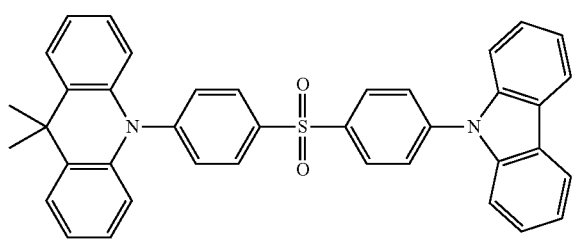
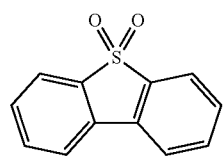
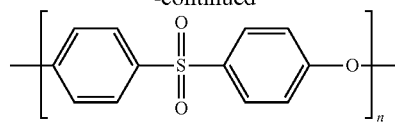
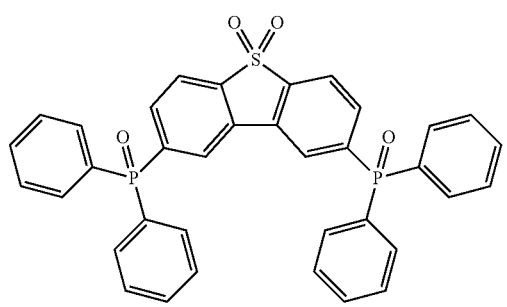
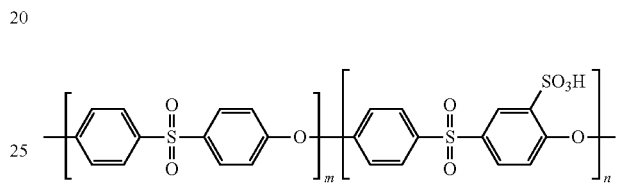
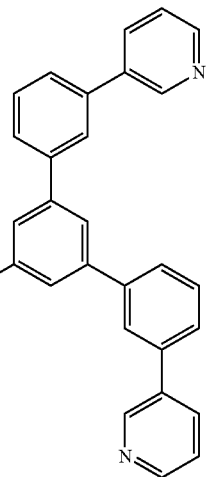
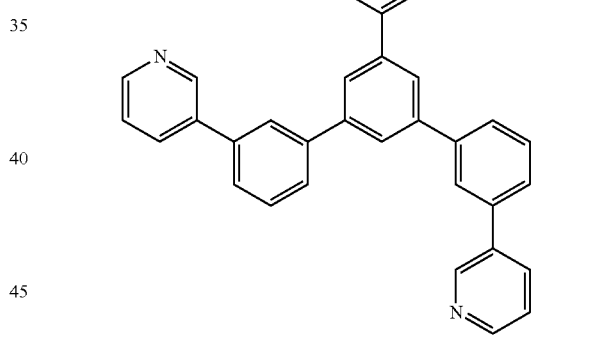
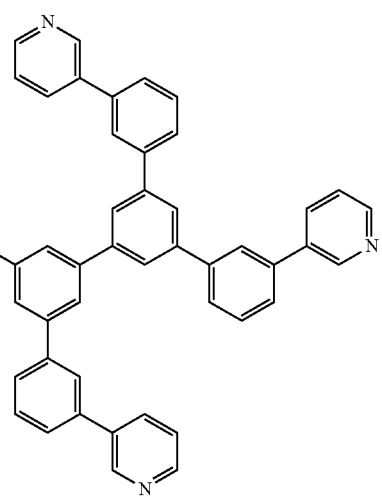

31
-continued
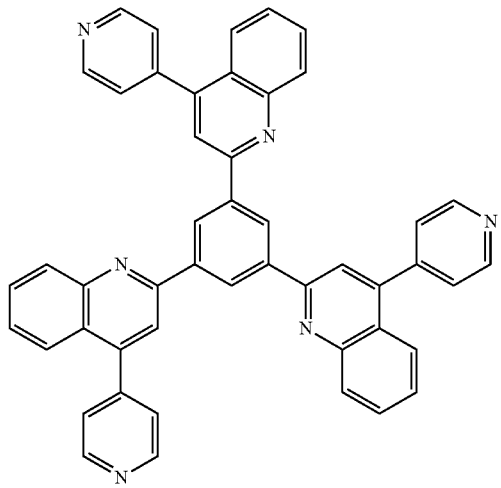
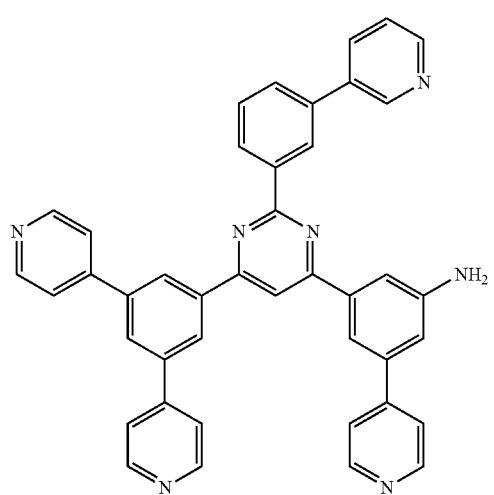
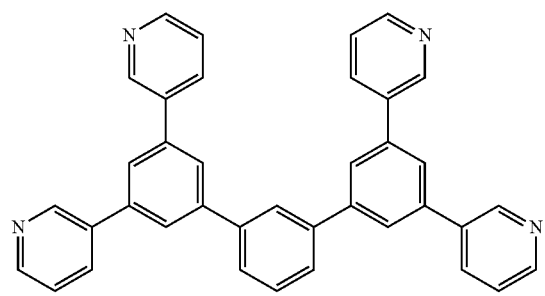
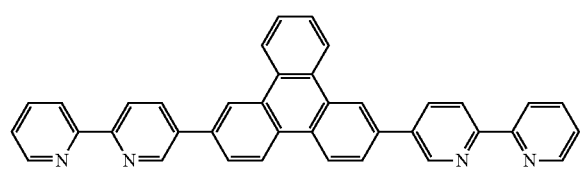
32
-continued
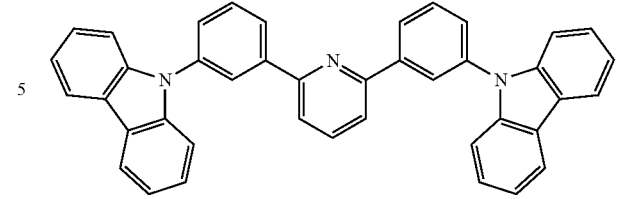
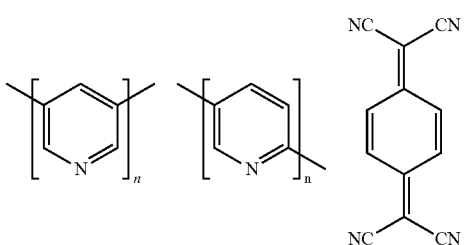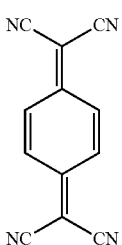
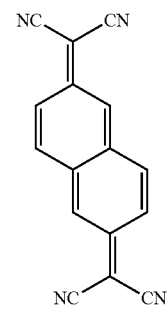
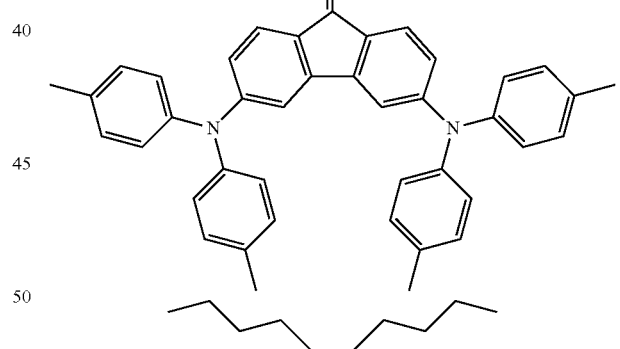
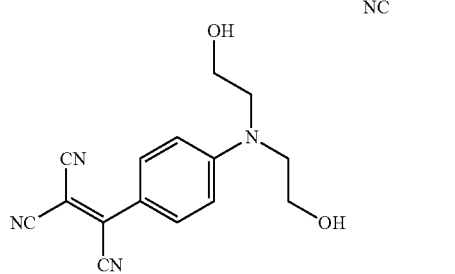

33
-continued
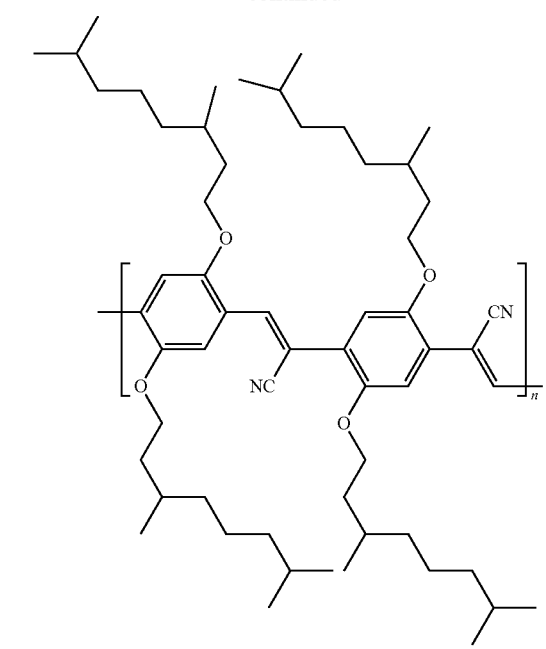
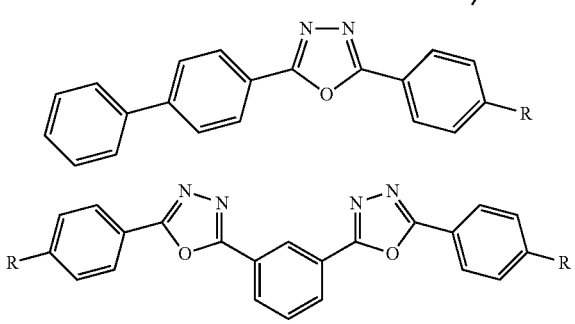
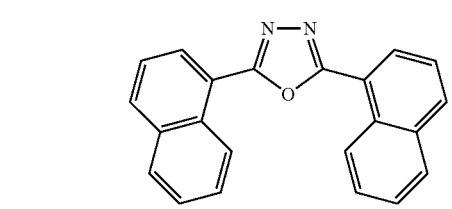
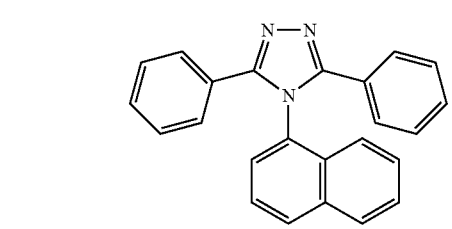
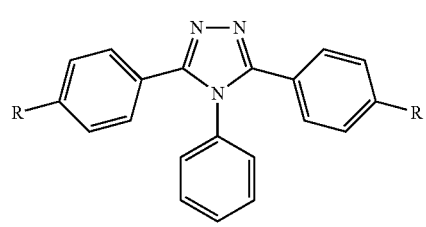
34
-continued
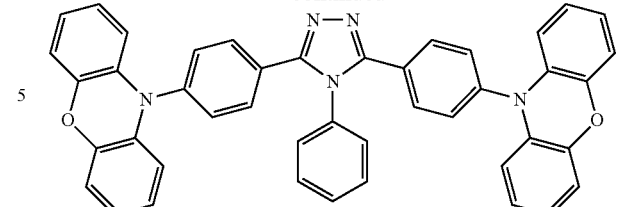
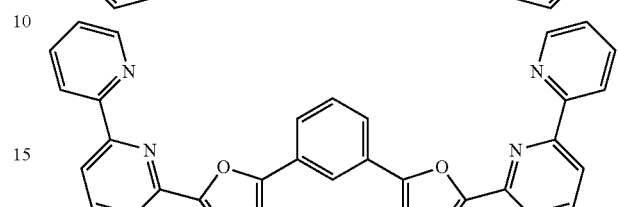
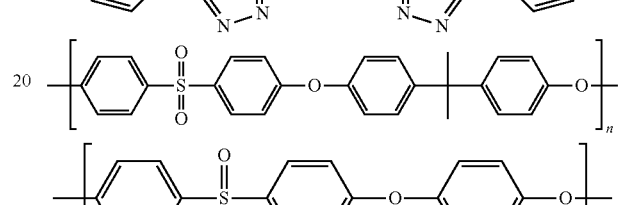
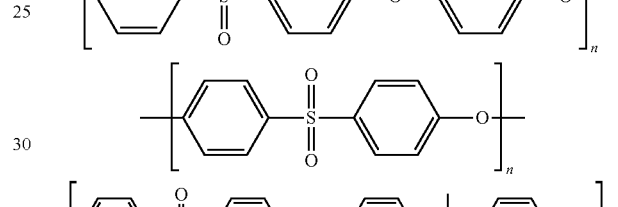
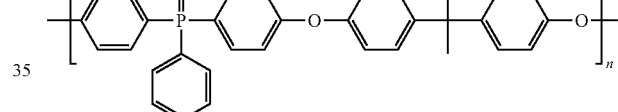
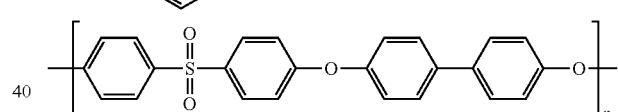
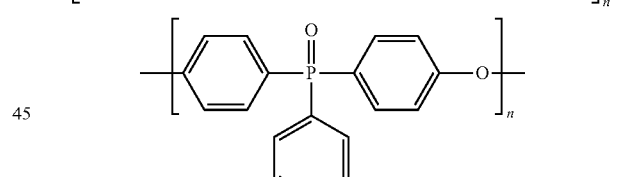
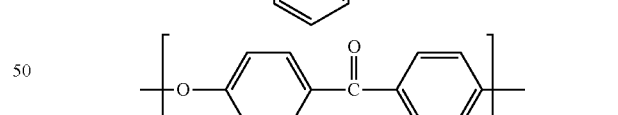
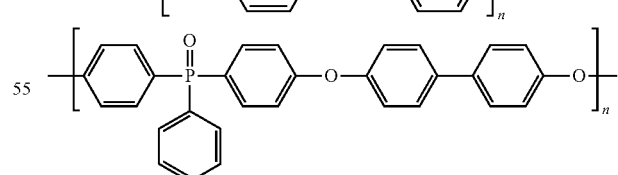
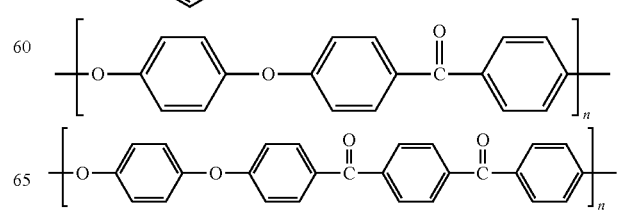

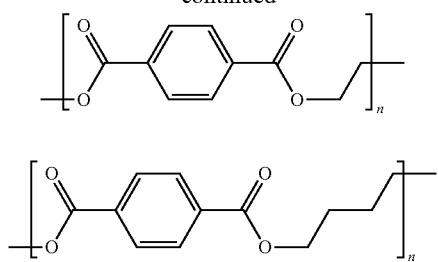

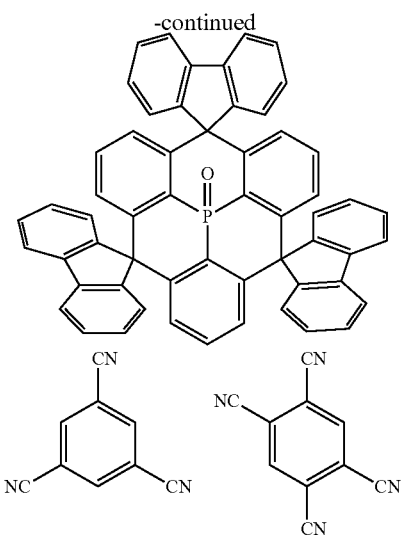

Electron-Donating Molecule

The electron-donating molecule constituting the long persistent luminescence emitter is stable in the radical cation state and can exhibit persistent luminescence at 10 K when it is combined with an electron-accepting molecule. For example, a molecule which forms an exciplex with an electron-accepting molecule at 10 K (and preferably also at 20° C.) and emits light can be selected. It is preferable that the HOMO of the electron-donating molecule is higher than the HOMO of the electron-accepting molecule and that the LUMO is higher than the LUMO of the electron-accepting molecule. Due to this, an electron moves easily from the HOMO of the electron-donating molecule to the HOMO or the LUMO of the electron-accepting molecule, and a charge-separated state can be generated efficiently. Specifically, the HOMO of the electron-donating molecule is preferably −3.5 to −8.0 eV, more preferably −4.0 to −7.0 eV, further preferably −4.5 to −6.0 eV.

The HOMO of the electron-donating molecule can be measured by photoelectron spectroscopy or cyclic voltammetry, and the LUMO can be determined by cyclic voltammetry or from the absorption spectrum.

In view of the stability of the radical cation, as the electron-donating molecule, a compound having an electron-donating group is preferably used, and a compound having a conjugated system with an electron-donating group is more preferably used. A compound having a dialkylamino group and an aromatic ring or a compound having a diphenylamino group (including a compound in which the two phenyl groups constituting the diphenylamino group are bound to each other) is further preferably used.

When the electron-donating molecule is a compound having a dialkylamino group and an aromatic ring, the aromatic ring may be an aromatic hydrocarbon or an aromatic heterocycle but is preferably an aromatic hydrocarbon. The explanation and the preferable scope of the aromatic ring constituting the arylene group in the case where $A^{15}$ and $Ar^{16}$ are each a substituted or unsubstituted arylene group above can be referred to for the explanation and a preferable scope of the aromatic hydrocarbon here. The explanation and the preferable scope of the heterocycle constituting the heteroarylene group in the case where $Ar^{15}$ and $Ar^{16}$ are each a substituted or unsubstituted heteroarylene group above can be referred to for the explanation and a preferable scope of the aromatic heterocycle here.

Of the examples, the aromatic ring is preferably a benzene ring or a biphenyl ring, more preferably a biphenyl ring. The aromatic ring may have a substituent. The specific examples and the preferable scope of the substituents which the arylene group and the like of $Ar^{15}$ and $Ar^{16}$ above may have can be referred to for specific examples and a preferable scope of the substituent which the aromatic ring may have. The dialkylamino group is preferably substituted to the aromatic ring. The number of the dialkylamino groups contained in the electron-donating molecule may be one, two or more but is preferably one to four, more preferably two or four, further preferably two. The explanation, the preferable scope and the specific examples of the alkyl group of $R^{21}$ and the like below can be referred to for the explanation, a preferable scope and specific examples of the alkyl groups of the dialkylamino group. The alkyl groups of the dialkylamino group may have a substituent. The explanation and the preferable scope of the substituent which the alkyl group of $R^{21}$ and the like may have can be referred to for the explanation and a preferable scope of the substituent. The electron-donating molecule is preferably a compound represented by the following general formula (4).

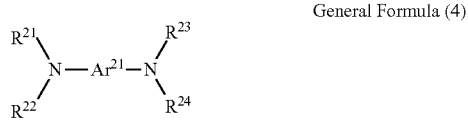

General Formula (4)

In the general formula (4), $Ar^{21}$ represents a substituted or unsubstituted arylene group. The explanation and the preferable scope of the aromatic ring constituting the arylene group and the specific examples of the arylene group in the case where $Ar^{15}$ and $Ar^{16}$ are each a substituted or unsubstituted arylene group above can be referred to for the explanation and a preferable scope of the aromatic ring constituting the arylene group of $Ar^{21}$ and for specific examples of the arylene group. $Ar^{21}$ is preferably a substituted or unsubstituted phenylene group or a substituted or unsubstituted biphenyldiyl group, more preferably a substituted or unsubstituted biphenyldiyl group. The specific examples and the preferable scope of the substituents which the arylene group and the like of $Ar^{15}$ and $Ar^{16}$ above may have can be referred to for specific examples and a preferable scope of the substituent which the arylene group here may have.

$R^{21}$ to $R^{24}$ each independently represent a substituted or unsubstituted alkyl group. $R^{21}$ to $R^{24}$ may be the same or different from each other. The alkyl group of $R^{21}$ to $R^{24}$ may be any of linear, branched and cyclic groups. The number of the carbon atoms is preferably 1 to 20, more preferably 1 to 10, further preferably 1 to 6. Examples include methyl group, ethyl group, n-propyl group, isopropyl group and the like. Examples of the substituent which the alkyl group may have include an aryl group having 6 to 40 carbon atoms, a heteroaryl group having 3 to 40 carbon atoms, an alkenyl group having 2 to 10 carbon atoms, an alkynyl group having 2 to 10 carbon atoms and the like. These substituents may further have a substituent.

Preferable compounds which can be used as the electron-donating molecule are shown below. Preferable compounds include the specific electron-donating molecules used in the Examples described below. In this regard, however, the electron-donating molecules which can be used in the invention should not be construed as being limited by these specific examples.

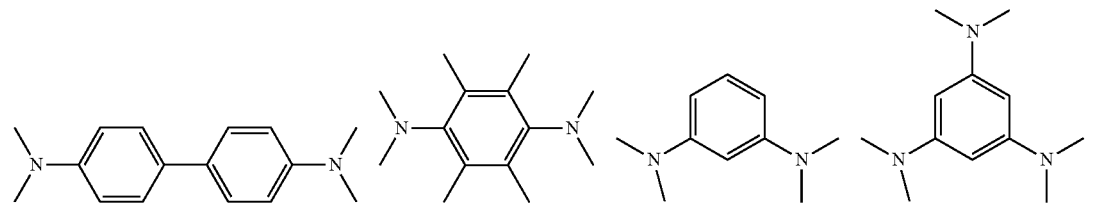

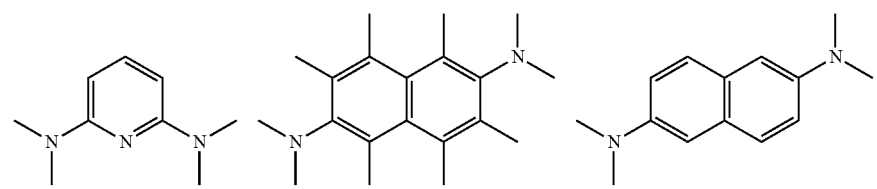

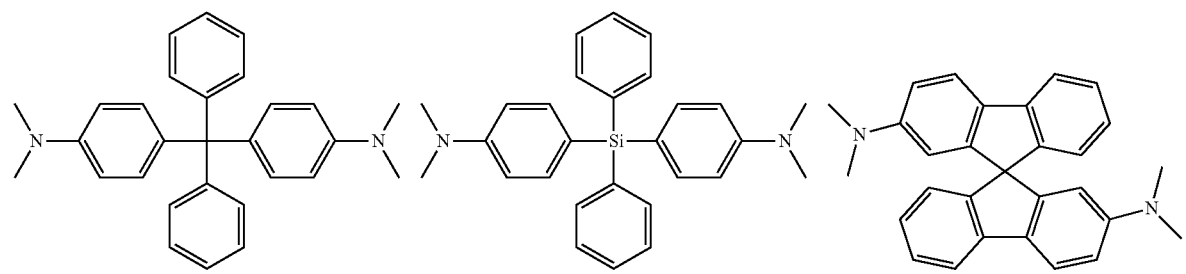

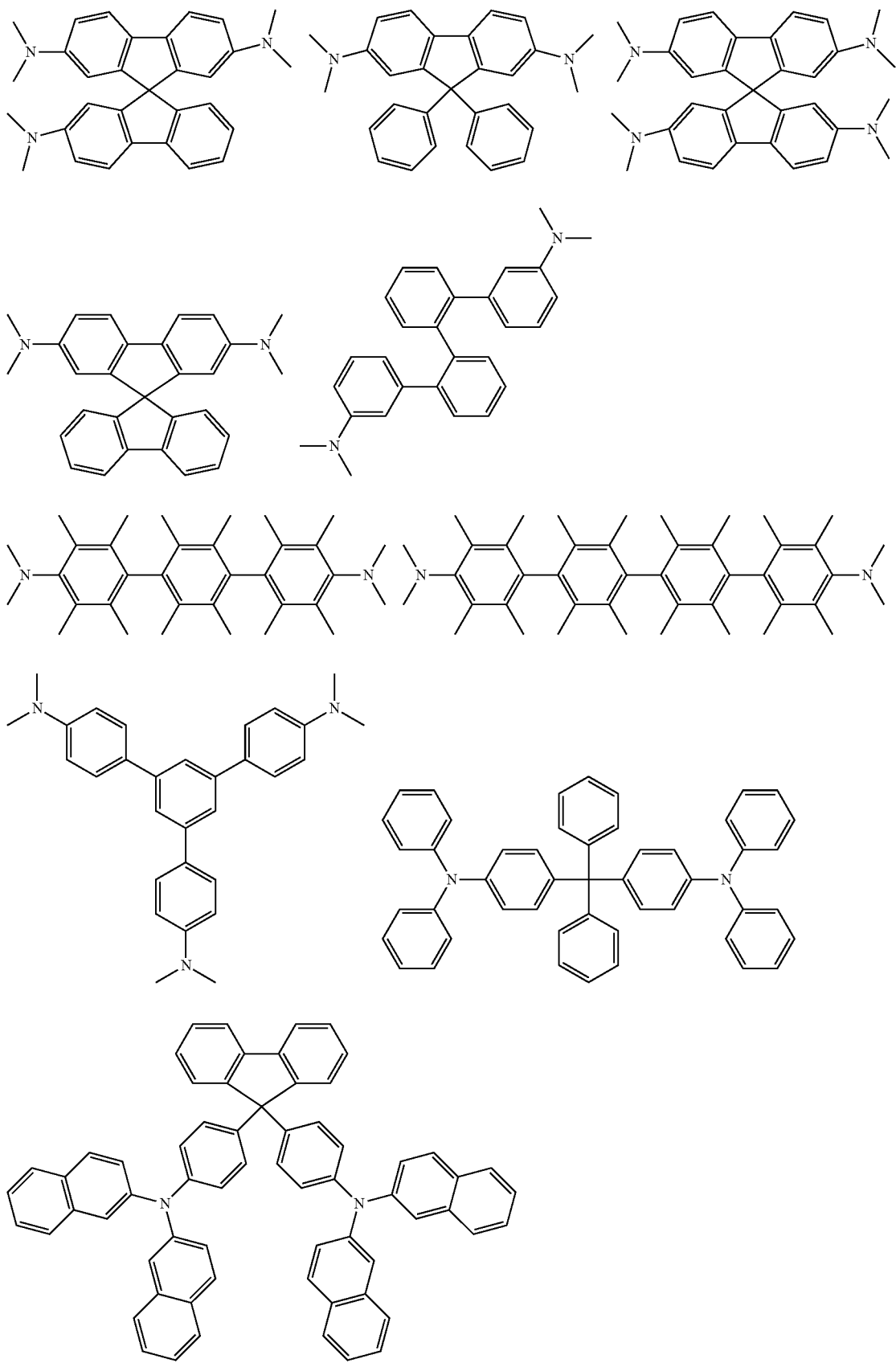

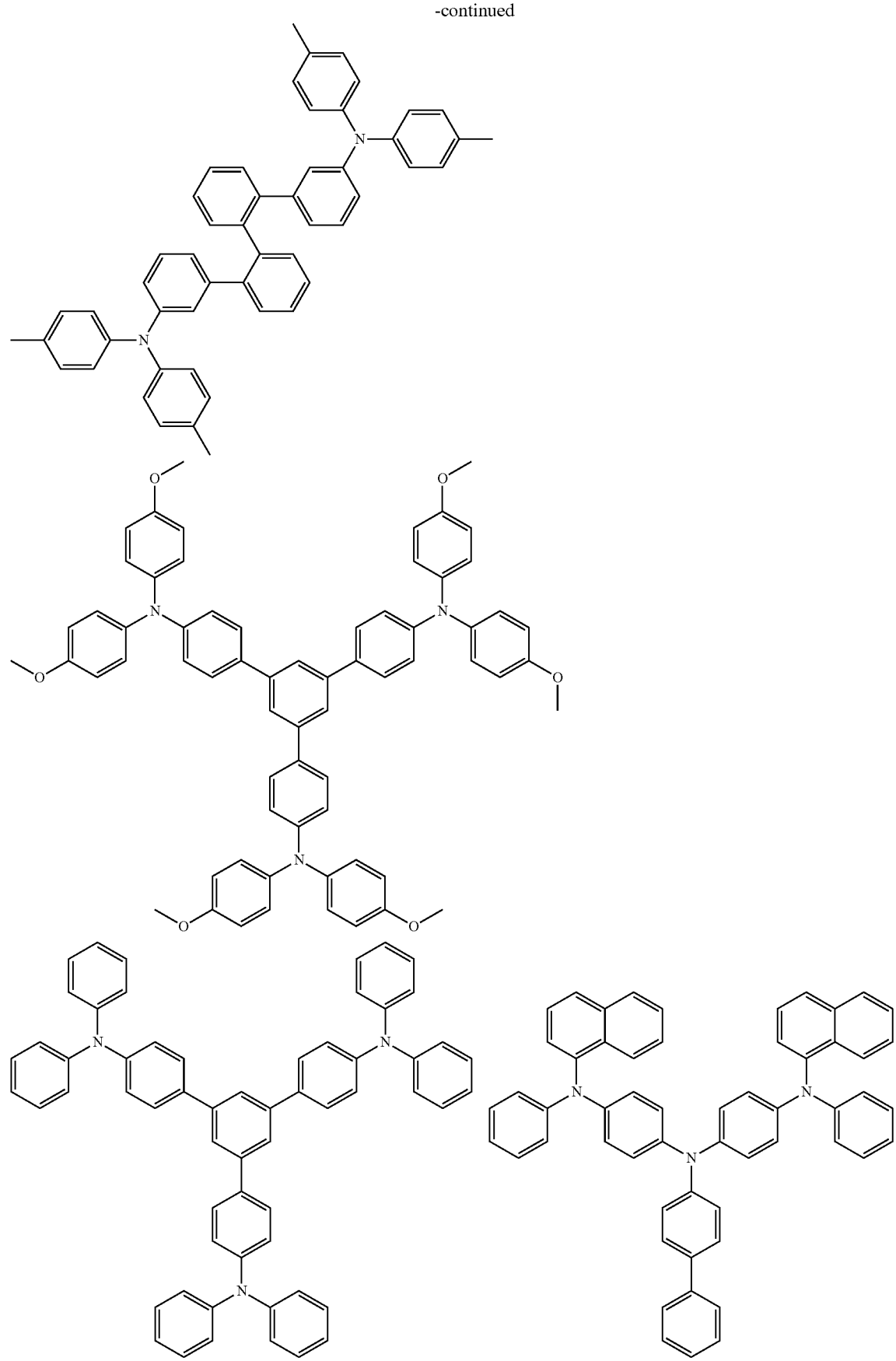

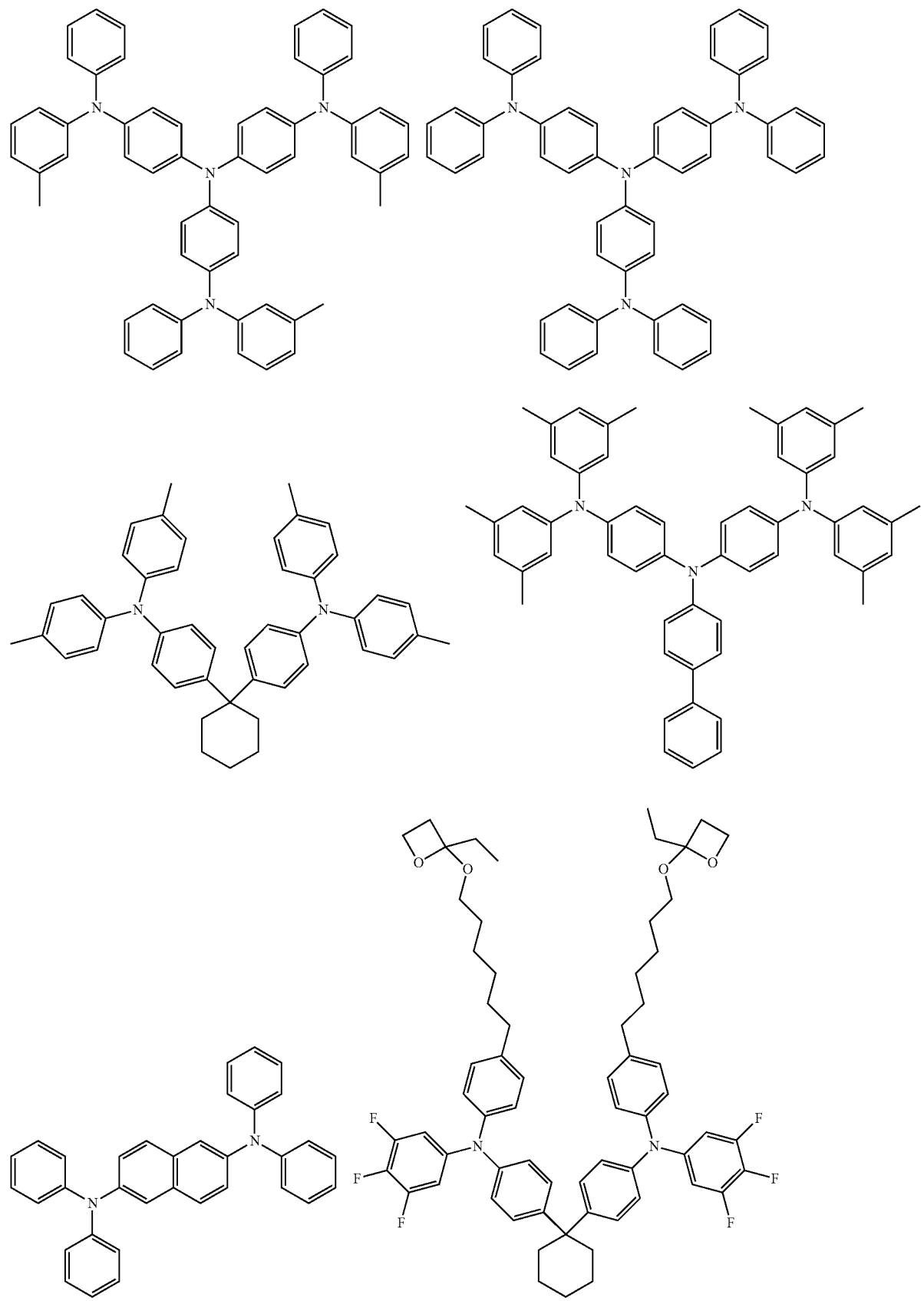

-continued
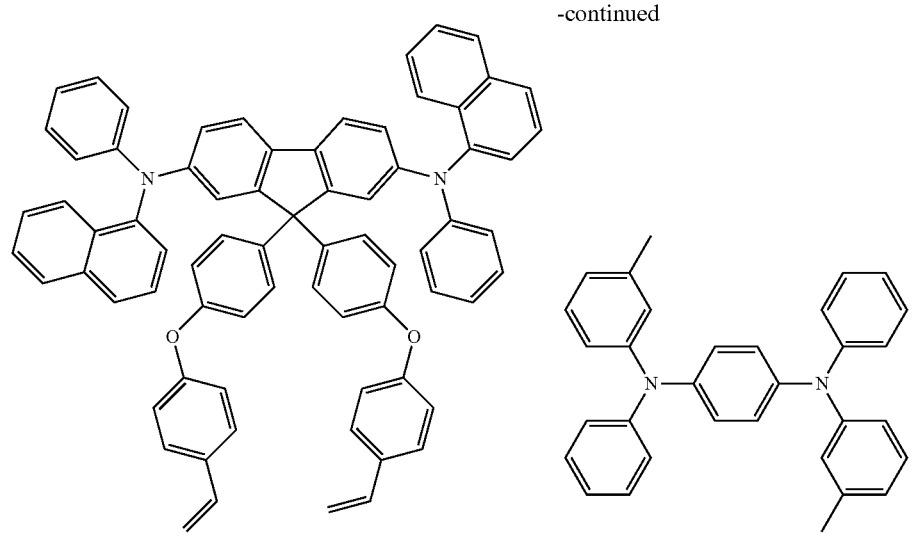
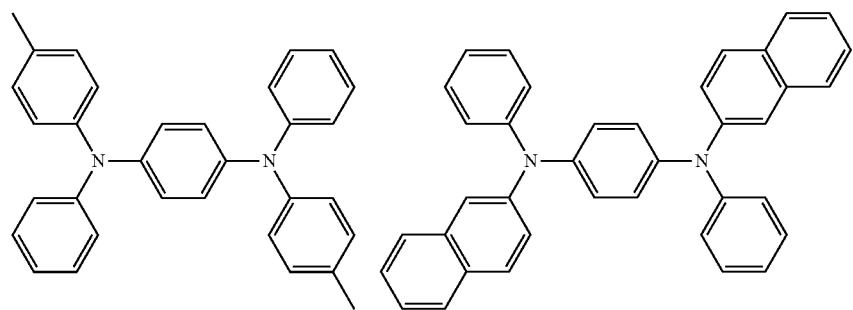
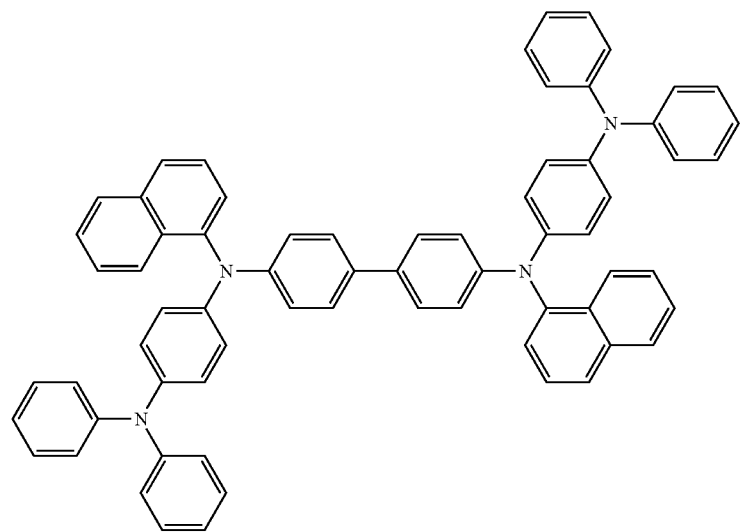

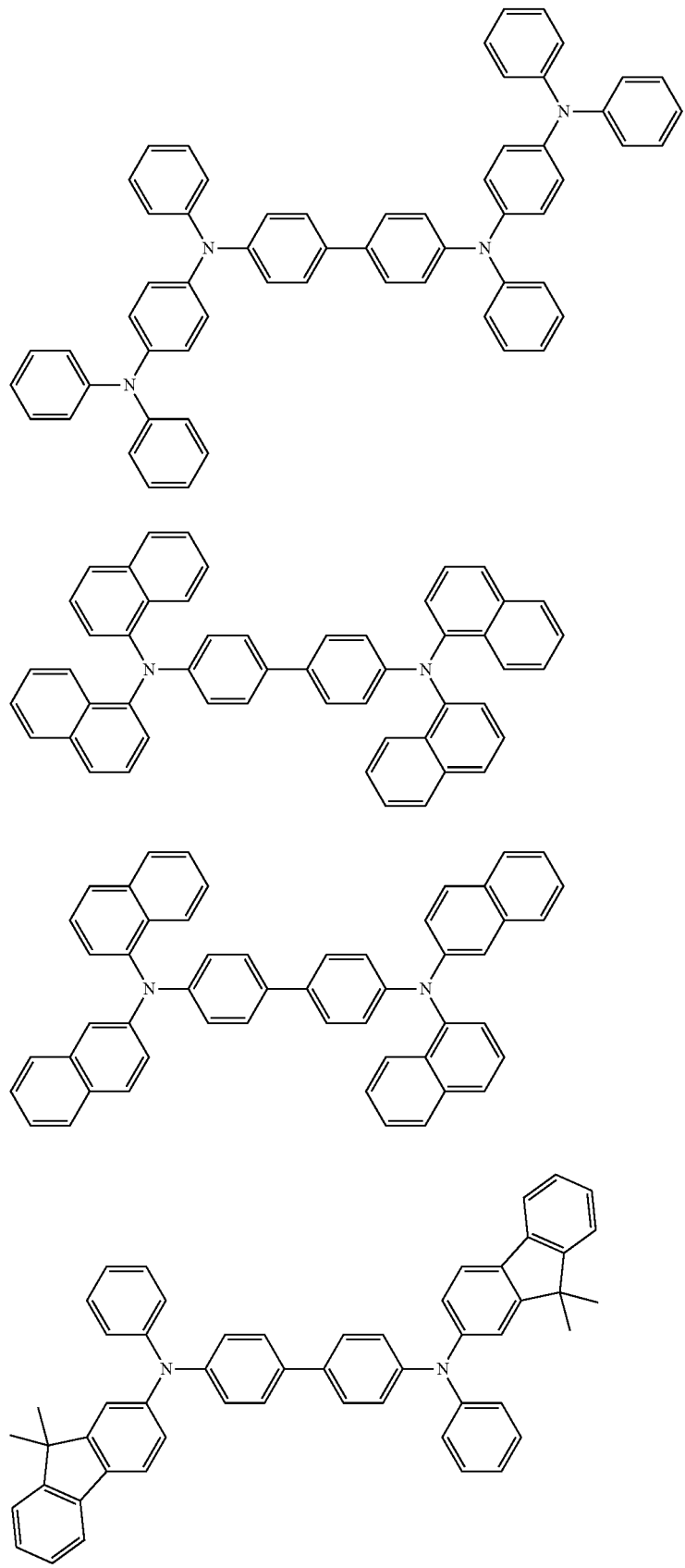

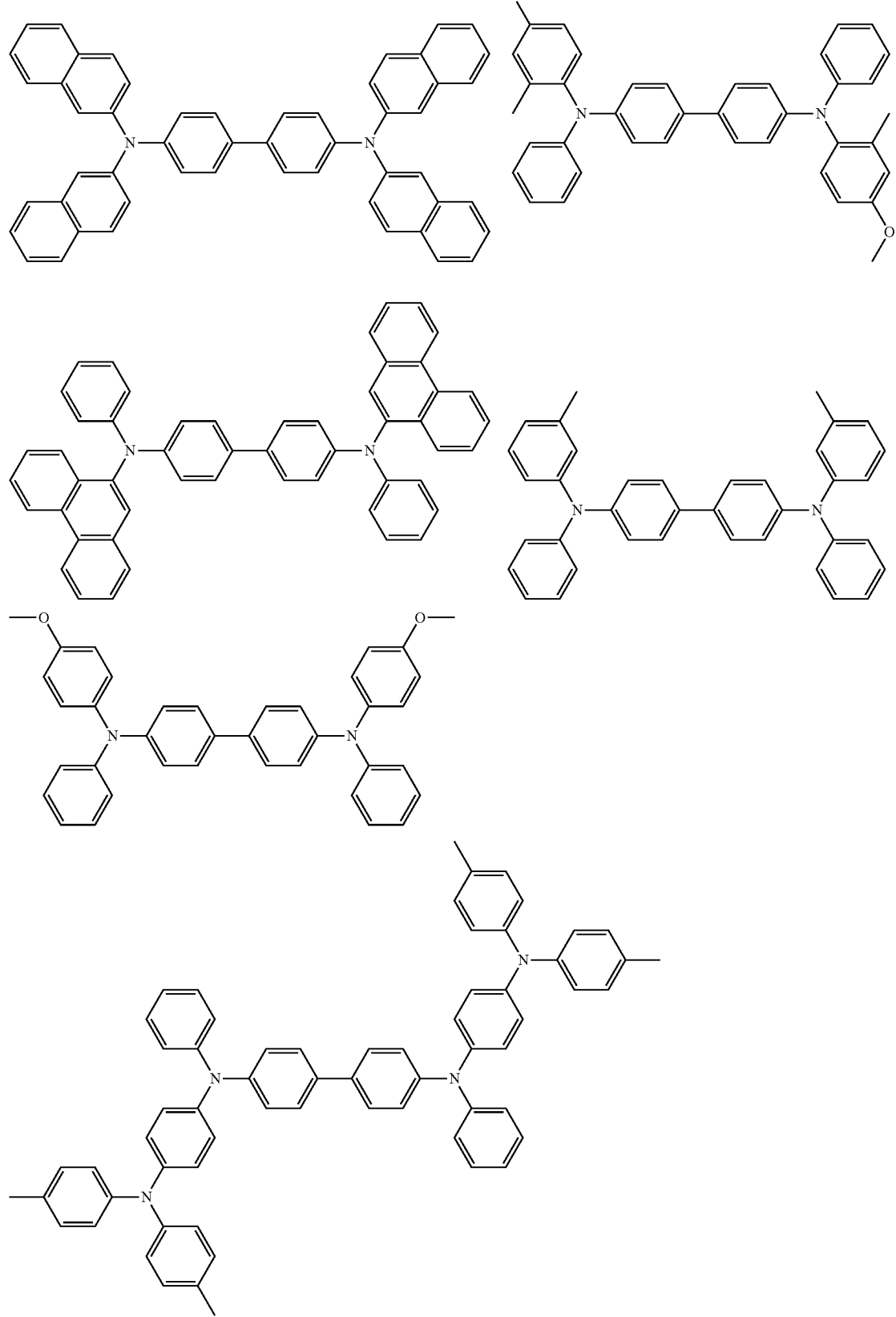

-continued
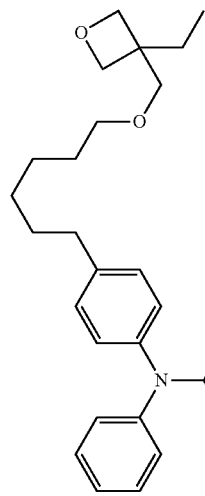
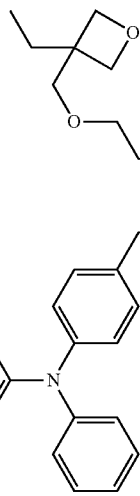
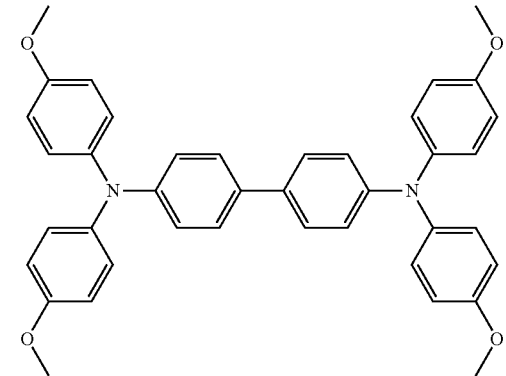
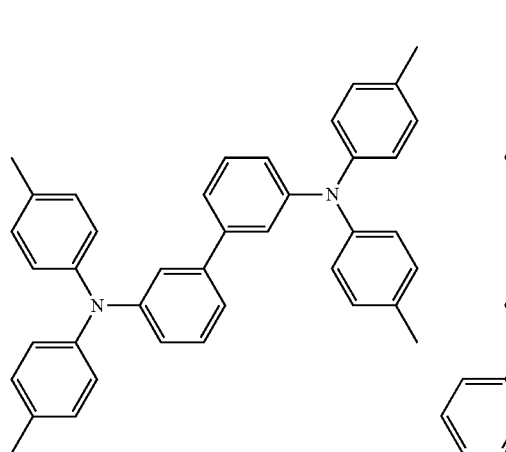
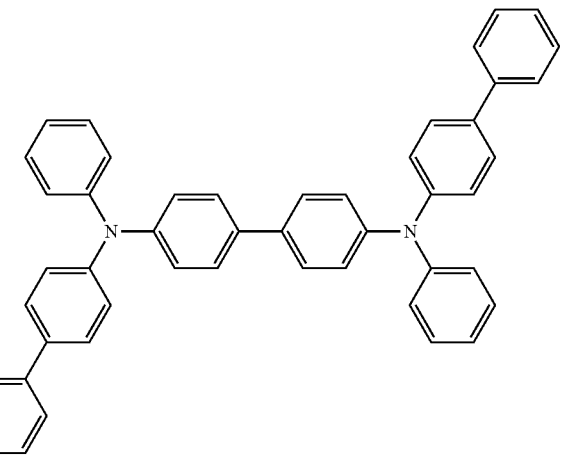
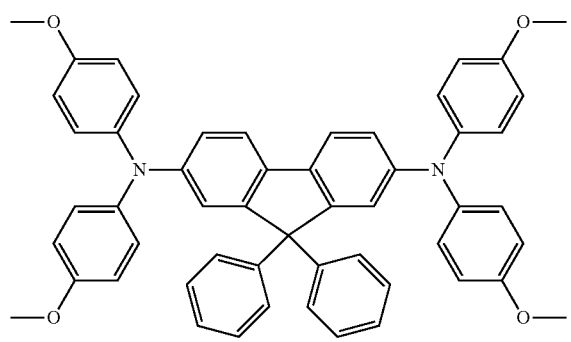
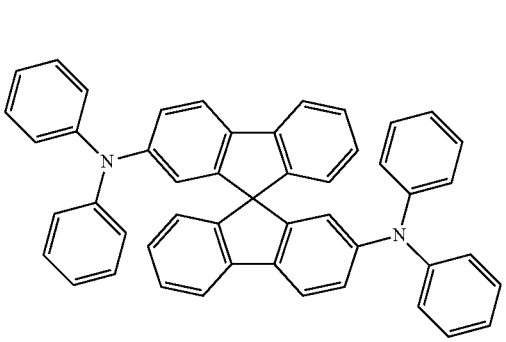
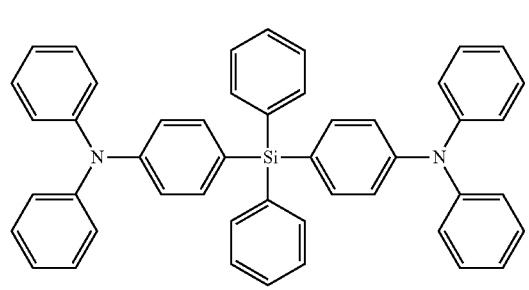
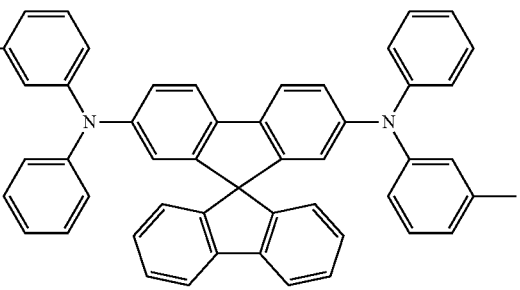

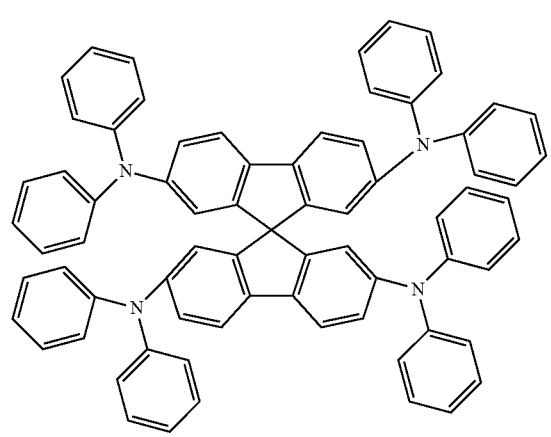
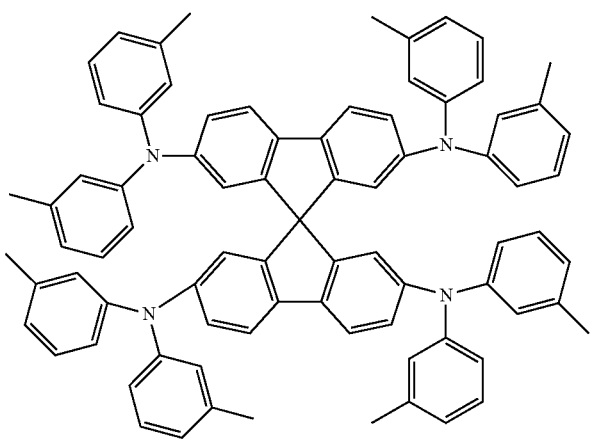
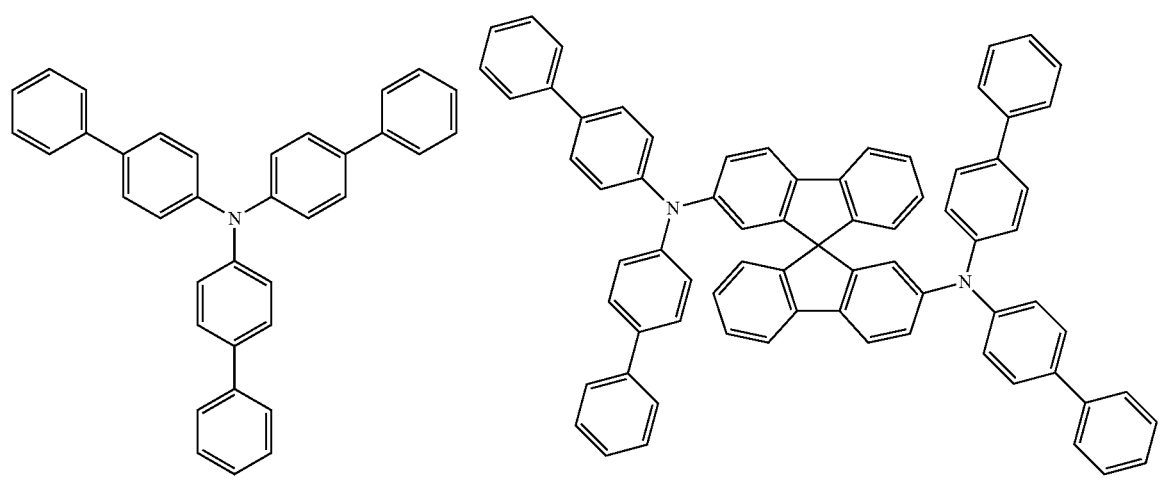
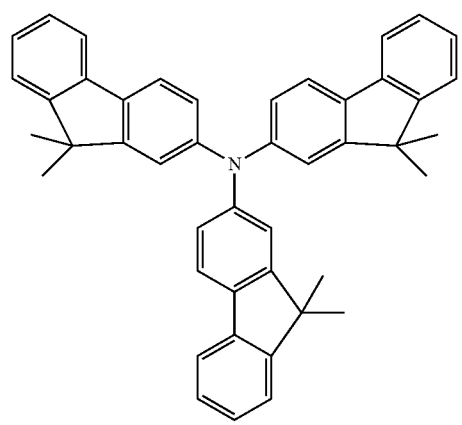

-continued
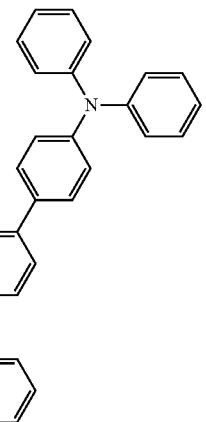
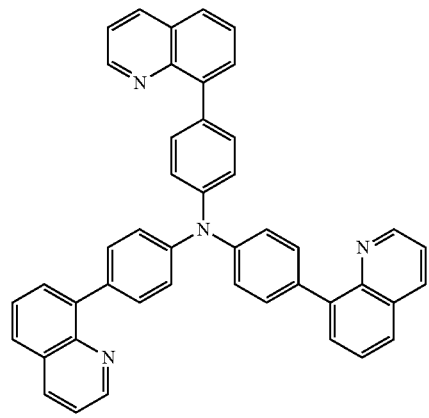
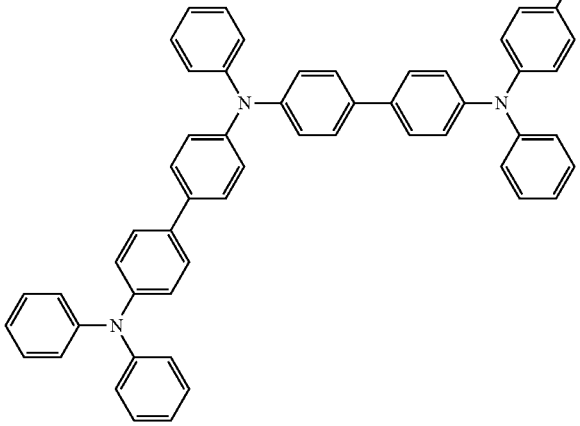
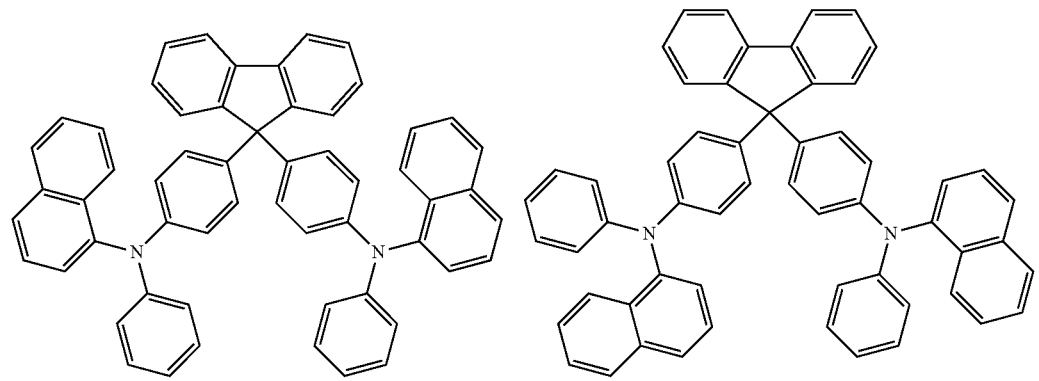
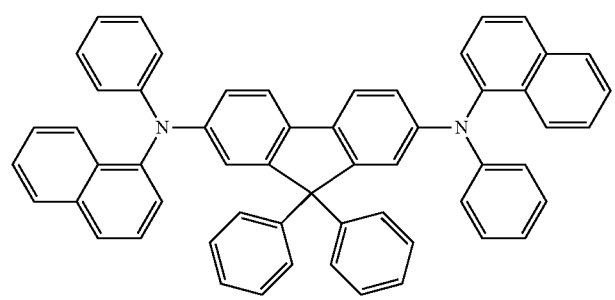

-continued
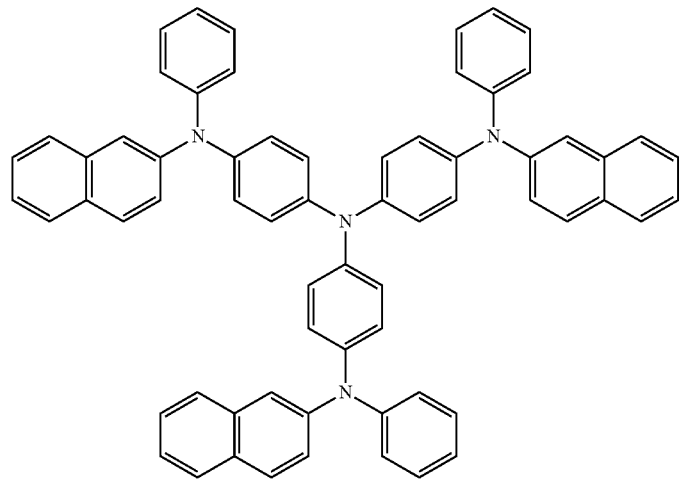
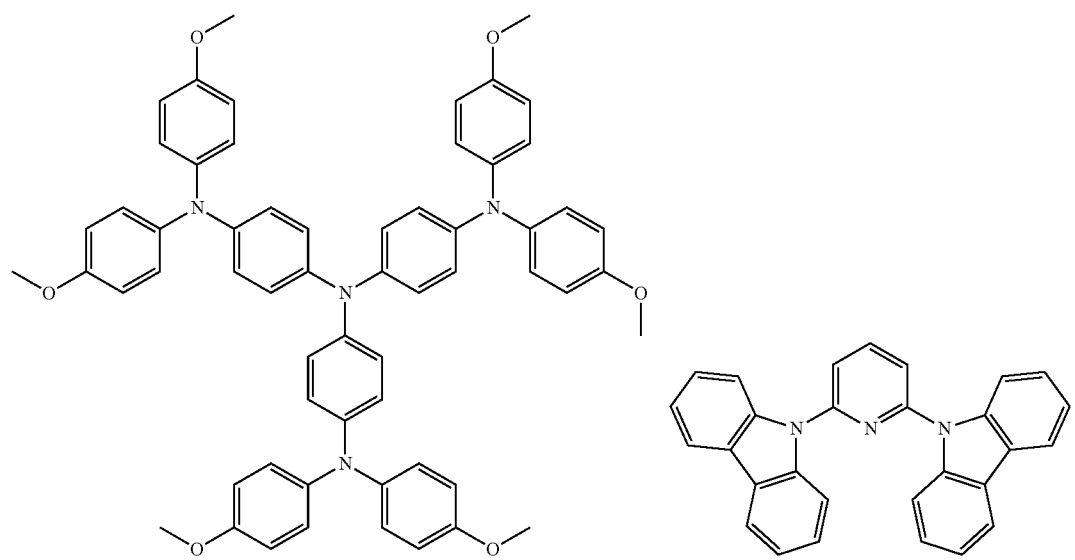
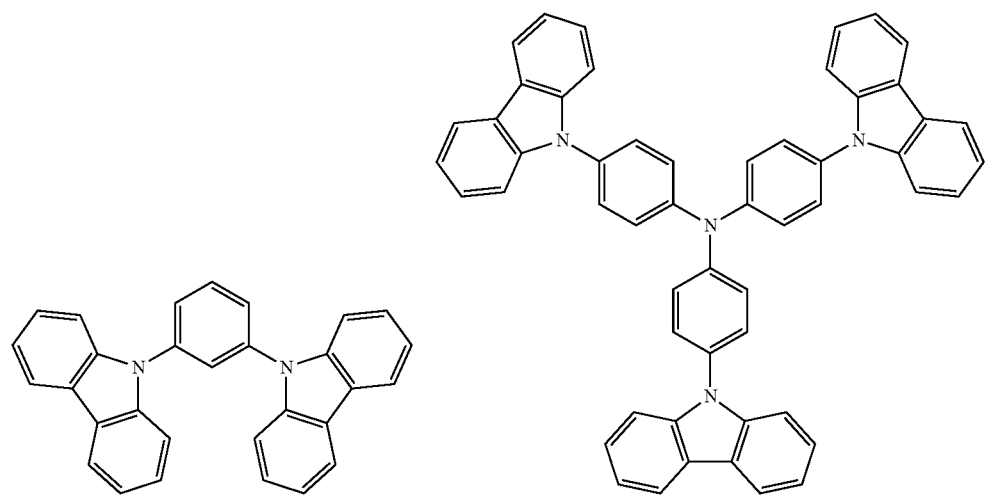

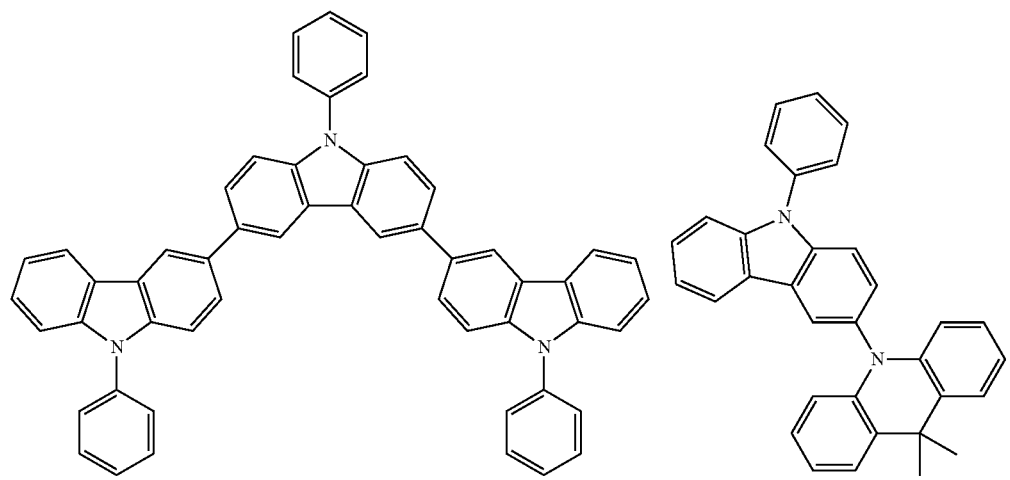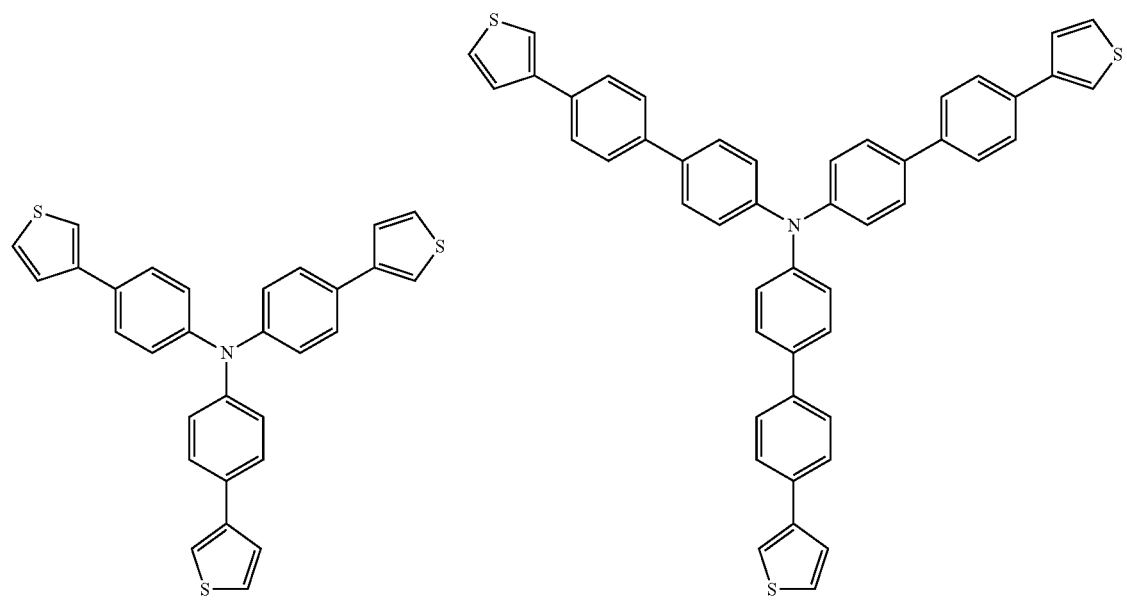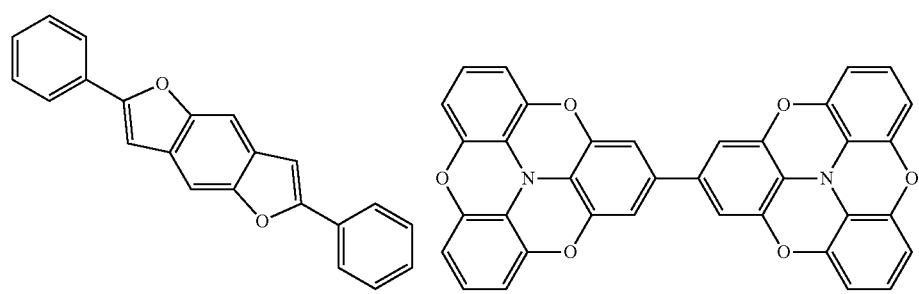

-continued
61
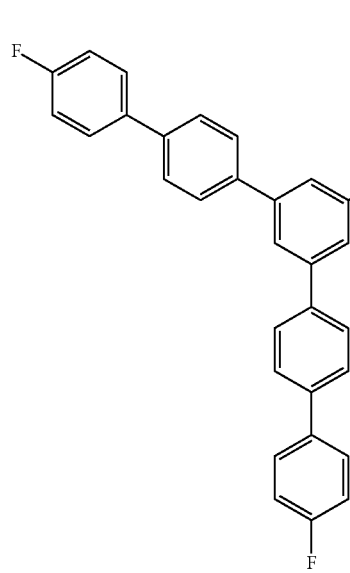
62
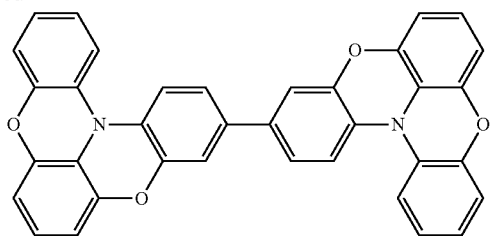
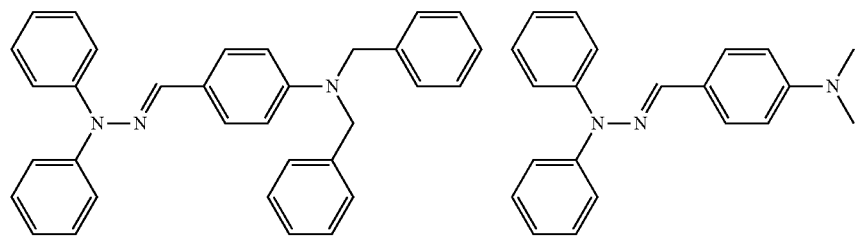
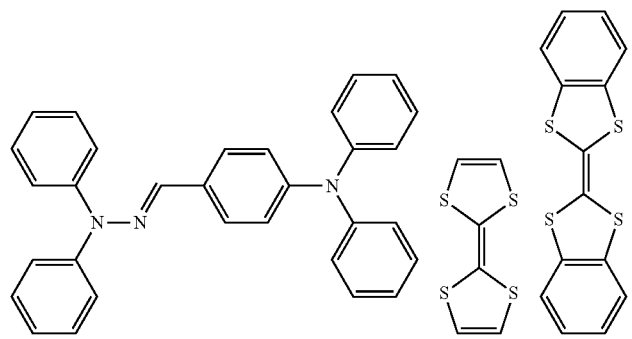
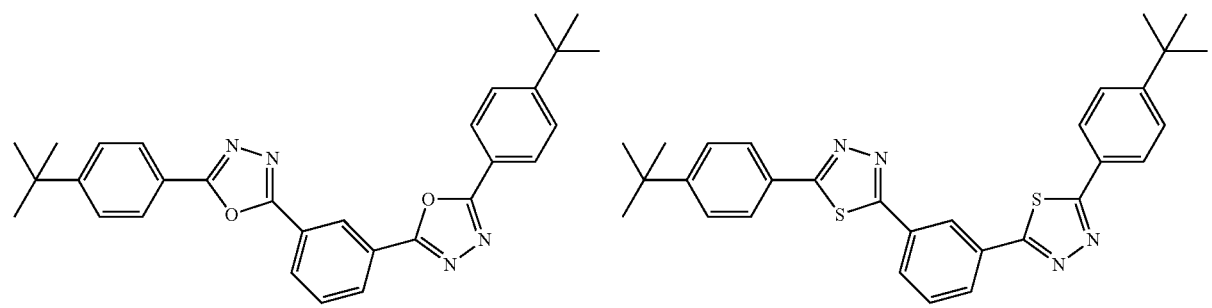

-continued
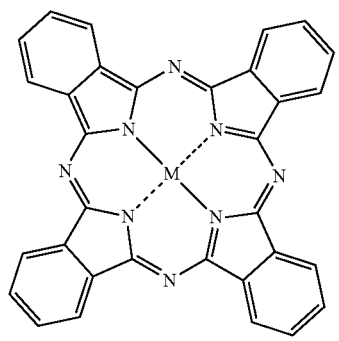 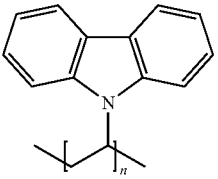 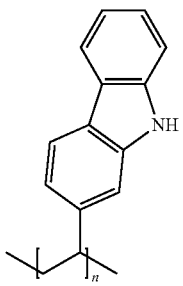 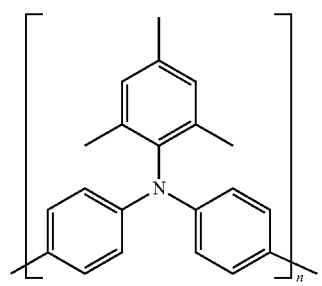
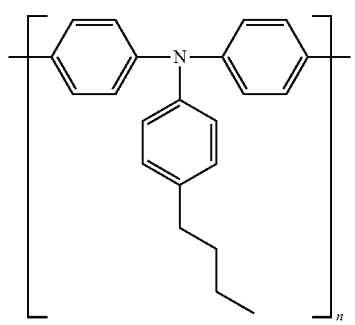 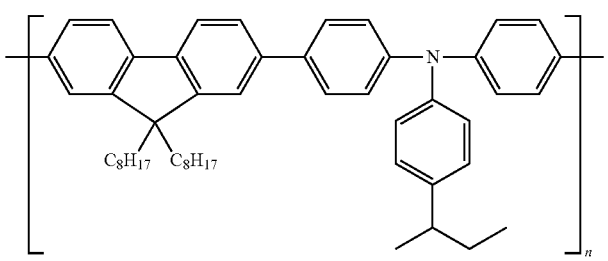 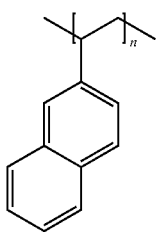
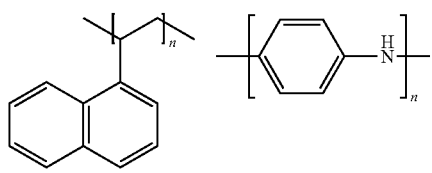
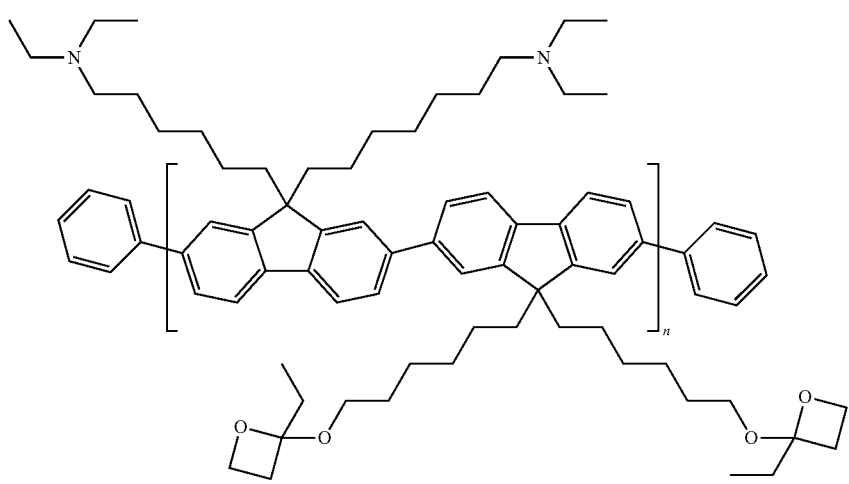

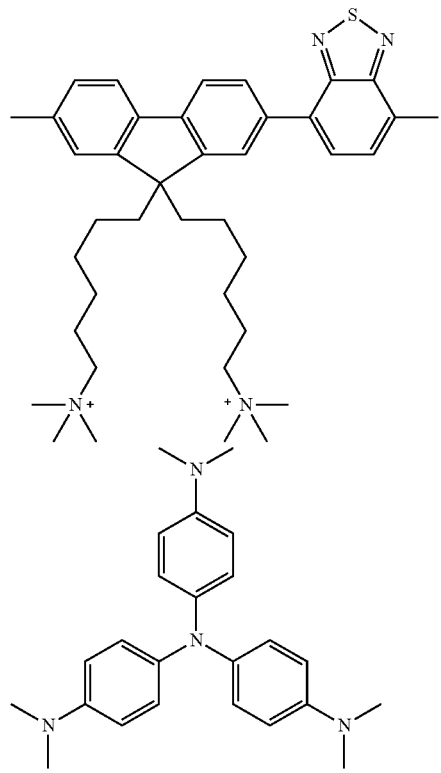

crystal violet

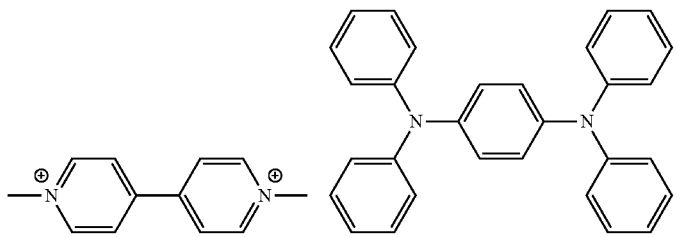

The electron-donating molecule used in the invention may be a polymer obtained by introducing a polymerizable group to the electron-donating molecule as a single element and polymerizing it as a monomer. A specific example of the polymer which can be used as the electron-donating molecule is a polymer having the following structure. In the following formula, n is an integer of one or larger. In this regard, however, the polymers which can be used as the electron-donating molecule in the invention should not be construed as being limited by the specific example.

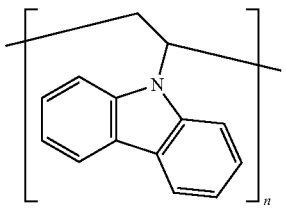

Electron-Donating Molecule Content

The electron-donating molecule content of the long persistent luminescence emitter, based on the total amount by mole of the electron-donating molecules and the electron-accepting molecules, is preferably less than 60 mol %, more preferably less than 30 mol %, further preferably less than 20 mol %, still further preferably less than 10 mol %. The electron-donating molecule content of the long persistent luminescence emitter, based on the total amount by mole of the electron-donating molecules and the electron-accepting molecules, is preferably more than 0.001 mol %, more preferably more than 0.01 mol %, further preferably more than 1 mol %. By changing the electron-donating molecule content, the color of the light emitted by the long persistent luminescence emitter can be regulated. For example, a higher electron-donating molecule content shows a tendency towards an increased rate of exciplex formation and luminescence of a long wavelength. Using this tendency, the color of the light emitted by the long persistent luminescence emitter and the emission duration time can be regulated. For example, in the case of long persistent luminescence emitters containing PO2CzPh as the electron-accepting molecule and TMB as the electron-donating molecule, which were used in the Examples, blue light can be observed when the TMB content is less than 30 mol %, and yellow light is observed when the TMB content is more than 30 mol %.

Other Components

The long persistent luminescence emitter of the invention may be composed only of the electron-accepting molecules and the electron-donating molecules but may contain another component or a solvent for dissolving the electron-accepting molecules, the electron-donating molecules and the other component. Examples of the other component include luminescent materials, such as fluorescent materials, phosphorescent materials and luminescent materials which exhibit delayed fluorescence (delayed fluorescent materials), and carrier-trapping materials. Here, "delayed fluorescence" means fluorescence from a compound which has been brought into an excited state by energy supply and is exhibited when reverse intersystem crossing is caused from the excited triplet state to the excited singlet state and then the excited singlet state returns to the ground state. The delayed fluorescence is fluorescence observed after fluorescence from directly generated excited singlet state (general fluorescence, which is fluorescence other than the delayed fluorescence).

When a fluorescent material is added to the long persistent luminescence emitter, the wavelength of the emitted light can be regulated.

When a phosphorescent material is added to the long persistent luminescence emitter, the proportion of phosphorescence exhibited from the long persistent luminescence emitter can be increased, and the proportion of phosphorescence can also be made 100%.

When a delayed fluorescent material is added to the long persistent luminescence emitter, reverse intersystem crossing from the excited triplet energy state to the excited singlet energy state may be caused in the delayed fluorescent material. Thus, the proportion of fluorescence exhibited from the long persistent luminescence emitter can be increased, and the proportion of fluorescence can also be made 100%.

Known materials can be selected and used as the phosphorescent material and the delayed fluorescent material added to the long persistent luminescence emitter.

When a phosphorescent material and a delayed fluorescent material are added to the long persistent luminescence emitter, the amounts of the phosphorescent material and the delayed fluorescent material, based on the total mass of the long persistent luminescence emitter, are each preferably less than 50 mol %, more preferably less than 25 mol %, further preferably 0.001 to 10 mol %.

A carrier-trapping material can also be added to the long persistent luminescence emitter. When a carrier-trapping material is added, electrons move from the radical anions of the electron-accepting molecules generated by charge separation to the carrier-trapping material, and electrons can be accumulated more stably in the carrier-trapping material. The electrons accumulated in the carrier-trapping material return to the electron-accepting molecules by energy such as heat and recombine at the interface with the electron-donating material, and long persistent luminescence can be obtained.

The carrier-trapping material is preferably a material having a LUMO level that is close to the LUMO level of the electron-accepting molecule. The LUMO level of the carrier-trapping material is preferably lower than the LUMO level of the electron-accepting molecule by 0.001 eV or more, more preferably by 0.01 eV or more, further preferably by 0.1 eV or more. The difference between the LUMO level of the carrier-trapping material and the LUMO level of the electron-accepting molecule is preferably 0.5 eV or less, more preferably 0.4 eV or less, further preferably 0.3 eV or less.

Embodiments of Luminescence

When light is applied, the long persistent luminescence emitter of the invention continues to exhibit luminescence for a long time even after the photo-irradiation stops (long persistent luminescence).

The luminescence from the long persistent luminescence emitter includes at least luminescence from an exciplex formed by an electron-donating molecule associated with an electron-accepting molecule or luminescence from the luminescent material added as the other component (at least one of the fluorescent materials, the phosphorescent materials and the delayed fluorescent materials), and the luminescence may include luminescence from electron-donating molecules which are not associated with the electron-accepting molecules or luminescence from electron-accepting molecules which are not associated with the electron-donating molecules. The emitted light may either fluorescence or phosphorescence or both fluorescence and phosphorescence and may further include delayed fluorescence.

The excitation light for obtaining persistent luminescence from the long persistent luminescence emitter may be sunlight or light from an artificial light source which emits light in a specific wavelength range.

The photo-irradiation time for obtaining persistent luminescence from the long persistent luminescence emitter is preferably one microsecond or longer, more preferably one millisecond or longer, further preferably one second or longer, still further preferably 10 seconds or longer. With the photo-irradiation time, radical anions and radical cations can be generated sufficiently, and luminescence continues for a long time after the photo-irradiation stops.

Forms of Long Persistent Luminescence Emitter

The form of the long persistent luminescence emitter of the invention is not particularly limited as long as the long persistent luminescence emitter has the electron-accepting molecule and the electron-donating molecule. Therefore, a blend of the electron-accepting molecules and the electron-donating molecules may be used, or an emitter in which the electron-accepting molecules and the electron-donating molecules are in separated areas may also be used. Examples of the blend of the electron-accepting molecules and the electron-donating molecules include a solution obtained by dissolving the electron-accepting molecules and the electron-donating molecules in a solvent and a thin film containing the electron-accepting molecules and the electron-donating molecules (a long persistent luminescent film). Examples of the emitter in which the electron-accepting molecules and the electron-donating molecules are in separated areas include one having an area where the amount by mass of the electron-donating molecules is 100 times or more higher than that of the electron-accepting molecules and an area where the amount by mass of the electron-accepting molecules is 100 times or more higher than that of the electron-donating molecules, one having an area which does not contain the electron-accepting molecules but contains the electron-donating molecules and an area which does not contain the electron-donating molecules but contains the electron-accepting molecules, one in which the two areas border on each other and one in which the areas are layered (including a thin film).

A thin film obtained using the electron-accepting molecules and the electron-donating molecules may be formed by a dry process or a wet process. For example, the thin film may be a thin film in the glass state obtained by adding the electron-donating molecules to heat melted electron-accepting molecules, blending them and cooling the blend. The solvent used for forming the film by a wet process may be an organic solvent having the compatibility with the solutes, namely the electron-accepting molecules and the electron-donating molecules. Using an organic solvent, for example, it is possible to prepare a blend solution of the electron-accepting molecules and the electron-donating molecules, prepare a solution obtained by dissolving the electron-accepting molecules only or prepare a solution obtained by dissolving the electron-donating molecules only. When the blend solution is applied on a support and dried, a blend thin film of the electron-accepting molecules and the electron-donating molecules can be formed. When the solution of the electron-accepting molecules and the solution of the electron-donating molecules are applied one by one on a support and dried, a thin film of the electron-accepting molecules and a thin film of the electron-donating molecules can also be formed in a manner that the films are in contact with each other (the solution of the electron-accepting molecules and the solution of the electron-donating molecules are applied in any order).

The plane shape of the thin film can be determined appropriately according to the application and may be, for example, a polygon such as squares and rectangles, a continuous shape such as circles, ellipses, ovals and semicircles or a specific pattern corresponding to a geometric pattern, a letter, a figure or the like.

Long Persistent Luminescent Element

The long persistent luminescent element of the invention has the long persistent luminescence emitter of the invention on a support. The long persistent luminescence emitter is generally formed in a film shape on the support. The film formed on the support may be a single-layer film or a multi-layer film. The single-layer film or a part of the layers of the multi-layer film can be a film containing both of the electron-accepting molecules and the electron-donating molecules. Moreover, a part of the layers of the multi-layer film can be a film which contains the electron-accepting molecules but does not contain the electron-donating molecules, and a part of the layers can be a film which contains the electron-donating molecules but does not contain the electron-accepting molecules. Here, the two kinds of layer can be arranged in a manner that they are in contact with each other.

The corresponding descriptions in the section of the long persistent luminescence emitter can be referred to for the long persistent luminescence emitter here. The descriptions of the thin film in the section of the forms of the long persistent luminescence emitter can be referred to for the forms of the long persistent luminescent film.

The support is not particularly limited and may be any support which is usually used for long persistent luminescent materials. Examples of the material of the support include paper, metals, plastic, glass, quartz, silicon and the like. Because the film can be formed also on a flexible support, various shapes can be obtained according to the application.

The long persistent luminescent film is preferably entirely covered with a sealant. As the sealant, a transparent material which has low water or oxygen permeability, such as glass or epoxy resins, can be used.

According to the invention, a transparent long persistent luminescence emitter can be provided. Accordingly, unlike the conventional inorganic materials, the long persistent luminescence emitter can be used and applied for various applications. For example, when the transparent long persistent luminescence emitter of the invention is sandwiched between two supports made of a transparent material such as glass, a transparent long persistent luminescent plate and the like can be formed. When the transparency of the supports is regulated, a semitransparent long persistent luminescent plate can be also obtained. Moreover, according to the invention, by laminating transparent long persistent luminescent films which emit light of different colors, the color of the light emitted to outside can be adjusted.

Applications of Long Persistent Luminescent Composition

The long persistent luminescent composition of the invention can constitute a long persistent luminescent product simply by blending the electron-donating molecules and the electron-accepting molecules, as organic compounds, and the luminescent material in a solvent and applying the blend. Therefore, while inorganic long persistent luminescent materials constitute a long persistent luminescent product through steps of firing of the inorganic materials containing rare elements at a high temperature, formation into fine particles and dispersion, the long persistent luminescent composition of the invention has the following advantages over the inorganic long persistent luminescent materials: preparation of the materials is easy; the production costs of the long persistent luminescent product can be kept low; and transparency, flexibility and softness can be given to the long persistent luminescent product. Thus, the long persistent luminescent composition of the invention can achieve entirely new applications, in addition to the use as a general long persistent luminescent product, making use of the characteristics.

For example, by appropriately selecting the electron-donating molecules and the electron-accepting molecules, the long persistent luminescent composition of the invention can emit light with a specific wavelength in a broad wavelength region ranging from blue light to near infrared rays. The luminous flux of the light emitted from a long persistent luminescent composition which emits green light is strong in the green region, and thus the composition can be used effectively as a long persistent luminescent paint for signs. A long persistent luminescent composition which emits light in the red to near infrared region is useful as a labeling material used for bioimaging because light in the wavelength region easily penetrates a living body. Moreover, using a combination of long persistent luminescent compositions emitting light of various colors, articles with excellent designs can be provided, and the compositions can be applied to a system for preventing official document forgery such as passports and the like.

A long persistent luminescent paint which can be excellently applied can be obtained by dissolving the long persistent luminescent composition of the invention in a solvent. When such a long persistent luminescent paint is applied on the entire surfaces of roads or interior surfaces of buildings, large-scale long persistent luminescent lighting which does not require any power source can be obtained. When edge lines of roads are drawn with the long persistent luminescent paint, the edge lines can be recognized also in the dark, and the safety of traffics can be improved significantly.

Moreover, when safety guidance signs drawn with the long persistent luminescent paint are used, safe escape guidance can be achieved for a long time during a disaster. An escape system for a disaster can be constructed by coating energy-saving lights, housing materials, railroads, mobile devices or the like with the long persistent luminescent paint.

A long persistent luminescent paint containing the long persistent luminescent composition of the invention can also be used as printing ink. As a result, prints with excellent designs which can be used also for guidance in the dark or during a disaster can be obtained. Such ink for long persistent luminescent printing can be preferably used, for example, for printing for covers, packages, posters, POP, stickers, signboards, escape guidance signs, safety goods and crime prevention goods.

A long persistent luminescent molded article can be obtained using a long persistent luminescent composition in which at least any of the electron-accepting molecules, the electron-donating molecules and the luminescent material is a polymer (a long persistent luminescent polymer) or using a composition obtained by adding a commercial semiconducting polymer to the long persistent luminescent composition of the invention.

Examples of such a long persistent luminescent molded article include lighted signs, product displays, liquid crystal back lights, lighting displays, covers for lighting fixtures, traffic signs, safety signs, parts for improving night visibility, signboards, screens, automobile parts such as reflecting plates and meter parts, equipment and toys in amusement facilities and mobile devices such as laptops and mobile phones, as well as sign buttons in automobiles or buildings, watch and clock dials, accessories, stationery products, sports goods, housings, switches and buttons in the field of various electric, electronic and OA devices and the like.

Because the transparency of the long persistent luminescent composition of the invention is excellent, a window for lighting control having the long persistent luminescence properties can be obtained by coating a surface of glass with the long persistent luminescent composition or forming a thin plate with a blend of the long persistent luminescent composition and a resin. Moreover, when a thin plate made of the long persistent luminescent composition and a reflecting plate are laminated, a long persistent luminescent plate with high brightness can be obtained. Such a long persistent luminescent plate can be used as a luminescent guiding tile for parts for evacuation routes for disasters, plates for stairs, risers, frame materials, ditch cover materials, parts for open parking lots, maintenance parts for harbors, safety parts for road facilities, scaffold parts for works at high places, scaffold parts for facilities floating in the sea, parts related to trails in mountains, salt damage resistant weather resistant signboards and the like.

By coating fibers with the long persistent luminescent composition of the invention, long persistent luminescent fibers, fabrics using the fibers and long persistent luminescent clothes can be obtained. Such long persistent luminescent fiber products include workwear for night, hats, carpets for emergency paths, bridal clothes, tapestries, interior materials for cars and the like.

In addition, the long persistent luminescent composition of the invention can constitute various materials such as long persistent luminescent films, long persistent luminescent tapes, long persistent luminescent stickers, long persistent luminescent building materials and long persistent luminescent sprays. In all the cases, because each component can be composed of an organic compound, there is a wide choice of colors, and transparency and softness can be given to the materials. Thus, the designs, the properties as signs and the handleability can be made excellent. For example, long persistent luminescent films can be widely used as packaging materials of escape guidance and emergency supplies.

The charge-separated state of the long persistent luminescence emitter of the invention lasts long. Thus, the long persistent luminescence emitter can be used for various applications in a wide variety of fields. For example, the long persistent luminescence emitter of the invention can be applied to the field of artificial photosynthesis in which a charge-separated state is generated by light energy, leading to the production of a substance. Moreover, the long persistent luminescence emitter of the invention can be used effectively as an element responding to thermal energy or mechanical energy. An example of an element responding to thermal energy is thermal switching in which the long persistent luminescence emitter is brought into the charge-separated state by applying excitation light and then caused to emit light momentarily by heating. Examples of an element responding to mechanical energy include an element which emits light when mechanical energy such as pressure is applied to the long persistent luminescence emitter in the charge-separated state and an element whose luminescence state changes when mechanical energy such as pressure is applied to the long persistent luminescence emitter in the charge-separated state.

EXAMPLES

The characteristics of the invention are explained more specifically below using Examples. The materials, the contents of the treatment, the treatment procedures and the like shown below can be appropriately modified as long as the modifications do not depart from the purposes of the invention. Thus, the scope of the invention should not be construed as being limited by the specific examples shown below. As the excitation light, light from a mercury-xenon lamp of 150 W was used through a band-pass filter of any of 300 nm, 320 nm, 340 nm and 365 nm and an infrared cut-off filter of 800 nm or more. The photoluminescence spectra, the long persistent luminescence spectra and the emission lifetimes were measured using a spectrometer (manufactured by Hamamatsu Photonics K.K., PMA-50), a multi-channel spectrometer (manufactured by Ocean Optics, Inc, QE-Pro), a photomultiplier tube (manufactured by Hamamatsu Photonics K.K., C13366-1350GA) and a multimeter (manufactured by Keysight Technologies, 34461A).

Compounds Whose Characteristics were Evaluated in Examples

The compounds whose characteristics were evaluated in the Examples are shown below.

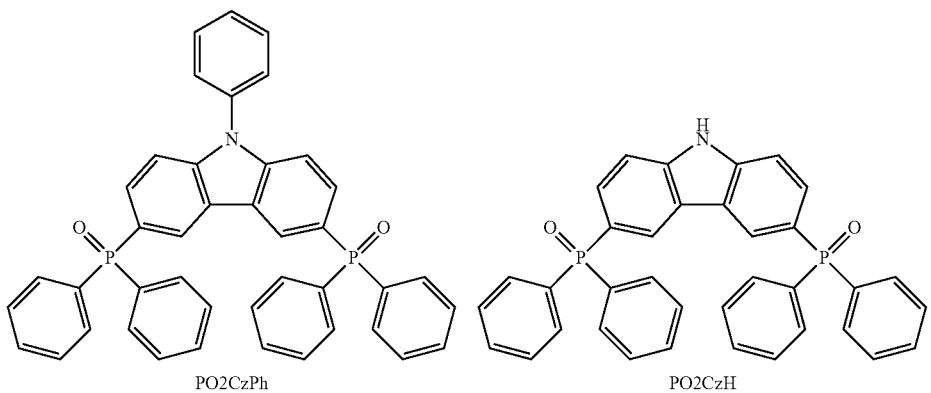

PO2CzPh                    PO2CzH

-continued
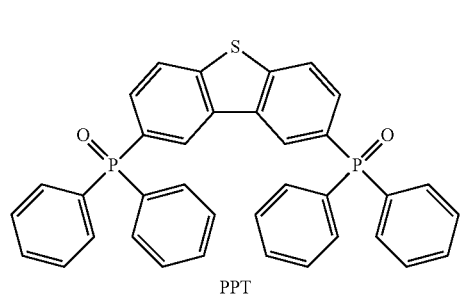
PPT
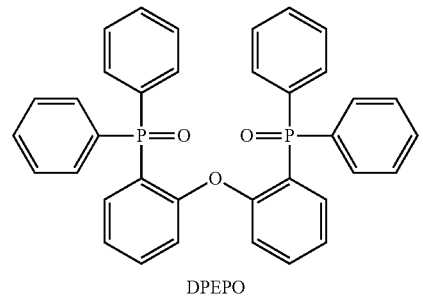
DPEPO
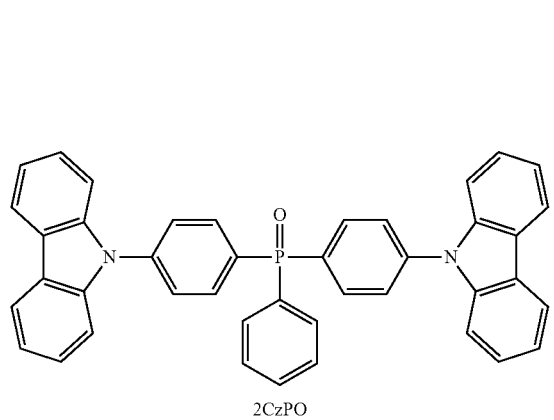
2CzPO
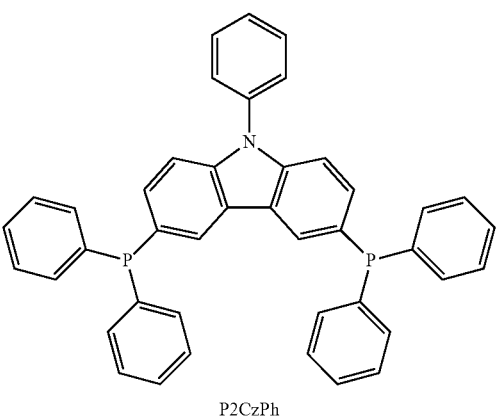
P2CzPh
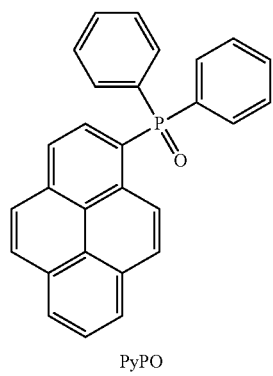
PyPO
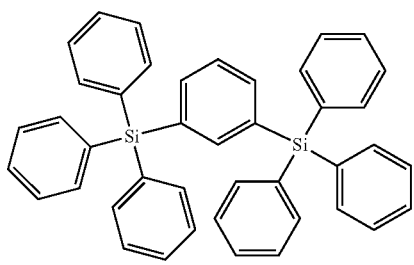
UGH3
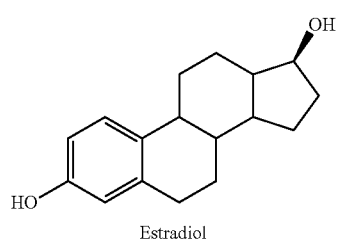
Estradiol
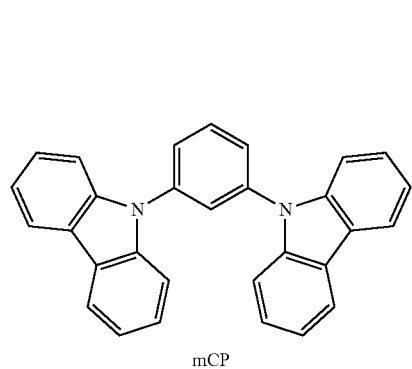
mCP
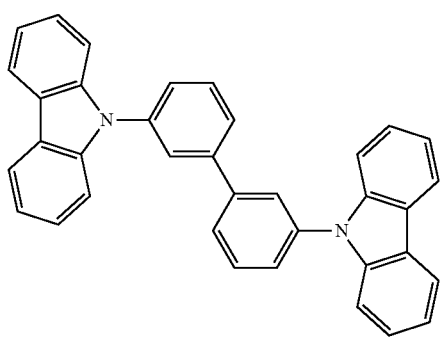
mCBP -continued
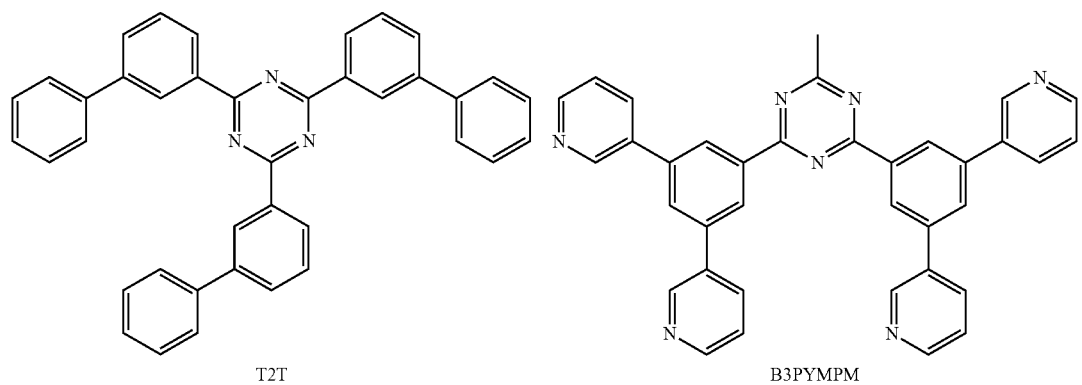
T2T
B3PYMPM
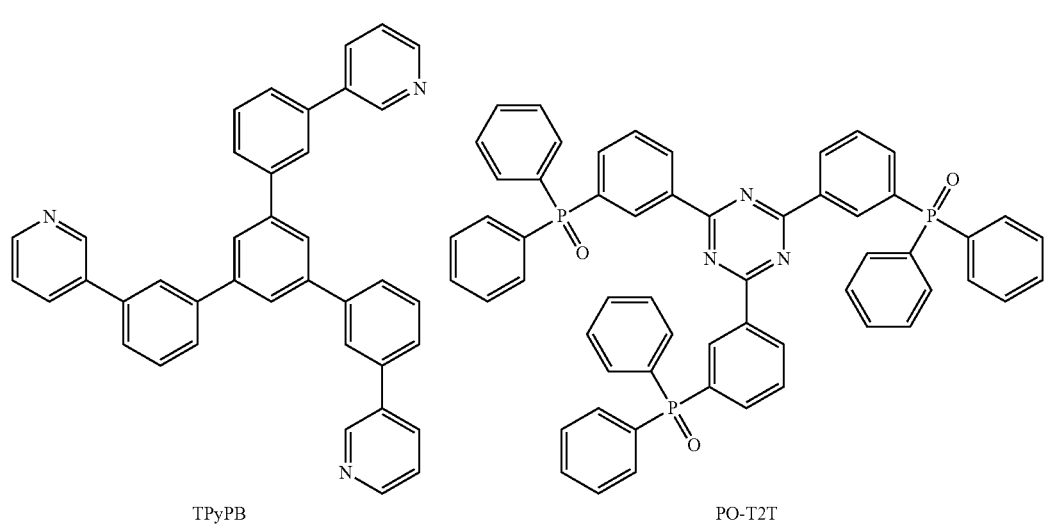
TPyPB
PO-T2T
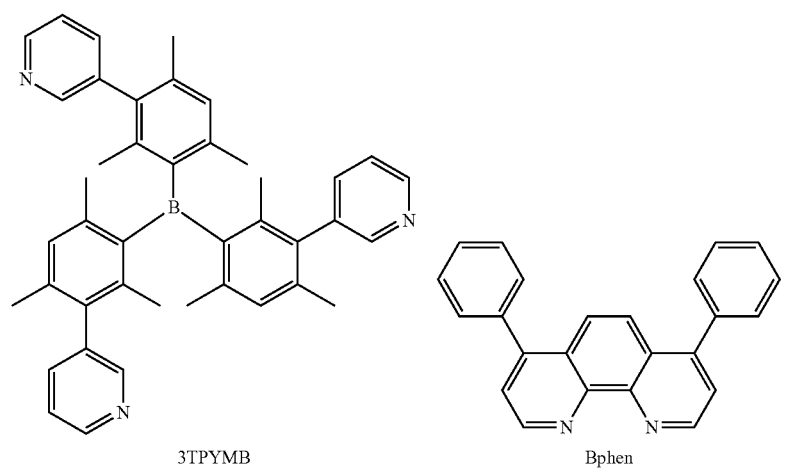
3TPYMB
Bphen
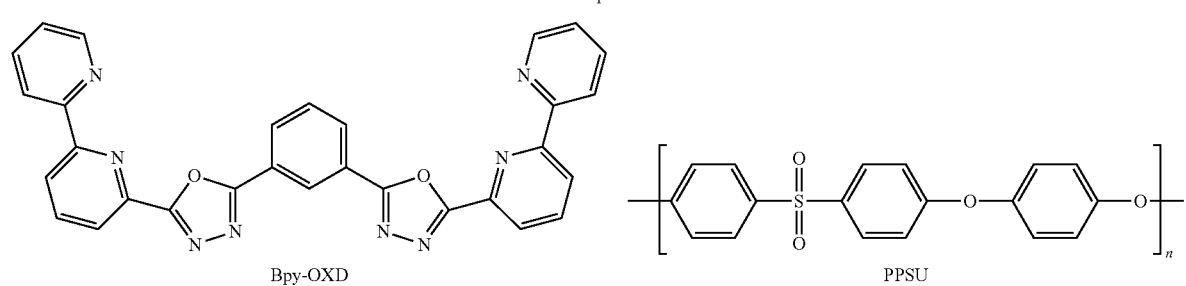
Bpy-OXD
PPSU -continued
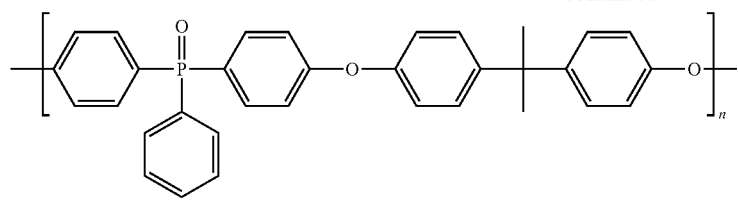
PPSU
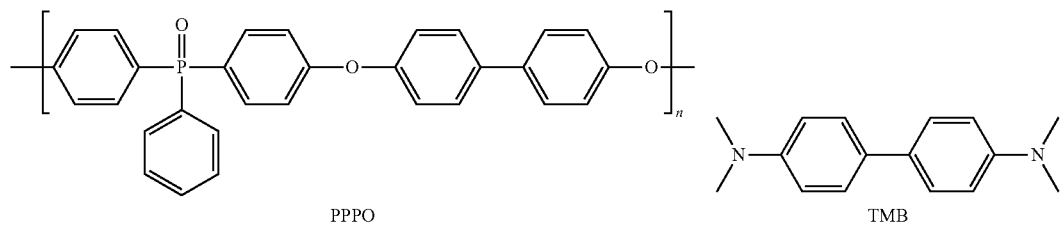
PPPO
TMB
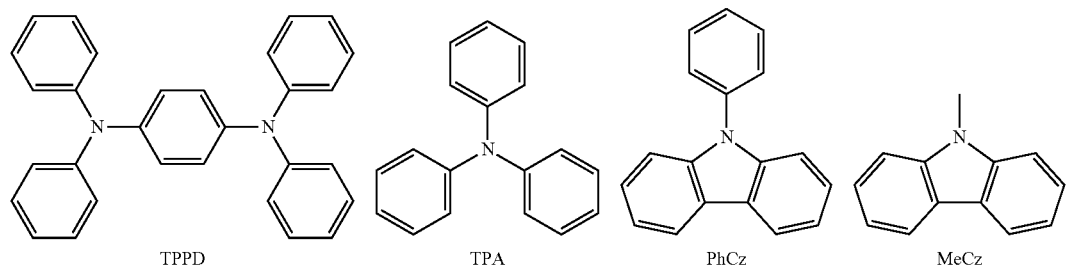
TPPD
TPA
PhCz
MeCz
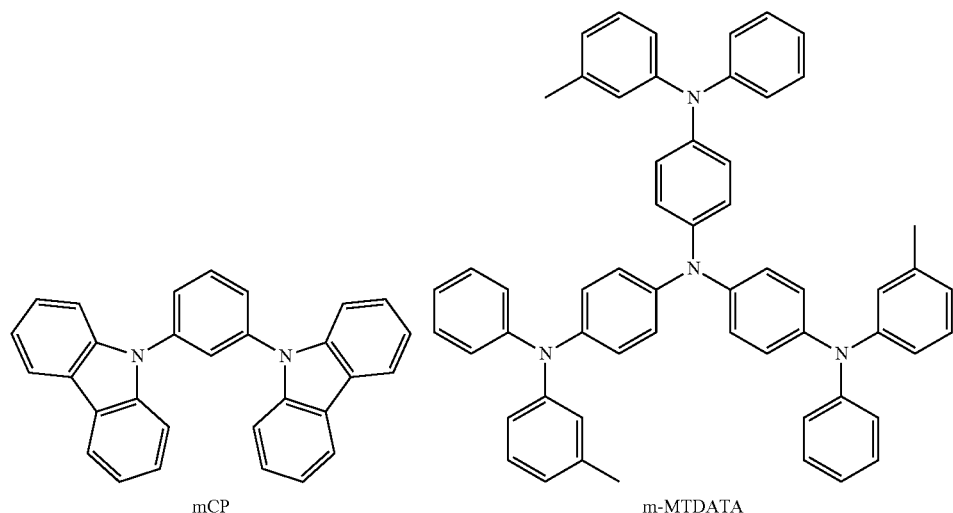
mCP
m-MTDATA
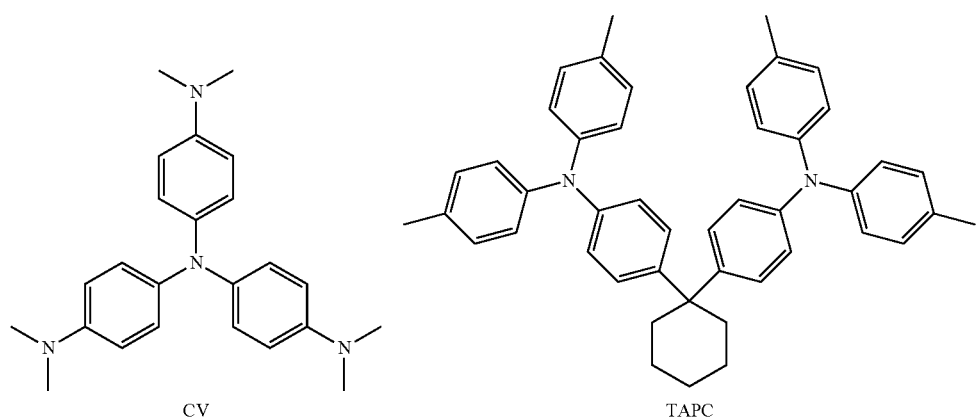
CV
TAPC -continued

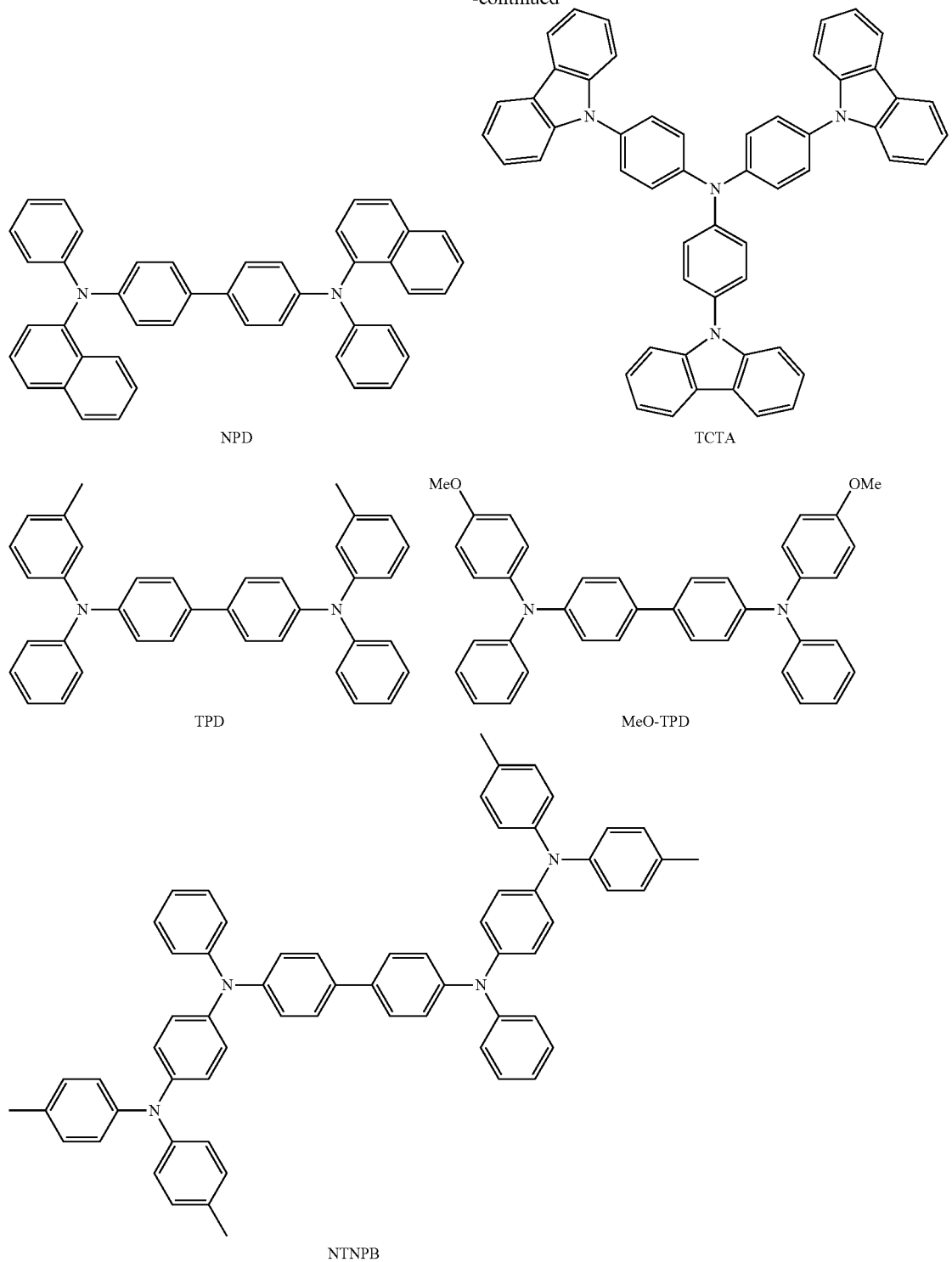

NPD

TCTA

TPD

MeO-TPD

NTNPB

Figure 2:
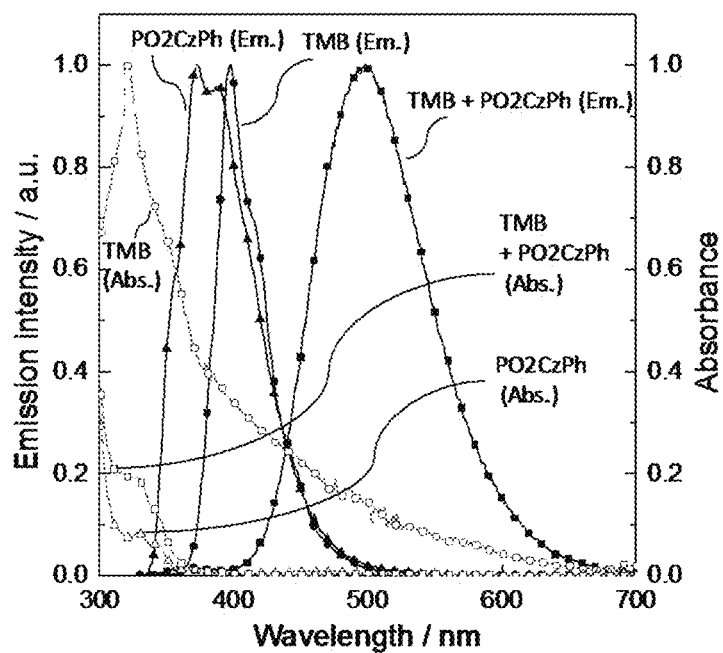
FIG. 2 is the absorption spectra and the photoluminescence spectra at room temperature of a long persistent luminescence emitter obtained using PO2CzPh as the electron-accepting molecule and TMB as the electron-donating molecule (Example 1) and of PO2CzPh and TMB.

Example 1—Production and Evaluation of Long Persistent Luminescence Emitters Containing PO2CzPh as the Electron-Accepting Molecule and TMB as the Electron-Donating Molecule A quartz substrate was heated to a temperature of the melting point of PO2CzPh or higher (300° C. or higher) in a glovebox under a nitrogen atmosphere, and PO2CzPh was melted on the quartz substrate. TMB was added to and blended with the melted PO2CzPh at the concentration of 10 mol %, and the blend was cooled rapidly. A long persistent luminescent film in the glass state was thus formed and encapsulated using a glass substrate and an ultraviolet-cured resin. The ultraviolet absorption spectrum (Abs) of the produced long persistent luminescent film and its photoluminescence spectrum which was measured using excitation light of 340 nm at room temperature are shown in FIG. 2.

Separately from the film, a long persistent luminescent film of PO2CzPh and TMB was formed and encapsulated using a glass substrate and an ultraviolet-cured resin in the same manner as that described above except that the concentration of TMB was changed to 40 mol %.

Figure 3:
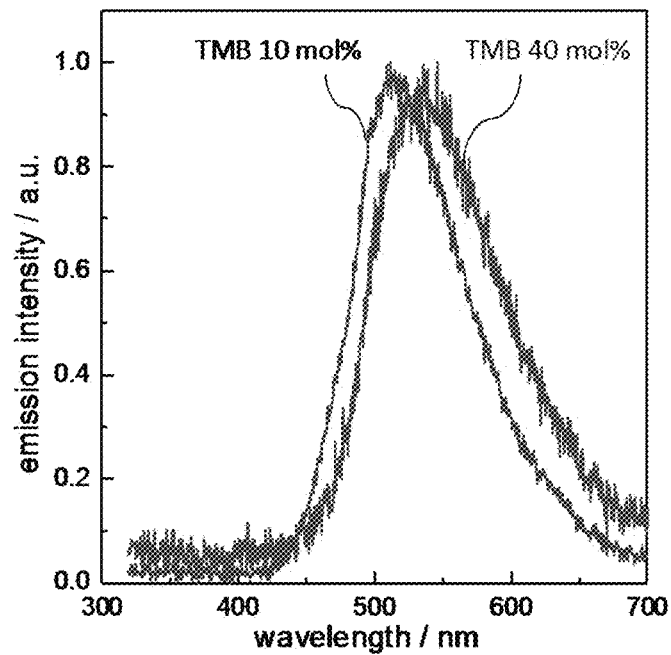
FIG. 3 is the photoluminescence spectra at room temperature of long persistent luminescence emitters obtained using PO2CzPh as the electron-accepting molecule and TMB as the electron-donating molecule at the concentrations of 10 mol % and 40 mol % (Example 1).

The photoluminescence spectra of the produced long persistent luminescent films which were measured using excitation light of 340 nm at room temperature are shown in FIG. 3.

Figure 4:
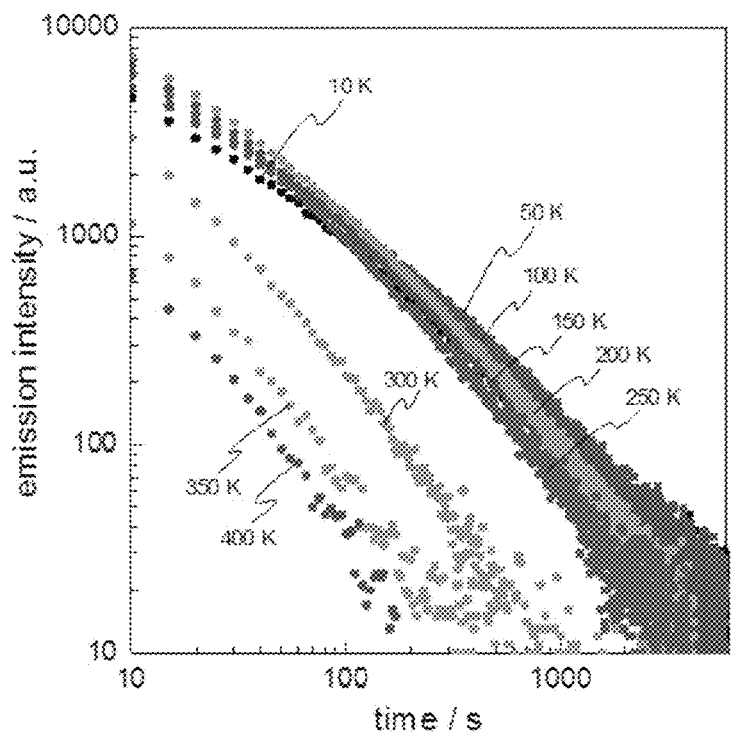
FIG. 4 is a log-log graph showing the changes in the emission intensity with time of a long persistent luminescence emitter obtained using PO2CzPh as the electron-accepting molecule and TMB as the electron-donating molecule (Example 1) at temperatures of 10 to 400 K.

Excitation light of 340 nm was applied to the long persistent luminescent film containing TMB at 10 mol %, of the produced long persistent luminescent films, at temperatures of 10 to 400 K for three minutes, and then the photo-irradiation was stopped. The changes in the emission intensity with time after that were measured. A log-log graph showing the changes in the emission intensity with time, in which the y-axis indicates the emission intensity on a logarithmic scale and the x-axis indicates the time on a logarithmic scale, is shown in FIG. 4.

Figure 9:
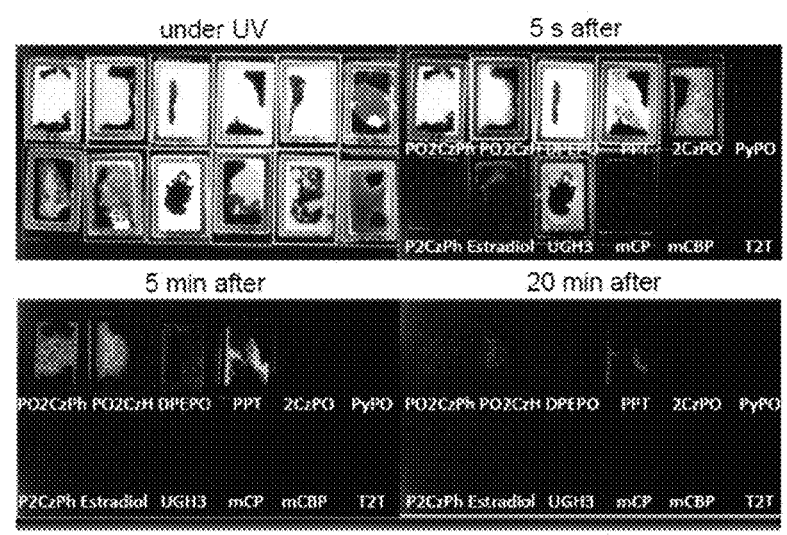
FIG. 9 shows photographs of long persistent luminescence emitters obtained using TMB as the electron-donating molecule and various compounds as the electron-accepting molecules (Example 1 and Experimental Example 1) taken during photo-irradiation and five seconds, five minutes and 20 minutes after the photo-irradiation stopped.

The photographs of the long persistent luminescent film taken during the photo-irradiation and five seconds, five minutes and 20 minutes after the photo-irradiation stopped are shown in FIG. 9. The photographs in FIG. 9 are the photographs of the long persistent luminescent films containing the respective compounds indicated under the photographs as the electron-accepting molecules, and the photographs of the long persistent luminescent film produced in Example 1 are the photographs indicated by "PO2CzPh".

Comparative Example 1—Preparation and Evaluation of PO2CzPh Solutions

Solutions (concentration of $10^{-5}$ M) were prepared by dissolving PO2CzPh in 2-methyltetrahydrofuran or dichloromethane in a glovebox under a nitrogen atmosphere.

Figure 5:
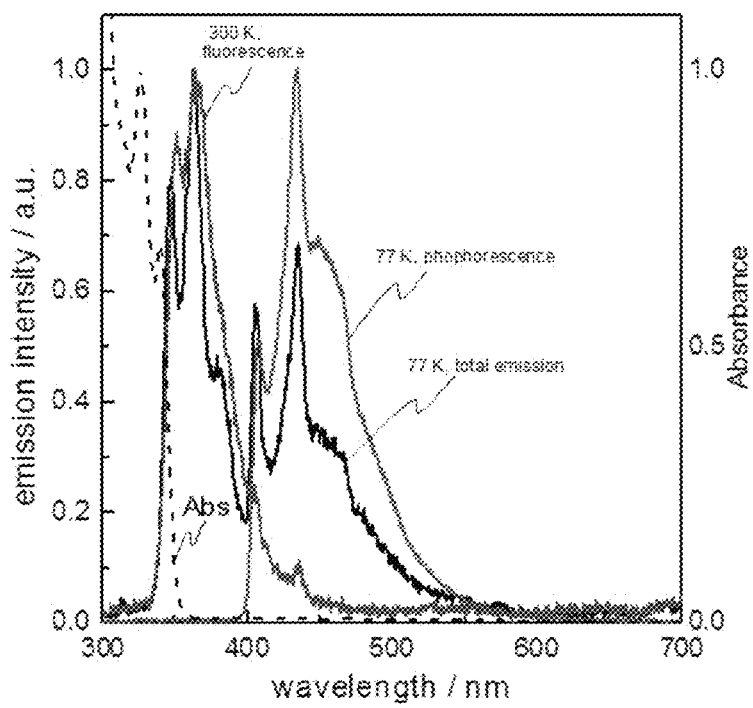
FIG. 5 is the absorption spectrum of PO2CzPh in dichloromethane and the photoluminescence spectrum at room temperature and the photoluminescence and phosphorescence spectra at 77 K of PO2CzPh in 2-methyltetrahydrofuran.

The fluorescence spectrum at 300 K, the phosphorescence spectrum at 77 K and the photoluminescence spectrum at 77 K (the photoluminescence spectrum of total emission) of the prepared solution of PO2CzPh in 2-methyltetrahydrofuran which were measured using excitation light of 340 nm and the ultraviolet absorption spectrum (Abs) of the solution of PO2CzPh in dichloromethane are shown in FIG. 5.

Figure 7:
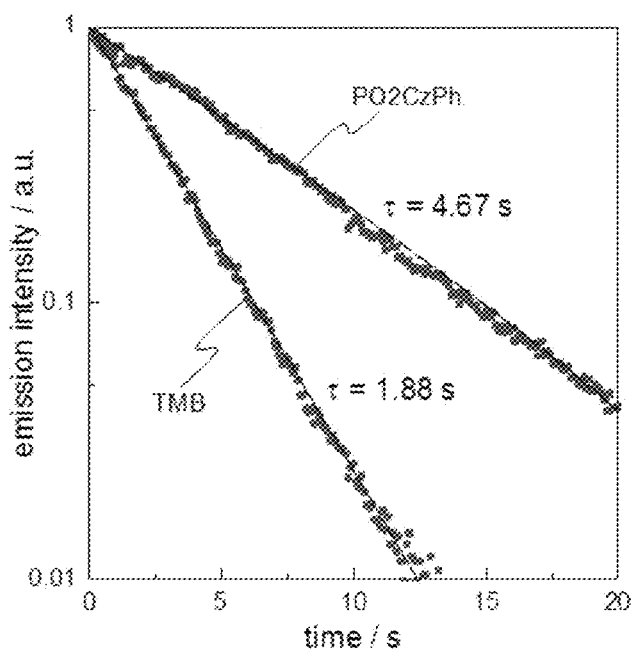
FIG. 7 is a semi-log graph showing the changes in the phosphorescence emission intensity with time of a solution of PO2CzPh in 2-methyltetrahydrofuran and a solution of TMB in 2-methyltetrahydrofuran at 77 K.

Excitation light of 340 nm was applied to the solution of PO2CzPh in 2-methyltetrahydrofuran at 77 K for three minutes, and then the photo-irradiation was stopped. The change in the phosphorescence emission intensity with time after that was measured. A semi-log graph showing the change in the emission intensity with time, in which the y-axis indicates the emission intensity on a logarithmic scale and the x-axis indicates the time, is shown in FIG. 7.

Comparative Example 2—Preparation and Evaluation of TMB Solutions

Solutions (concentration of $10^{-5}$ M) were prepared by dissolving TMB in 2-methyltetrahydrofuran, dichloromethane or toluene in a glovebox under a nitrogen atmosphere.

Figure 6:
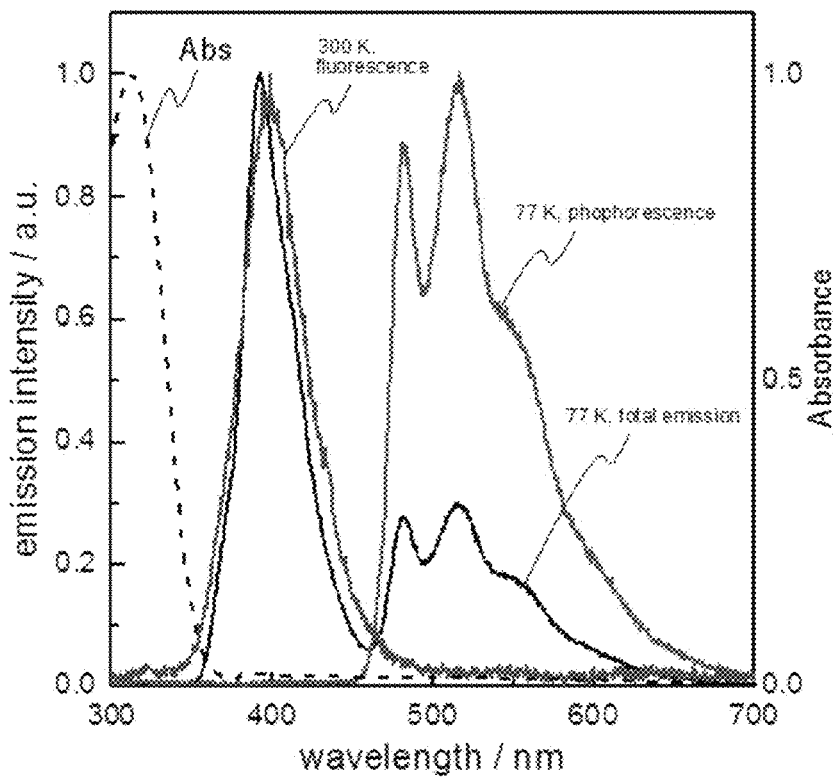
FIG. 6 is the absorption spectrum of TMB in dichloromethane and the photoluminescence spectrum at room temperature and the photoluminescence and phosphorescence spectra at 77 K of TMB in 2-methyltetrahydrofuran.

The fluorescence spectrum at 300 K, the phosphorescence spectrum at 77 K and the photoluminescence spectrum at 77 K (the photoluminescence spectrum of total emission) of the prepared solution of TMB in 2-methyltetrahydrofuran which were measured using excitation light of 340 nm and the ultraviolet absorption spectrum (Abs) of the solution of TMB in dichloromethane are shown in FIG. 6.

Excitation light of 340 nm was applied to the solution of TMB in 2-methyltetrahydrofuran at 77 K for three minutes, and then the photo-irradiation was stopped. The change in the phosphorescence emission intensity with time after that was measured. A semi-log graph showing the change in the emission intensity with time, in which the y-axis indicates the emission intensity on a logarithmic scale and the x-axis indicates the time, is shown in FIG. 7.

The photoluminescence spectrum in FIG. 2 agrees with neither of the photoluminescence spectra in FIG. 5 and FIG. 6, and thus it could be confirmed that the luminescence from the long persistent luminescent film of PO2CzPh and TMB produced in Example 1 was the exciplex luminescence. Because there was a difference in the wavelength of the maximum luminescence between the long persistent luminescence emitters containing TMB at different concentrations as shown in FIG. 3, it was confirmed that the concentration of TMB changes the color of the emitted light.

Next, with respect to the changes in the emission intensity with time, the slopes of the log-log plots of the emission intensity against time in FIG. 4 are one under all the temperature conditions. On the other hand, the semi-log graph in FIG. 7 shows that the phosphorescence intensity decay of TMB is single exponential decay. From the results, it could be confirmed that the long persistent luminescent film of PO2CzPh and TMB produced in Example 1 has a different luminescence mechanism from that of TMB and emits light by the luminescence mechanism shown in FIG. 1.

The photographs in FIG. 9 show that persistent luminescence was observed from the long persistent luminescence emitter of PO2CzPh and TMB produced in Example 1 even five minutes after the photo-irradiation stopped, suggesting that this emitter has excellent long persistent luminescence properties.

Experimental Example 1—Evaluation of Other Compounds as Electron-Accepting Molecules Long persistent luminescent films containing TMB at 10 mol % were formed and each encapsulated using a glass substrate and an ultraviolet-cured resin in the same manner as in Example 1 except that PO2CzH, DPEPO, PPT, 2CzPO, PyPO, P2CzPh, Estradiol, UGH3, mCP, mCBP or T2T was used instead of PO2CzPh and that the quartz substrate was heated to a temperature of the melting point of each compound or higher for melting the compound.

Figure 8:
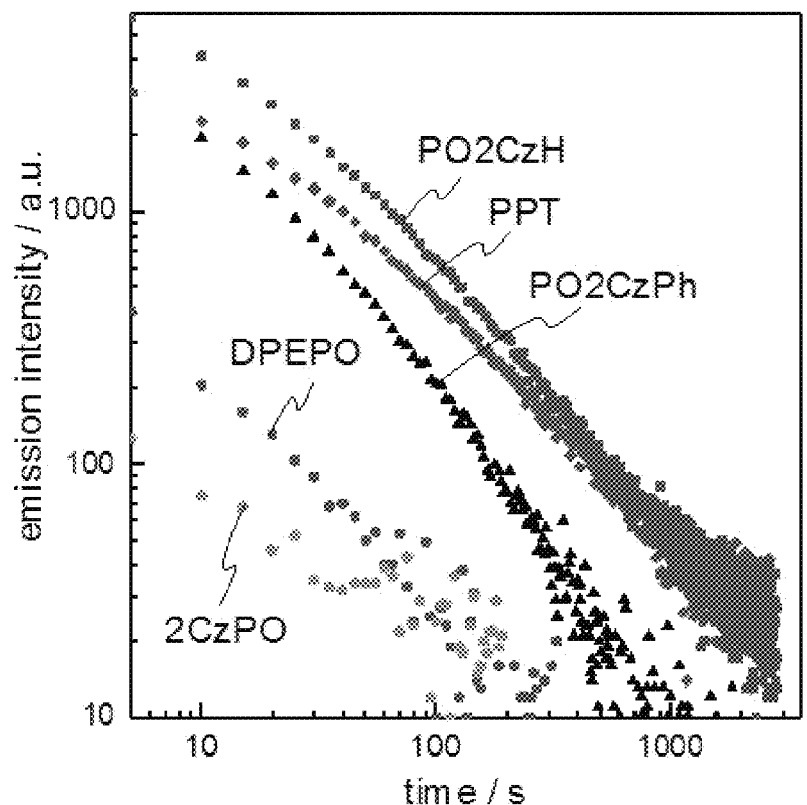
FIG. 8 is a log-log graph showing the changes in the emission intensity with time of long persistent luminescence emitters obtained using TMB as the electron-donating molecule and various compounds as the electron-accepting molecules (Example 1 and Experimental Example 1).

Excitation light of 340 nm was applied to the long persistent luminescent films containing PO2CzH, PPT, DPEPO or 2CzPO as the electron-accepting molecule, of the long persistent luminescent films produced in Experimental Example 1, and to the long persistent luminescent film produced in Example 1 at the temperature of 300 K for three minutes, and then the photo-irradiation was stopped. The changes in the emission intensity with time after that were measured. A log-log graph showing the changes in the emission intensity with time, in which the y-axis indicates the emission intensity on a logarithmic scale and the x-axis indicates the time on a logarithmic scale, is shown in FIG. 8. The compound names in FIG. 8 indicate that the long persistent luminescence emitters contained the respective compounds as the electron-accepting molecules.

Excitation light of 340 nm was applied to the long persistent luminescent films produced in Experimental Example 1 at room temperature for three minutes, and then the photo-irradiation was stopped. The photographs of the long persistent luminescent films were taken during the photo-irradiation and five seconds, five minutes and 20 minutes after the photo-irradiation stopped. The photographs are shown in FIG. 9. The photographs in FIG. 9 are the photographs of the long persistent luminescent films containing the respective compounds indicated under the photographs as the electron-accepting molecules, and for example, the photographs indicated by "PO2CzH" are the photographs of the long persistent luminescent film containing PO2CzH as the electron-accepting molecule.

As shown in FIG. 8, the log-log plots of the emission intensity against time of the long persistent luminescent films containing PO2CzH, PPT, DPEPO or 2CzPO as the electron-accepting molecule were also linear graphs each having a slope of approximately one. The photographs in FIG. 9 show that persistent luminescence was observed from the long persistent luminescent films obtained using PO2CzH, DPEPO, PPT or 2CzPO instead of PO2CzPh, like the long persistent luminescent film obtained using PO2CzPh. In particular, persistent luminescence could be observed from the long persistent luminescent films obtained using PO2CzH, DPEPO or PPT even five minutes after the photo-irradiation stopped. The results suggest that the long persistent luminescent films containing these compounds emit light by the same mechanism as that of the long persistent luminescent film containing PO2CzPh. It could be also confirmed that these compounds function effectively as electron-accepting molecules to be combined with TMB.

Experimental Example 2—Evaluation of Other Compounds as Electron-Donating Molecules Long persistent luminescent films containing the electron-donating molecules at 10 mol % were formed and each encapsulated using a glass substrate and an ultraviolet-cured resin in the same manner as in Example 1 except that TPPD, TPA, PhCz, MeCz or mCP was used instead of TMB.

Figure 10:
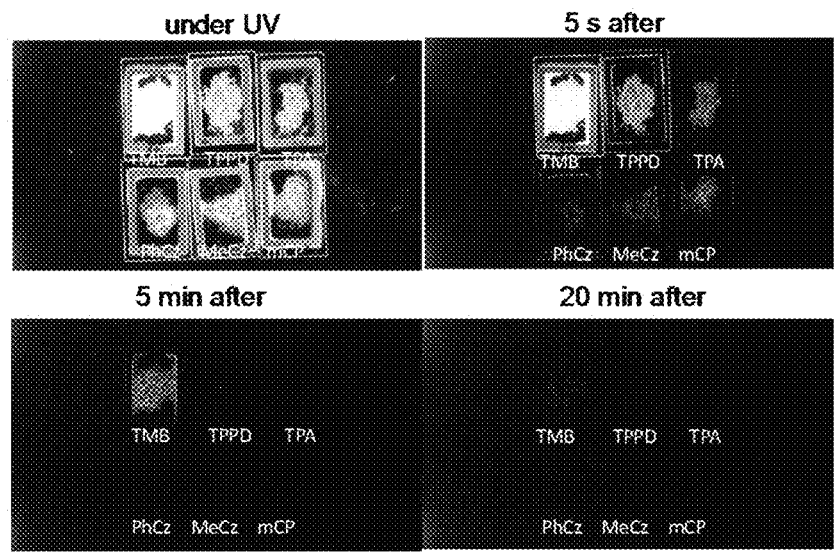
FIG. 10 shows photographs of long persistent luminescence emitters obtained using PO2CzPh as the electron-accepting molecule and various compounds as the electron-donating molecules (Experimental Example 2) taken during photo-irradiation and five seconds, five minutes and 20 minutes after the photo-irradiation stopped.

Excitation light of 340 nm was applied to the long persistent luminescent films produced in Experimental Example 2 at room temperature for three minutes, and then the photo-irradiation was stopped. The photographs of the long persistent luminescent films taken during the photo-irradiation and five seconds, five minutes and 20 minutes after the photo-irradiation stopped are shown in FIG. 10. The photographs in FIG. 10 are the photographs of the long persistent luminescent films containing the respective compounds indicated under the photographs as the electron-donating molecules, and for example, the photographs indicated by "TPPD" are the photographs of the long persistent luminescent film containing TPPD as the electron-donating molecule.

The photographs in FIG. 10 show that persistent luminescence was observed also from the long persistent luminescent film obtained using TPPD instead of TMB, like the long persistent luminescent film obtained using TMB. The results suggest that the long persistent luminescent film containing this compound emits light by the same mechanism as that of the long persistent luminescent film containing TMB. It could be also confirmed that TPPD functions effectively as an electron-donating molecule to be combined with PO2CzPh.

Experimental Example 3—Examination of Concentration of Electron-Donating Molecule Long persistent luminescent films were produced and each encapsulated using a glass substrate and an ultraviolet-cured resin in the same manner as in Example 1 except that TMB was added to the melted PO2CzPh at different concentrations in the range of 0 to 100 mol %.

Excitation light of 340 nm was applied to the long persistent luminescent films produced in Experimental Example 3 at room temperature for three minutes, and then the photo-irradiation was stopped. The photographs of the long persistent luminescent films taken during the photo-irradiation and five seconds, five minutes and 20 minutes after the photo-irradiation stopped are shown in FIG. 11.

Figure 11:
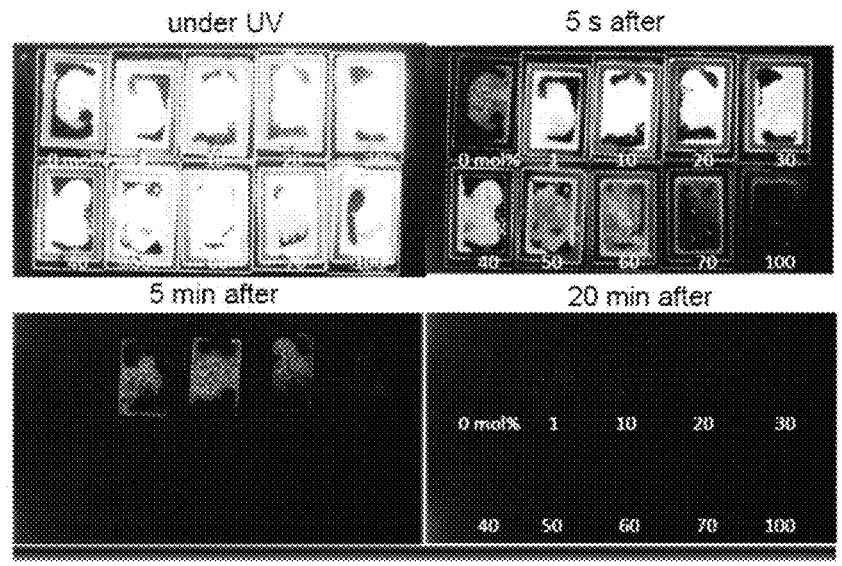
FIG. 11 shows photographs of long persistent luminescence emitters containing TMB at different concentrations in the range of 0 to 100 mol % (Experimental Example 3) taken during photo-irradiation and five seconds, five minutes and 20 minutes after the photo-irradiation stopped.

The photographs in FIG. 11 show that persistent luminescence was observed when the electron-donating molecule contents were 1 to 60 mol % and that brighter persistent luminescence was observed when the concentrations were 1 to 30 mol %. In particular, persistent luminescence was observed even five minutes after the photo-irradiation stopped when the concentrations were 1 to 20 mol %. The results show that the electron-donating molecule content, based on the total amount by mole of the electron-accepting molecules and the electron-donating molecules, is preferably 1 to 60 mol %, more preferably 1 to 30 mol %, further preferably 1 to 20 mol %.

Example 2—Production and Evaluation of Long Persistent Luminescence Emitters Containing PPT as the Electron-Accepting Molecule and TMB as the Electron-Donating Molecule In this Example, the characteristics of the long persistent luminescence emitter containing PPT as the electron-accepting molecule whose long persistent luminescence properties were examined in Experimental Example 1 were further evaluated.

A long persistent luminescent film was formed and encapsulated using a glass substrate and an ultraviolet-cured resin in the same manner as in Example 1 except that PPT was used instead of PO2CzPh and that the concentration of TMB added to the melt was 1 mol %.

Figure 12:
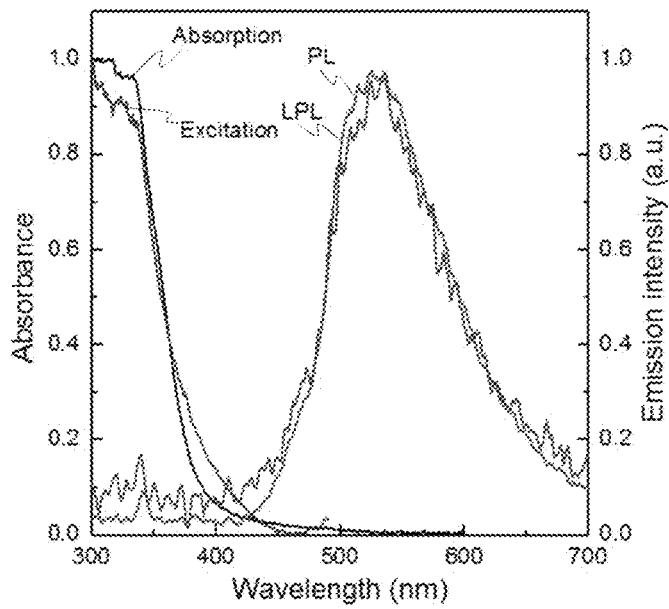
FIG. 12 is the absorption spectrum, the excitation spectrum, the photoluminescence spectrum (PL) and the long persistent luminescence spectrum (LPL) of a long persistent luminescence emitter obtained using PPT as the electron-accepting molecule and TMB as the electron-donating molecule (Example 2).
Figure 13:
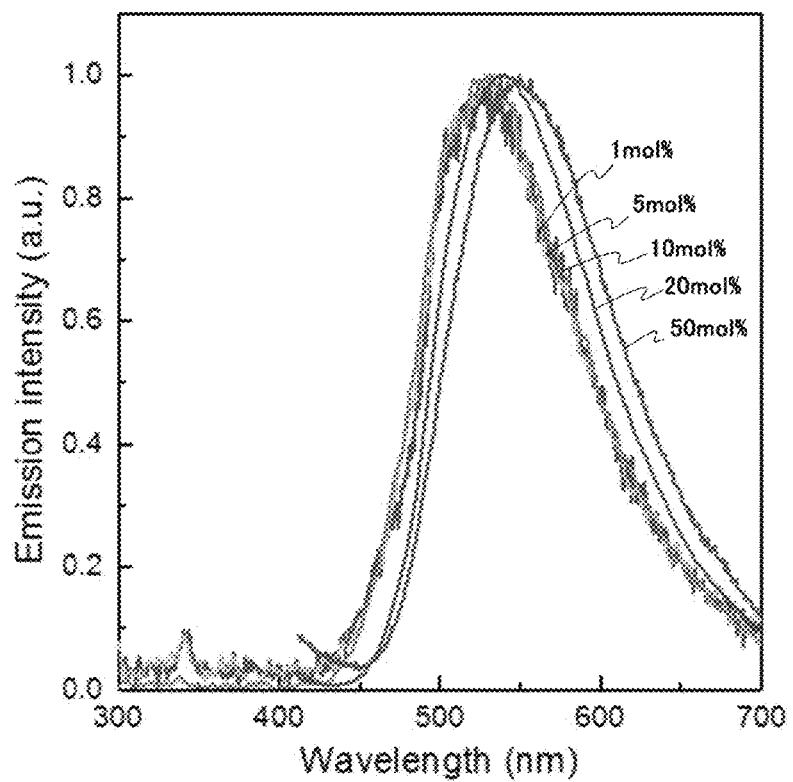
FIG. 13 is the photoluminescence spectra of long persistent luminescence emitters containing TMB at different concentrations in the range of 1 to 50 mol % of Example 2.

The ultraviolet-visible absorption spectrum (Absorption) of the produced long persistent luminescent film, its excitation spectrum (excitation) measured with the detection wavelength of 510 nm and its photoluminescence (PL) and long persistent luminescence (LPL) spectra measured using excitation light of 340 nm at 300 K are shown in FIG. 12. Here, the "photoluminescence spectrum (PL)" is the photoluminescence spectrum of the luminescence observed during the application of the excitation light, and the "long persistent luminescence spectrum (LPL)" is the photoluminescence spectrum measured five seconds after the application of the excitation light stopped. Also, the photoluminescence spectra (PL) of long persistent luminescent films which were formed with different TMB concentrations in the range of 1 to 50 mol % are shown in FIG. 13. The long persistent luminescent films having a TMB concentration of 5 mol %, 10 mol %, 20 mol % or 50 mol %, which were used in the measurement of FIG. 13 and FIG. 20 below, were formed in the same manner as the long persistent luminescent film (TMB concentration of 1 mol %) used in the other measurement in Example 2 except that the concentration of TMB added to the melt was changed.

Figure 14:
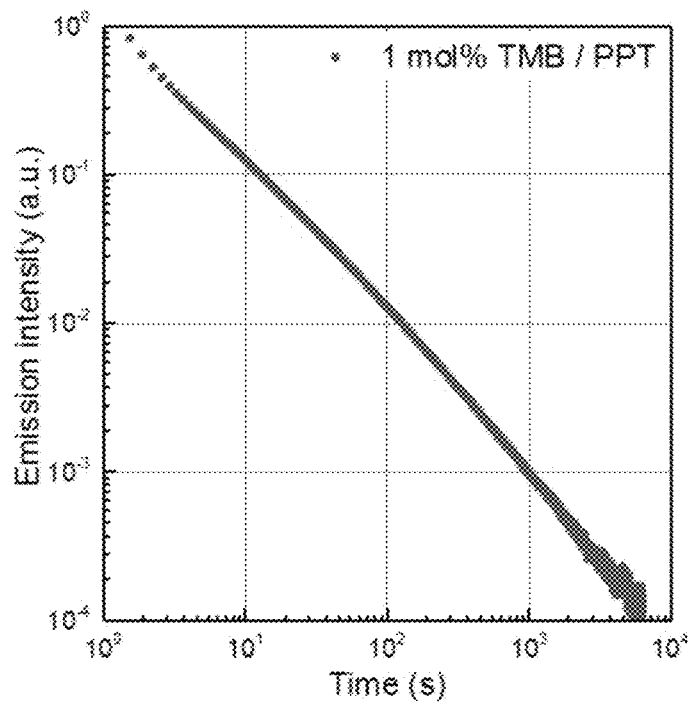
FIG. 14 is a log-log graph showing the change in the emission intensity with time of a long persistent luminescence emitter obtained using PPT as the electron-accepting molecule and TMB as the electron-donating molecule (Example 2).
Figure 15:
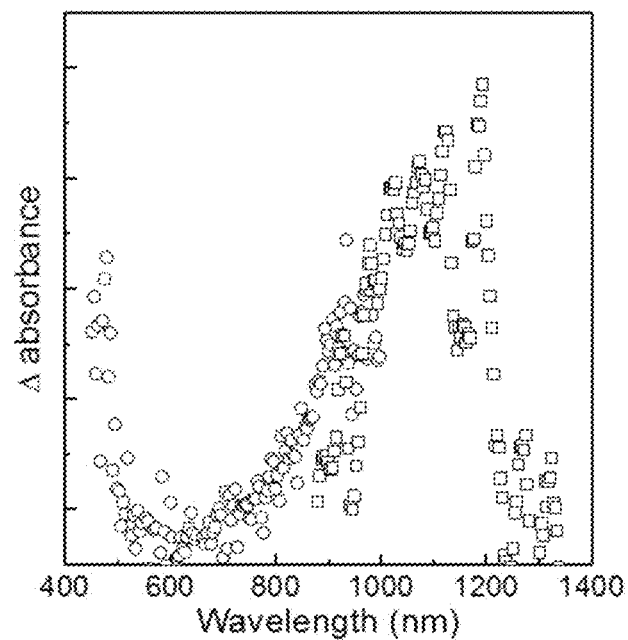
FIG. 15 is the transient absorption spectrum of a long persistent luminescence emitter obtained using PPT as the electron-accepting molecule and TMB as the electron-donating molecule (Example 2).
Figure 16:
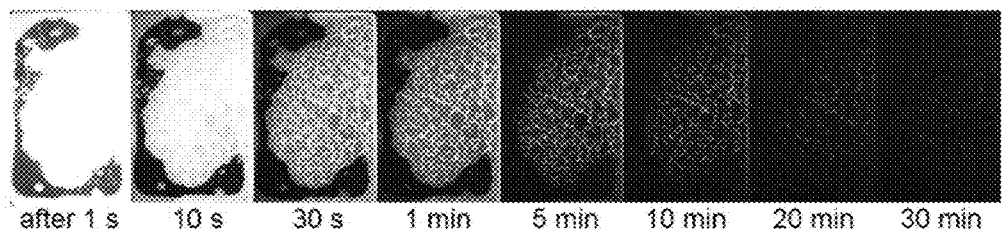
FIG. 16 shows photographs of a long persistent luminescence emitter obtained using PPT as the electron-accepting molecule and TMB as the electron-donating molecule (Example 2) taken after photo-irradiation sequentially for 30 minutes after the photo-irradiation stopped.

Excitation light of 340 nm (500 µW) was applied to the produced long persistent luminescent film having the TMB concentration of 1 mol % at 300 K for 60 seconds, and then the photo-irradiation was stopped. The change in the emission intensity with time after that was measured. A log-log graph showing the change in the emission intensity with time, in which the y-axis indicates the emission intensity on a logarithmic scale and the x-axis indicates the time on a logarithmic scale, is shown in FIG. 14. The transient absorption spectrum measured one second after the application of the excitation light stopped is shown in FIG. 15. The photographs of the long persistent luminescent film taken sequentially for 30 minutes after the application of the excitation light stopped are shown in FIG. 16.

Figure 19:
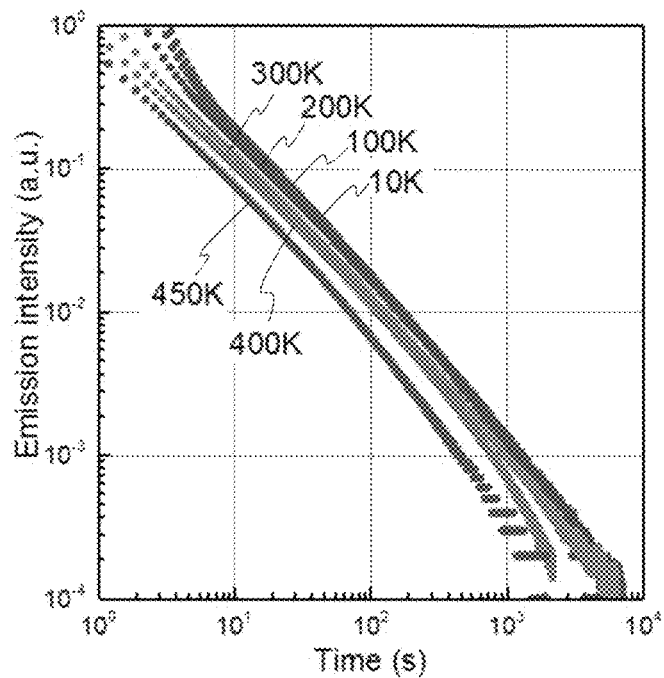
FIG. 19 is a log-log graph showing the changes in the emission intensity with time of a long persistent luminescence emitter obtained using PPT as the electron-accepting molecule and TMB as the electron-donating molecule (Example 2) which were measured at different ambient temperatures.
Figure 20:
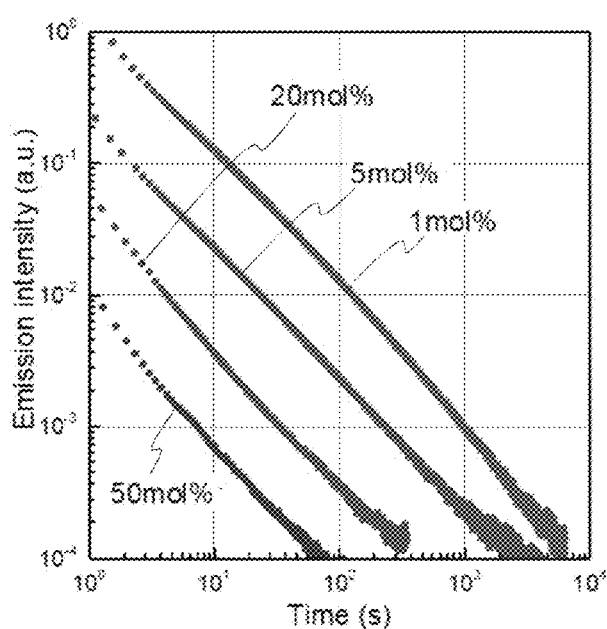
FIG. 20 is a log-log graph showing the changes in the emission intensity with time of long persistent luminescence emitters containing TMB at different concentrations in the range of 1 to 50 mol % of Example 2.

The changes in the emission intensity with time were measured as that in FIG. 14 but using excitation light with different intensities (the results shown in FIG. 17), using excitation light applied for different periods of time (the results shown in FIG. 18) and at different ambient temperatures (the results shown in FIG. 19), and the measurement results of the long persistent luminescent films having a TMB concentration of 1 mol %, 5 mol %, 20 mol % or 50 mol % are shown in FIG. 20. The conditions other than those changed in the measurement in FIGS. 17, 19 and 20 were the same as the conditions for the measurement of the change in the emission intensity with time shown in FIG. 14 (intensity of excitation light of 500 µW, application time of excitation light of 60 seconds and ambient temperature of 300 K). The changes in the emission intensity with time in FIG. 18 were measured using excitation light with the intensity of 10 µW at the ambient temperature of 300 K.

Comparative Example 3—Preparation and Evaluation of PPT and TMB Solutions in Toluene A solution (concentration of $1 \times 10^{-5}$ M) was prepared by dissolving PPT in toluene in a glovebox under a nitrogen atmosphere.

Also, a solution (concentration of $1 \times 10^{-5}$ M) was prepared by dissolving TMB in toluene in a glovebox under a nitrogen atmosphere.

Figure 23:
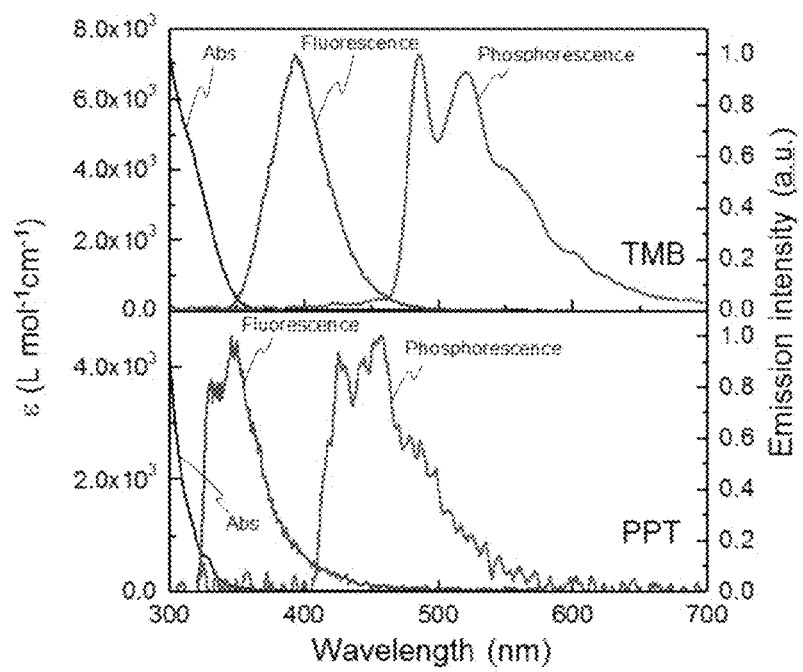
FIG. 23 is the absorption spectra, the fluorescence spectra and the phosphorescence spectra of TMB and PPT in toluene.

The ultraviolet-visible absorption spectra of the prepared solutions of PPT and TMB in toluene and their fluorescence spectra at 300 K and their phosphorescence spectra at 77 K which were measured using excitation light of 340 nm are shown in FIG. 23.

Figure 24:
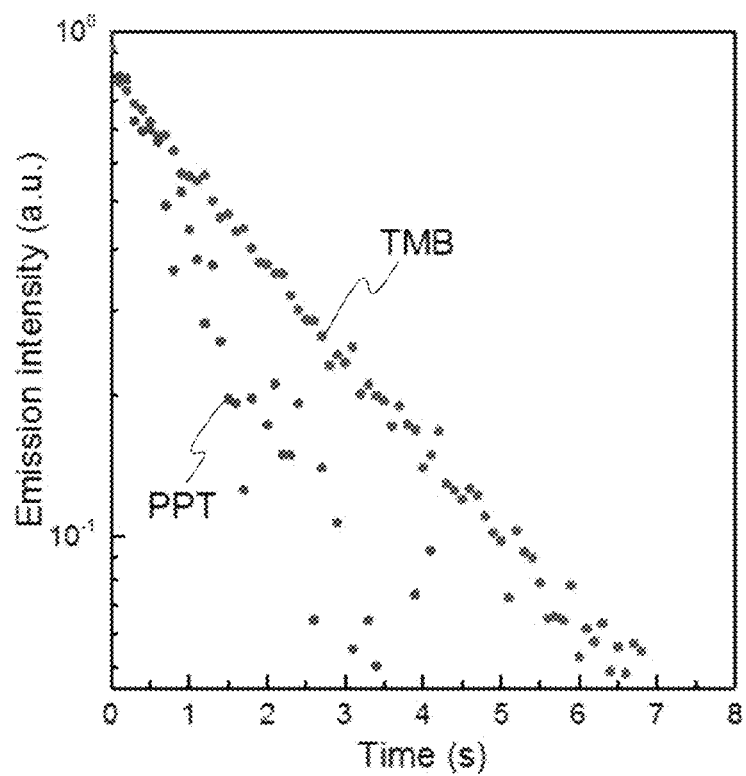
FIG. 24 is a semi-log graph showing the changes in the phosphorescence emission intensity with time at 77 K of a solution of PPT in toluene and a solution of TMB in toluene.

Excitation light of 340 nm was applied to the solutions of PPT and TMB in toluene at 77 K for 60 seconds, and then the photo-irradiation was stopped. The changes in the phosphorescence emission intensity with time after that were measured. A semi-log graph showing the changes in the emission intensity with time, in which the y-axis indicates the emission intensity on a logarithmic scale and the x-axis indicates the time, is shown in FIG. 24.

The measurement results of Example 2 and Comparative Example 3 above show that the photoluminescence spectrum (PL) in FIG. 12 does not agree with any of the photoluminescence spectra in FIG. 23 and that the emission peak shifted dependently on the TMB concentration as seen from FIG. 13. It could be thus confirmed that the luminescence from the long persistent luminescent film of PPT and TMB produced in Example 2 was the exciplex luminescence. In this regard, it was confirmed that the photoluminescence spectrum (PL) and the long persistent luminescence spectrum (LPL) of the long persistent luminescent film did not change when the ambient temperature (sample temperature) was changed between 10 to 400K.

Next, with respect to the change in the long persistent luminescence emission intensity with time shown in FIG. 14, the slope of the log-log plot of the emission intensity against time is one. On the other hand, as confirmed also in Comparative Example 2 above, the phosphorescence intensity decay of TMB is single exponential decay (see FIG. 7 of Comparative Example 2 and FIG. 24 of Comparative Example 3). From the results, it could be confirmed that the long persistent luminescent film of PPT and TMB produced in Example 2 also has a different luminescence mechanism from that of TMB and emits light by the luminescence mechanism shown in FIG. 1.

The transient absorption spectrum in FIG. 15 corresponds to the absorption spectrum of the activated species generated by the photo-excitation, and a peak was observed between 600 and 1400 nm, which is the absorption band of the radical cations. It could be thus confirmed that the radical cations of the electron donors were generated in the photo-excited long persistent luminescent film.

The photographs in FIG. 16 show that persistent luminescence could be observed from the long persistent luminescent film of PPT and TMB produced in Example 2 even 30 minutes after the photo-irradiation stopped, suggesting that this film has excellent long persistent luminescence properties.

The tendencies of the changes in the emission intensity with time in FIGS. 17 to 20 suggest that the luminescence (persistent luminescence) from this long persistent luminescent film has characteristics which a general light emitter does not have, with respect to the dependency on the intensity of the excitation light, the dependency on the excitation time, the dependency on the sample temperature and the dependency on the electron donor concentration.

Figure 17:
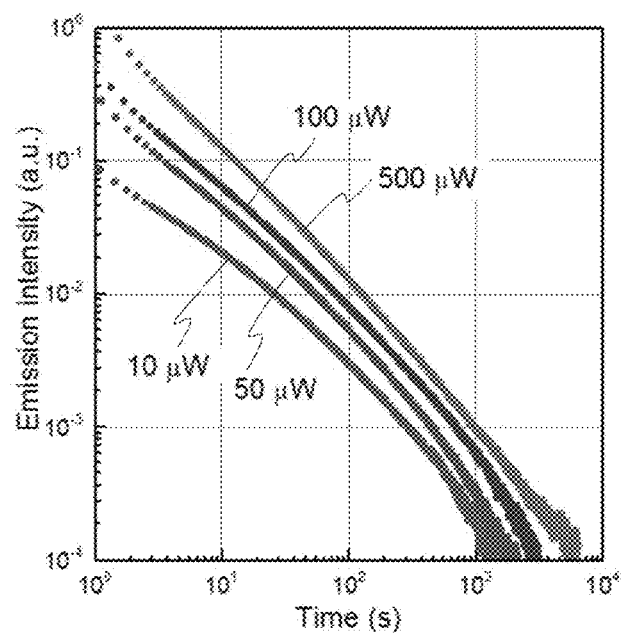
FIG. 17 is a log-log graph showing the changes in the emission intensity with time of a long persistent luminescence emitter obtained using PPT as the electron-accepting molecule and TMB as the electron-donating molecule (Example 2) which were measured using excitation light with different intensities.

First, with respect to the dependency on the intensity of the excitation light, the luminescence from a general light emitter becomes stronger as the intensity of the excitation light becomes higher, but the emission intensity tends to saturate when the intensity of the excitation light exceeds a certain level. On the other hand, FIG. 17 shows that the emission intensity of this long persistent luminescent film did not saturate but became higher even when the intensity of the excitation light was increased and that luminescence with a sufficient intensity was observed with excitation light as weak as 10 µW. In particular, the distinctive feature is that luminescence with a sufficient intensity could be observed with weak excitation light.

Figure 18:
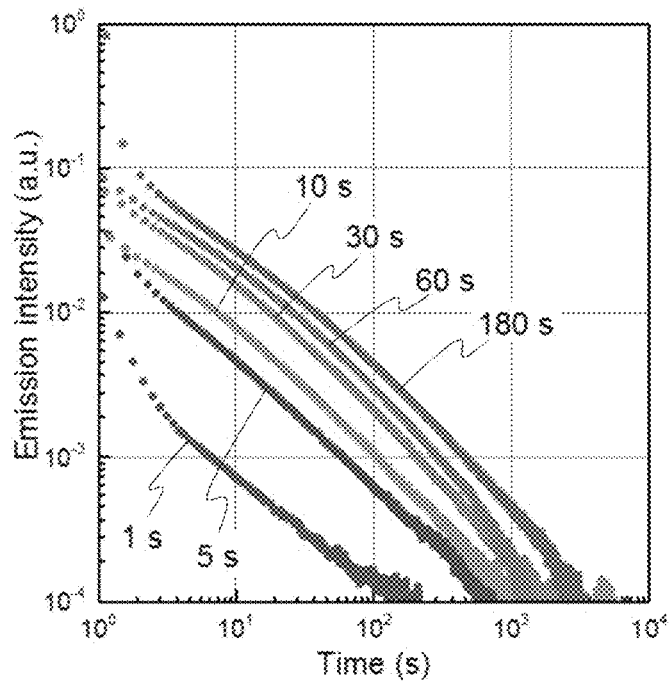
FIG. 18 is a log-log graph showing the changes in the emission intensity with time of a long persistent luminescence emitter obtained using PPT as the electron-accepting molecule and TMB as the electron-donating molecule (Example 2) which were measured using excitation light applied for different periods of time.

Next, the emission intensity of a general light emitter does not depend on the excitation time, and the emission intensity does not change even when the excitation time is prolonged. On the other hand, FIG. 18 shows that the emission lifetime and the emission intensity of the long persistent luminescent film increased as the excitation time became longer. This suggests that carriers (radical cations and radical anions) were generated and accumulated by the photo-excitation.

With respect to the dependency on the sample temperature shown in FIG. 19, the emission intensity hardly changed in the range of 10 to 300 K. This suggests that the long persistent luminescent film can exhibit long persistent luminescence properties in a wide temperature range and functions satisfactorily as a long persistent luminescence emitter even at room temperature.

With respect to the dependency on the electron donor concentration shown in FIG. 20, the tendency toward a shorter emission lifetime was observed as the electron donor concentration was increased. This is presumably because the distance between the radical cations of the electron-donating molecules and the radical anions of the electron-accepting molecules generated by the photo-excitation becomes shorter when the concentration of TMB as the electron-donating molecule is high, resulting in an increase in the recombination probability, and because the radical cations and the radical anions are thus consumed for luminescence at an early stage.

Figure 21:
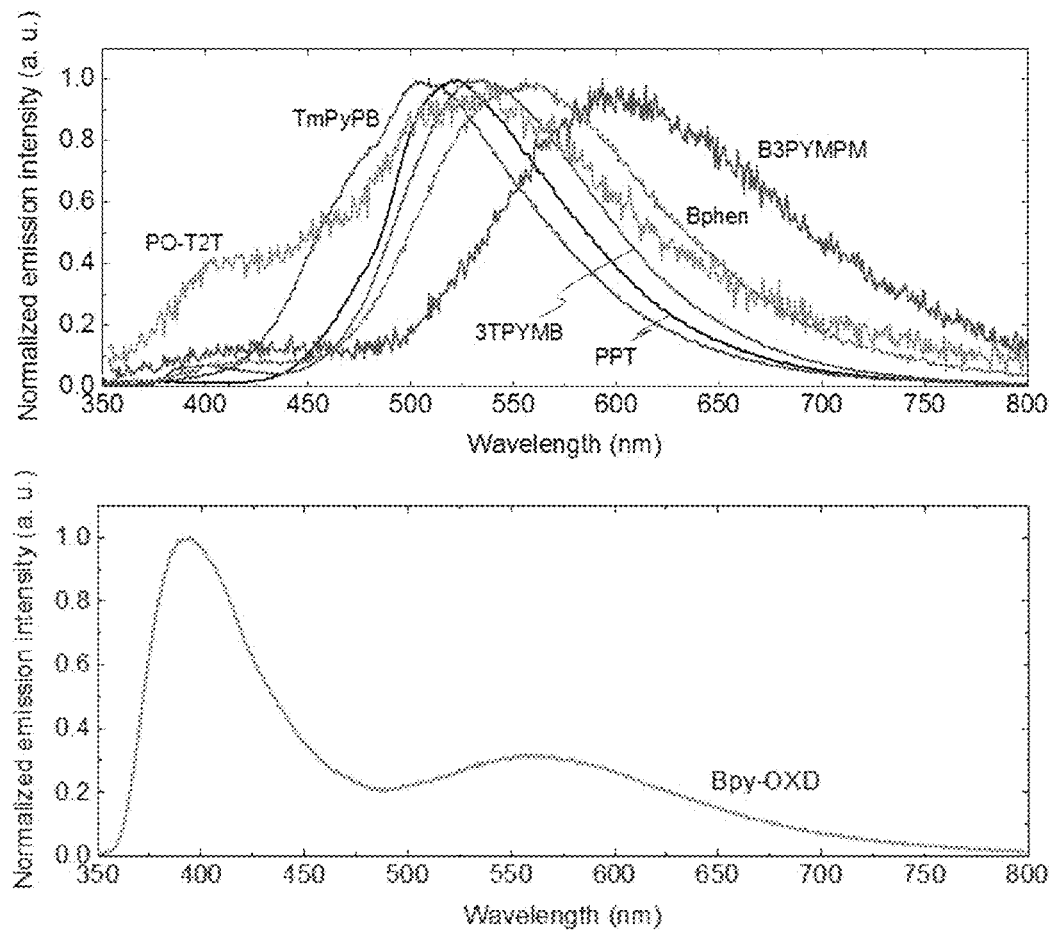
FIG. 21 is the photoluminescence spectra (PL) of long persistent luminescence emitters obtained using TMB as the electron-donating molecule and various compounds as the electron-accepting molecules (Experimental Example 3).
Figure 22:
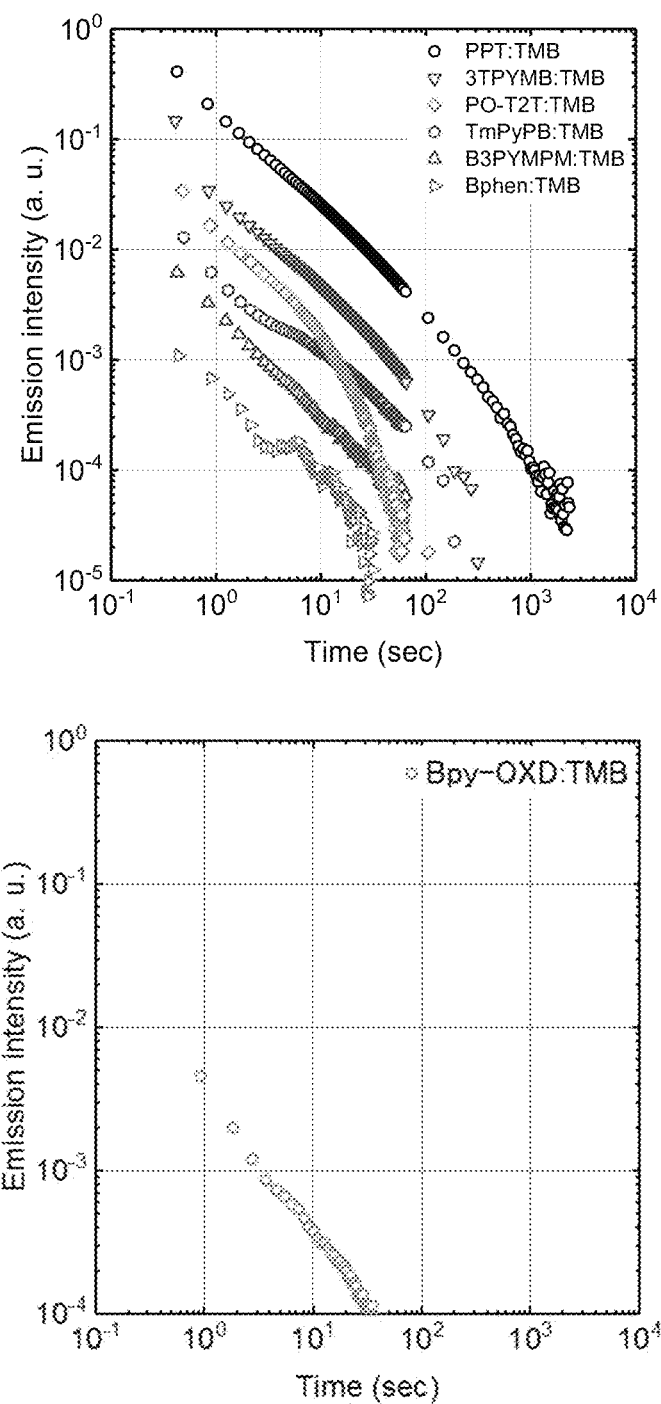
FIG. 22 is a log-log graph showing the changes in the emission intensity with time of long persistent luminescence emitters obtained using TMB as the electron-donating molecule and various compounds as the electron-accepting molecules (Experimental Example 3).

Example 3—Production and Evaluation of Long Persistent Luminescence Emitters Containing TMB as the Electron-Donating Molecule and Various Electron-Accepting Molecules Long persistent luminescence emitters were produced and each encapsulated using a glass substrate and an ultraviolet-cured resin in the same manner as in Example 2 except that B3PYMPM, TmPyBP, T2T, PO-T2T, 3TPYMB, Bphen and Bpy-OXD were used as the electron-accepting molecules instead of PPT used in combination with TMB used as the electron-donating molecule in Example 2. The photoluminescence spectra of the long persistent luminescence emitters and the changes in the emission intensity with time, which were measured under the same conditions as those in Example 2, are shown in FIG. 21 and FIG. 22, respectively.

Figure 25:
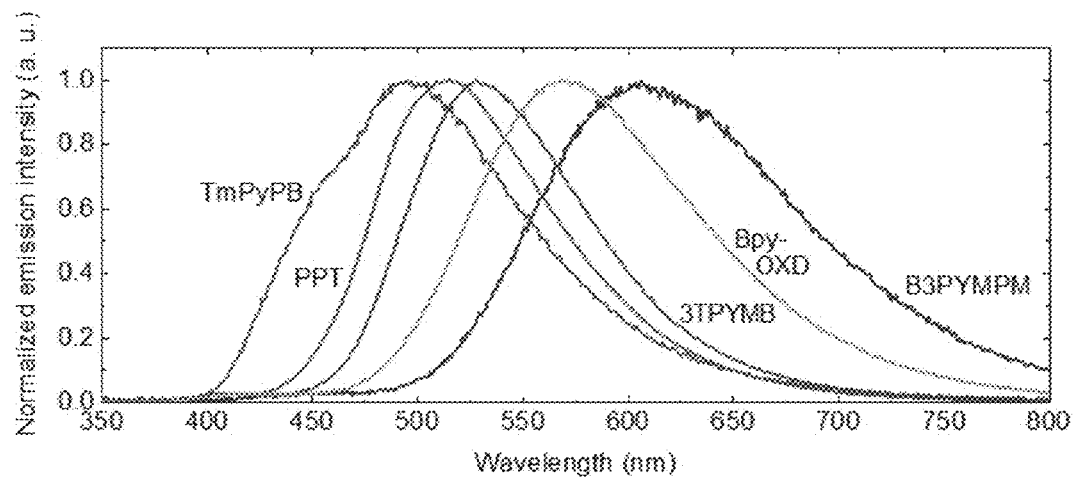
FIG. 25 is the photoluminescence spectra (PL) of long persistent luminescence emitters obtained using m-MTDATA as the electron-donating molecule and various compounds as the electron-accepting molecules (Example 4).
Figure 26:
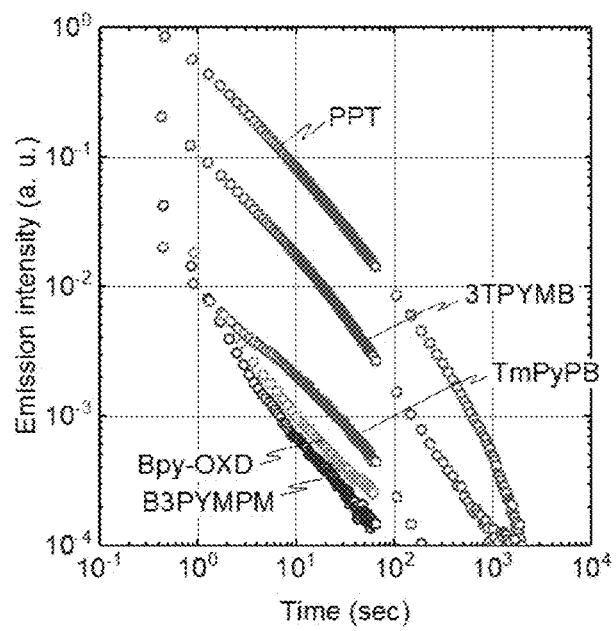
FIG. 26 is a log-log graph showing the changes in the emission intensity with time of long persistent luminescence emitters obtained using m-MTDATA as the electron-donating molecule and various compounds as the electron-accepting molecules (Example 4).

Example 4—Production and Evaluation of Long Persistent Luminescence Emitters Containing m-MTDATA as the Electron-Donating Molecule and Various Electron-Accepting Molecules Long persistent luminescent films were formed and each encapsulated using a glass substrate and an ultraviolet-cured resin in the same manner as in Example 2 except that m-MTDATA was used instead of TMB used as the electron-donating molecule in Example 2 and that PPT, TmPyPB, 3TPYMB, B3PYMPM and Bpy-OXD were used as the electron-accepting molecules. The photoluminescence spectra of the long persistent luminescence emitters and the changes in the emission intensity with time, which were measured under the same conditions as those in Example 2, are shown in FIG. 25 and FIG. 26, respectively.

Figure 27:
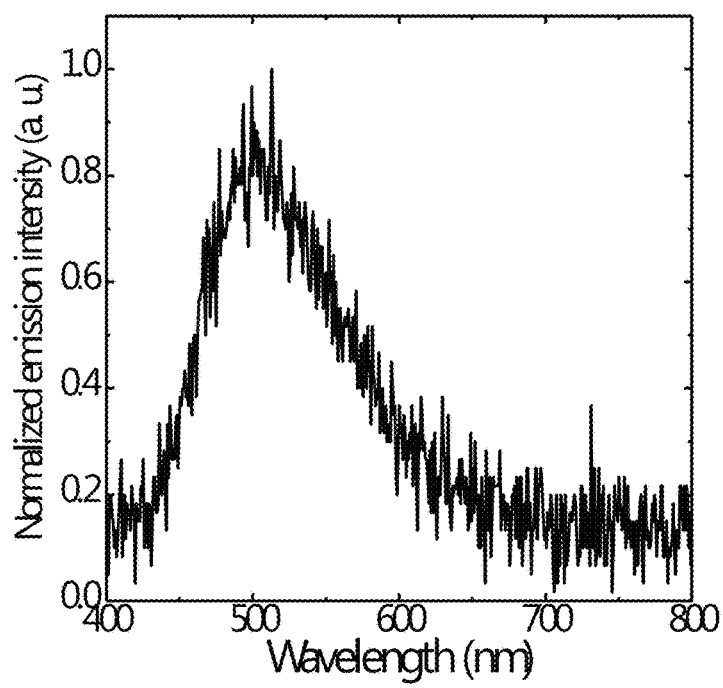
FIG. 27 is the photoluminescence spectrum (PL) of a long persistent luminescence emitter obtained using PPT as the electron-accepting molecule and CV as the electron-donating molecule (Example 5).
Figure 28:
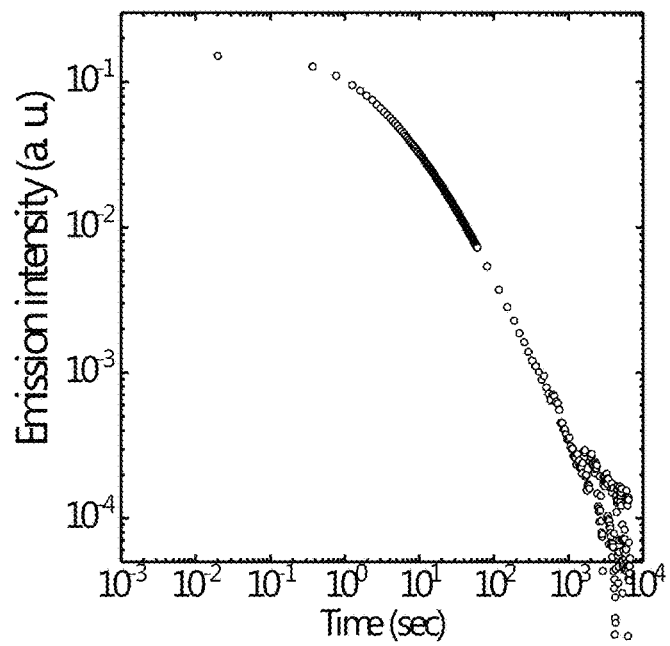
FIG. 28 is a log-log graph showing the change in the emission intensity with time of a long persistent luminescence emitter obtained using PPT as the electron-accepting molecule and CV as the electron-donating molecule (Example 5).

Example 5—Production and Evaluation of a Long Persistent Luminescence Emitter Containing PPT as the Electron-Accepting Molecule and CV as the Electron-Donating Molecule A long persistent luminescent film was formed and encapsulated using a glass substrate and an ultraviolet-cured resin in the same manner as in Example 2 except that CV was used instead of TMB used as the electron-donating molecule in combination with PPT used as the electron-accepting molecule in Example 2. The photoluminescence spectrum of the long persistent luminescence emitter and the change in the emission intensity with time, which were measured under the same conditions as those in Example 2, are shown in FIG. 27 and FIG. 28, respectively.

Figure 29:
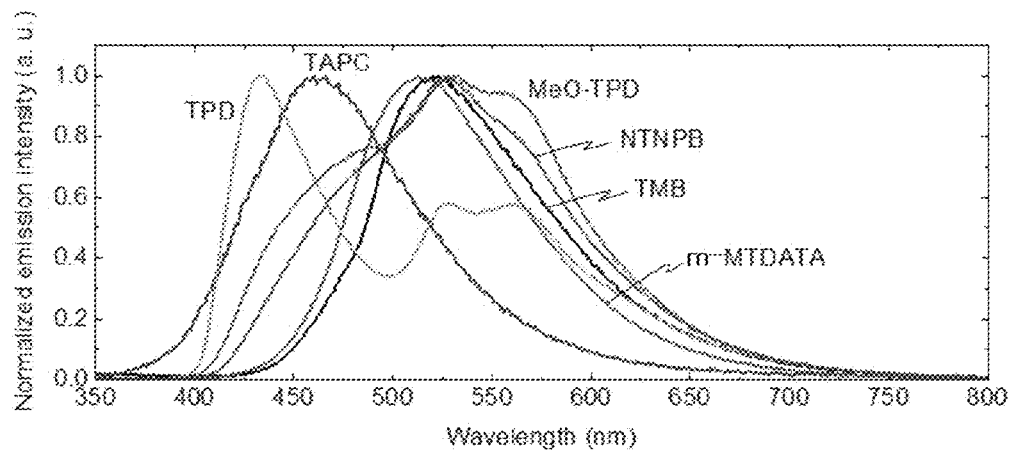
FIG. 29 is the photoluminescence spectra (PL) of long persistent luminescence emitters obtained using PPT as the electron-accepting molecule and various compounds as the electron-donating molecules (Example 6).
Figure 30:
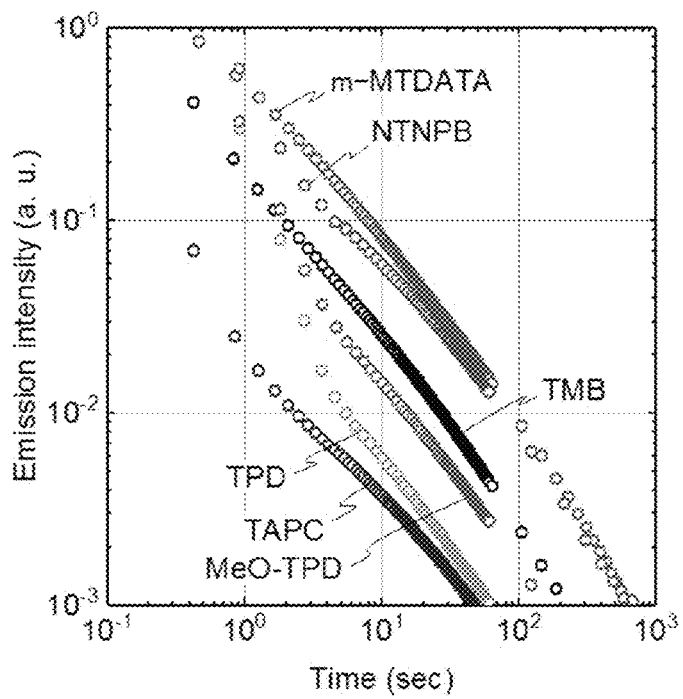
FIG. 30 is a log-log graph showing the changes in the emission intensity with time of long persistent luminescence emitters obtained using PPT as the electron-accepting molecule and various compounds as the electron-donating molecules (Example 6).

Example 6—Production and Evaluation of Long Persistent Luminescence Emitters Containing PPT as the Electron-Accepting Molecule and Various Electron-Donating Molecules Long persistent luminescent films were formed and each encapsulated using a glass substrate and an ultraviolet-cured resin in the same manner as in Example 2 except that TMB, m-MTDATA, TAPC, TPD, MeO-TPD and NTNPB were used as the electron-donating molecules used in combination with PPT used as the electron-accepting molecule in Example 2. The photoluminescence spectra of the long persistent luminescence emitters and the changes in the emission intensity with time, which were measured under the same conditions as those in Example 2, are shown in FIG. 29 and FIG. 30, respectively.

Figure 31:
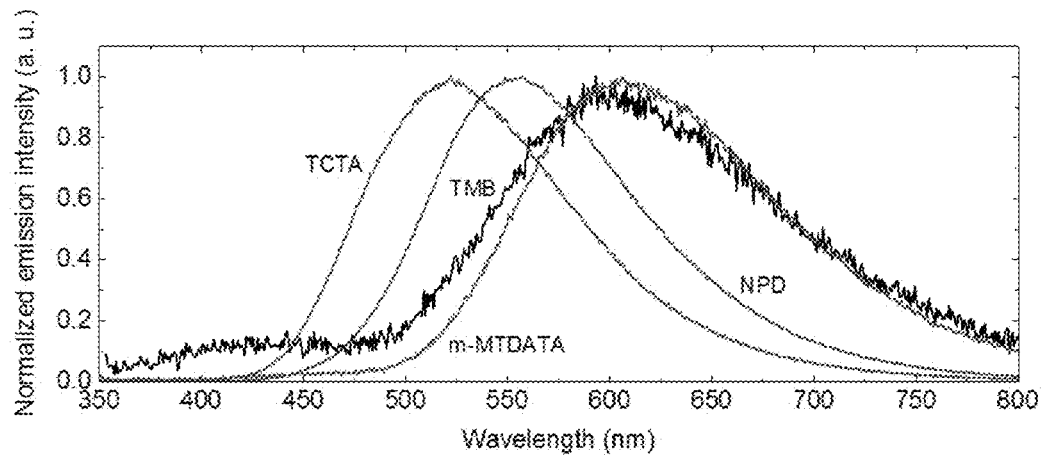
FIG. 31 is the photoluminescence spectra (PL) of long persistent luminescence emitters obtained using B3PYMPM as the electron-accepting molecule and various compounds as the electron-donating molecules (Example 7).
Figure 32:
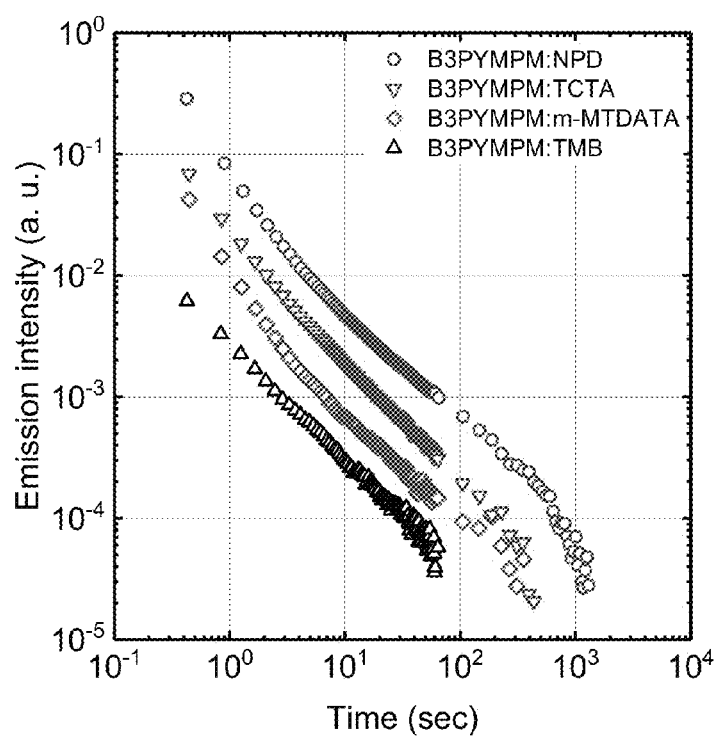
FIG. 32 is a log-log graph showing the changes in the emission intensity with time of long persistent luminescence emitters obtained using B3PYMPM as the electron-accepting molecule and various compounds as the electron-donating molecules (Example 7).

Example 7—Production and Evaluation of Long Persistent Luminescence Emitters Containing B3PYMPM as the Electron-Accepting Molecule and Various Electron-Donating Molecules Long persistent luminescent films were formed and each encapsulated using a glass substrate and an ultraviolet-cured resin in the same manner as in Example 2 except that B3PYMPM was used instead of PPT used as the electron-accepting molecule in Example 2 and that TMB, m-MTDATA, NPD and TCTA were used as the electron-donating molecules. The photoluminescence spectra of the long persistent luminescence emitters and the changes in the emission intensity with time, which were measured under the same conditions as those in Example 2, are shown in FIG. 31 and FIG. 32, respectively.

Figure 33:
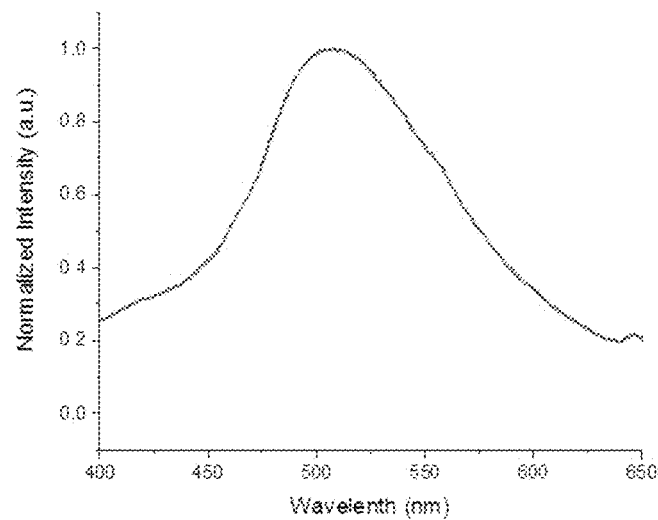
FIG. 33 is the photoluminescence spectrum (PL) of a long persistent luminescence emitter obtained using PPSU as the electron-accepting molecule and m-MTDATA as the electron-donating molecule (Example 8).
Figure 34:
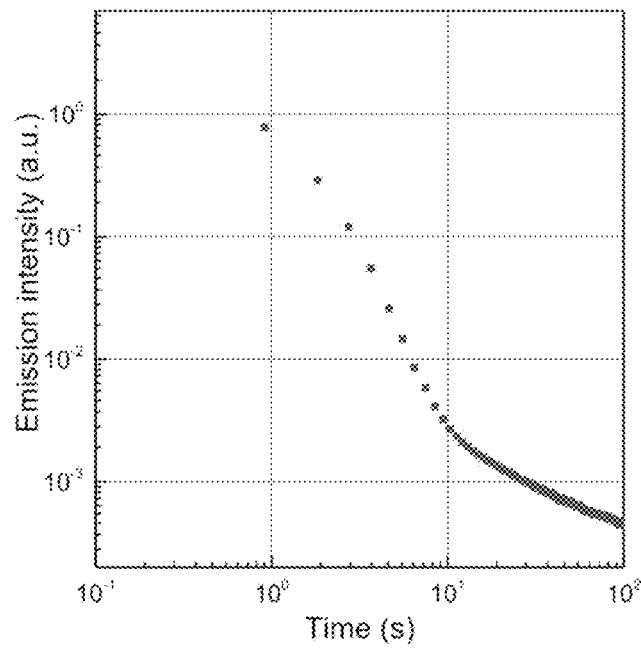
FIG. 34 is a log-log graph showing the change in the emission intensity with time of a long persistent luminescence emitter obtained using PPSU as the electron-accepting molecule and m-MTDATA as the electron-donating molecule (Example 8).

Example 8—Production and Evaluation of a Long Persistent Luminescence Emitter Containing m-MTDATA as the Electron-Donating Molecule and PPSU as the Electron-Accepting Molecule Under a nitrogen gas atmosphere, PPSU (100 mg, manufactured by Aldrich, Tg=192° C.) was dissolved in 1 mL of N-methyl-2-pyrrolidone (NMP), and TMB or m-MTDATA (1 mg) was added. The obtained solution was drop-cast and annealed at 200° C. A long persistent luminescent film was thus formed and then encapsulated using a glass substrate and an ultraviolet-cured resin. The photoluminescence spectrum of the long persistent luminescence emitter and the change in the emission intensity with time, which were measured under the same conditions as those in Example 2, are shown in FIG. 33 and FIG. 34, respectively.

Figure 35:
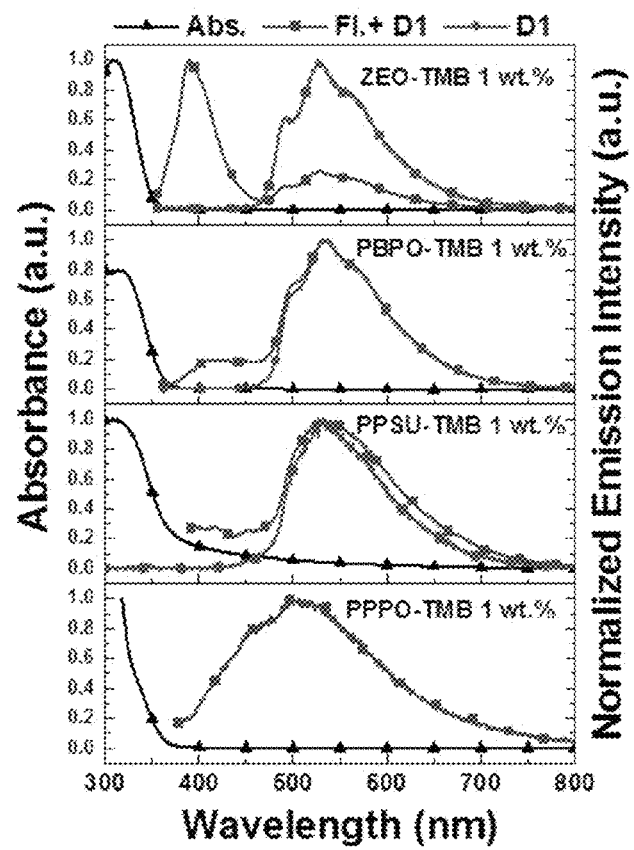
FIG. 35 is the photoluminescence spectra (PL) of long persistent luminescence emitters obtained using various polymers as the electron-accepting molecules and TMB as the electron-donating molecule (Example 9).
Figure 36:
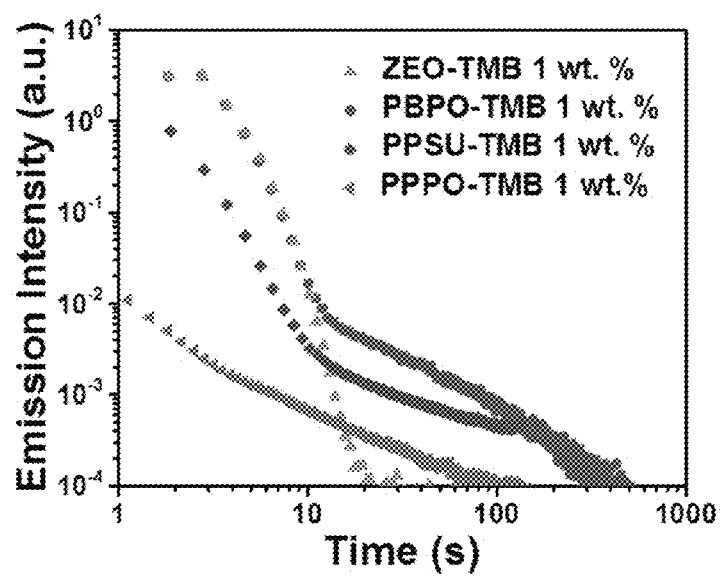
FIG. 36 is a log-log graph showing the changes in the emission intensity with time of long persistent luminescence emitters obtained using various polymers as the electron-accepting molecules and TMB as the electron-donating molecule (Example 9).

Example 9—Production and Evaluation of Long Persistent Luminescence Emitters Containing TMB as the Electron-Donating Molecule and Various Polymers as the Electron-Accepting Molecules Long persistent luminescent films were formed and each encapsulated using a glass substrate and an ultraviolet-cured resin in the same manner as in Example 8 except that TMB was used instead of m-MTDATA used as the electron-donating molecule in Example 8 and that polymers PBPO, PPSU and PPPO were used as the electron-accepting molecules. Also, as a reference experiment, a film was formed using TMB and a cycloolefin polymer (ZEONEX manufactured by Zeon Corporation, abbreviated to ZEO below) and encapsulated using a glass substrate and an ultraviolet-cured resin. ZEO was used as a host without the acceptor properties. The photoluminescence spectra of the long persistent luminescence emitters and the changes in the emission intensity with time, which were measured under the same conditions as those in Example 2, are shown in FIG. 35 and FIG. 36, respectively. In FIG. 35, the lines with triangle marks are the absorption spectra, and the lines with square marks are the photoluminescence spectra including fluorescence and phosphorescence. The lines with circle marks are the phosphorescence emission spectra. When the polymers PBPO, PPSU and PPPO were used as the electron-accepting molecules, luminescence including fluorescence and phosphorescence was first observed, and then only phosphorescence was observed, showing decay in two stages. On the other hand, when ZEO was used, long persistent luminescence was not observed because ZEO does not have the acceptor properties, and only phosphorescence at the early stage was observed.

INDUSTRIAL APPLICABILITY

The long persistent luminescence emitter of the invention can exhibit persistent luminescence for a long time due to the functions of specific electron-donating and electron-accepting molecules without the help of any inorganic materials containing rare-earth elements. Thus, according to the invention, the long persistent luminescence emitter can be produced by simple steps without the use of any scarce rare-earth elements. Accordingly, the long persistent luminescence emitter of the invention has wide industrial applicability.

The invention claimed is:

1. A long persistent luminescence emitter satisfying the following (1) and (2):
   (1) the long persistent luminescence emitter has an electron-donating molecule and an electron-accepting molecule,
   (2) after photo-irradiation of the long persistent luminescence emitter stops, a semi-log graph of the emission intensity on a logarithmic scale of the y-axis and the time of the x-axis is not linear; and
   which further has a luminescent material in addition to the electron-donating molecule and the electron-accepting molecule.

2. The long persistent luminescence emitter according to claim 1, wherein the luminescence is observed at 20° C. after the photo-irradiation of the long persistent luminescence emitter stops.

3. The long persistent luminescence emitter according to claim 1, wherein after photo-irradiation of the long persistent luminescence emitter stops, a log-log graph of the emission intensity on a logarithmic scale of the y-axis and the time on a logarithmic scale of the x-axis is linear.

4. The long persistent luminescence emitter according to claim 1, wherein the electron-donating molecule and the electron-accepting molecule form an exciplex.

5. The long persistent luminescence emitter according to claim 1, which emits fluorescence.

6. The long persistent luminescence emitter according to claim 1, wherein the electron-accepting molecule has any of the following partial structures:

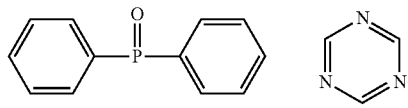

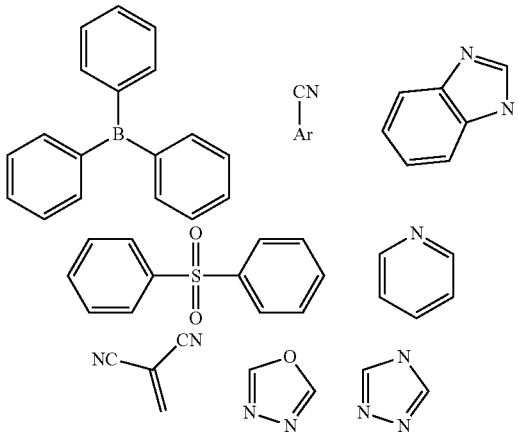

wherein Ar represents an aromatic ring or a heteroaromatic ring.

7. The long persistent luminescence emitter according to claim 1, wherein the electron-accepting molecule contains:
   two or more phosphine oxide structures $R_3P(=O)$ wherein each R represents a substituent, and the three R's may be the same or different from each other; and one hetero atom or more.

8. A long persistent luminescence emitter satisfying the following (1) and (2):
   (1) the long persistent luminescence emitter has an electron-donating molecule and an electron-accepting molecule,
   (2) after photo-irradiation of the long persistent luminescence emitter stops, a semi-log graph of the emission intensity on a logarithmic scale of the y-axis and the time of the x-axis is not linear, and
   which has an area where the amount by mass of electron-donating molecules is 100 times or more higher than that of electron-accepting molecules and an area where the amount by mass of electron-accepting molecules is 100 times or more higher than that of electron-donating molecules.

9. A long persistent luminescence emitter satisfying the following (1) and (2):
   (1) the long persistent luminescence emitter has an electron-donating molecule and an electron-accepting molecule,
   (2) after photo-irradiation of the long persistent luminescence emitter stops, a semi-log graph of the emission intensity on a logarithmic scale of the y-axis and the time of the x-axis is not linear, and
   wherein at least one of the electron-accepting molecule and the electron-donating molecule is a polymer having a repeating unit.

* * * * *